(12) United States Patent
Goyal et al.

(10) Patent No.: US 10,511,694 B2
(45) Date of Patent: Dec. 17, 2019

(54) SYSTEMS AND METHODS FOR APPLICATION SPECIFIC LOAD BALANCING

(71) Applicant: Citrix Systems, Inc., Fort Lauderdale, FL (US)

(72) Inventors: Ankush Goyal, Bangalore (IN); Sudish Kumar Sah, Bangalore (IN); Rajesh Joshi, Bangalore (IN); Anil Shetty, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 579 days.

(21) Appl. No.: 14/339,081

(22) Filed: Jul. 23, 2014

(65) Prior Publication Data
US 2016/0028855 A1  Jan. 28, 2016

(51) Int. Cl.
  *H04L 29/06* (2006.01)
  *G06F 9/50* (2006.01)
  *H04L 12/26* (2006.01)
  *H04L 29/08* (2006.01)

(52) U.S. Cl.
  CPC ........... *H04L 67/42* (2013.01); *G06F 9/5055* (2013.01); *H04L 43/10* (2013.01); *H04L 67/16* (2013.01); *G06F 2209/503* (2013.01); *G06F 2209/508* (2013.01)

(58) Field of Classification Search
  CPC ......... H04L 67/42; H04L 43/10; H04L 29/06; H04L 67/16; G06F 9/5055; G06F 11/3409
  USPC ........................... 709/203, 224, 226; 718/105
  See application file for complete search history.

(56) References Cited

U.S. PATENT DOCUMENTS

| | | | | |
|---|---|---|---|---|
| 6,092,178 A | * | 7/2000 | Jindal | H04L 29/12009 712/27 |
| 2004/0268358 A1 | * | 12/2004 | Darling | H04L 29/06 718/105 |
| 2005/0102383 A1 | * | 5/2005 | Sutler | G06Q 30/02 709/223 |
| 2007/0005544 A1 | * | 1/2007 | Joanovic | G06N 5/022 706/47 |

(Continued)

OTHER PUBLICATIONS

International Search Report and Written Opinion dated Nov. 17, 2015 in PCT Application No. PCT/US2015/041604.

(Continued)

*Primary Examiner* — Zi Ye
(74) *Attorney, Agent, or Firm* — Foley & Lardner LLP; Christopher J. McKenna

(57) ABSTRACT

The present application is directed towards systems and methods for application specific load-balancing for web servers. A device intermediary to a plurality of clients and a plurality of services executing on a plurality of servers, may receive a request from a client for an application. The device may identify an identifier for the application from a table comprising a list of applications and a corresponding identifier assigned to each application. In an embodiment, the device may establish one or more monitors to monitor each service to determine applications available on each service. In an embodiment, the device may determine that one or more services of the plurality of services provides the application and select a service from the one or more services to forward the request. The device may forward the request to the selected service.

18 Claims, 37 Drawing Sheets

(56) References Cited

U.S. PATENT DOCUMENTS

| | | | |
|---|---|---|---|
| 2007/0208844 A1 | 9/2007 | Armstrong et al. | |
| 2008/0016206 A1* | 1/2008 | Ma | H04L 43/0817 709/224 |
| 2008/0114878 A1* | 5/2008 | Gopalkrishnan | G06F 11/3409 709/224 |
| 2009/0037573 A1* | 2/2009 | Qiu | H04L 41/0663 709/224 |
| 2009/0187662 A1* | 7/2009 | Manapragada | H04L 67/1008 709/226 |
| 2013/0080507 A1* | 3/2013 | Ruhlen | H04L 67/16 709/203 |

OTHER PUBLICATIONS

Raman, R. et al. Matchmaking: distributed resource management for high throuphput computing, Proceedings of the Seventh International Symposium on High Performance Distributed Computing, IEEE Comput. Soc., pp. 140-146, Jul. 28, 1998.

EP Examination Report for EP Appl. No. 15745084.2, dated Jul. 27, 2018.

* cited by examiner

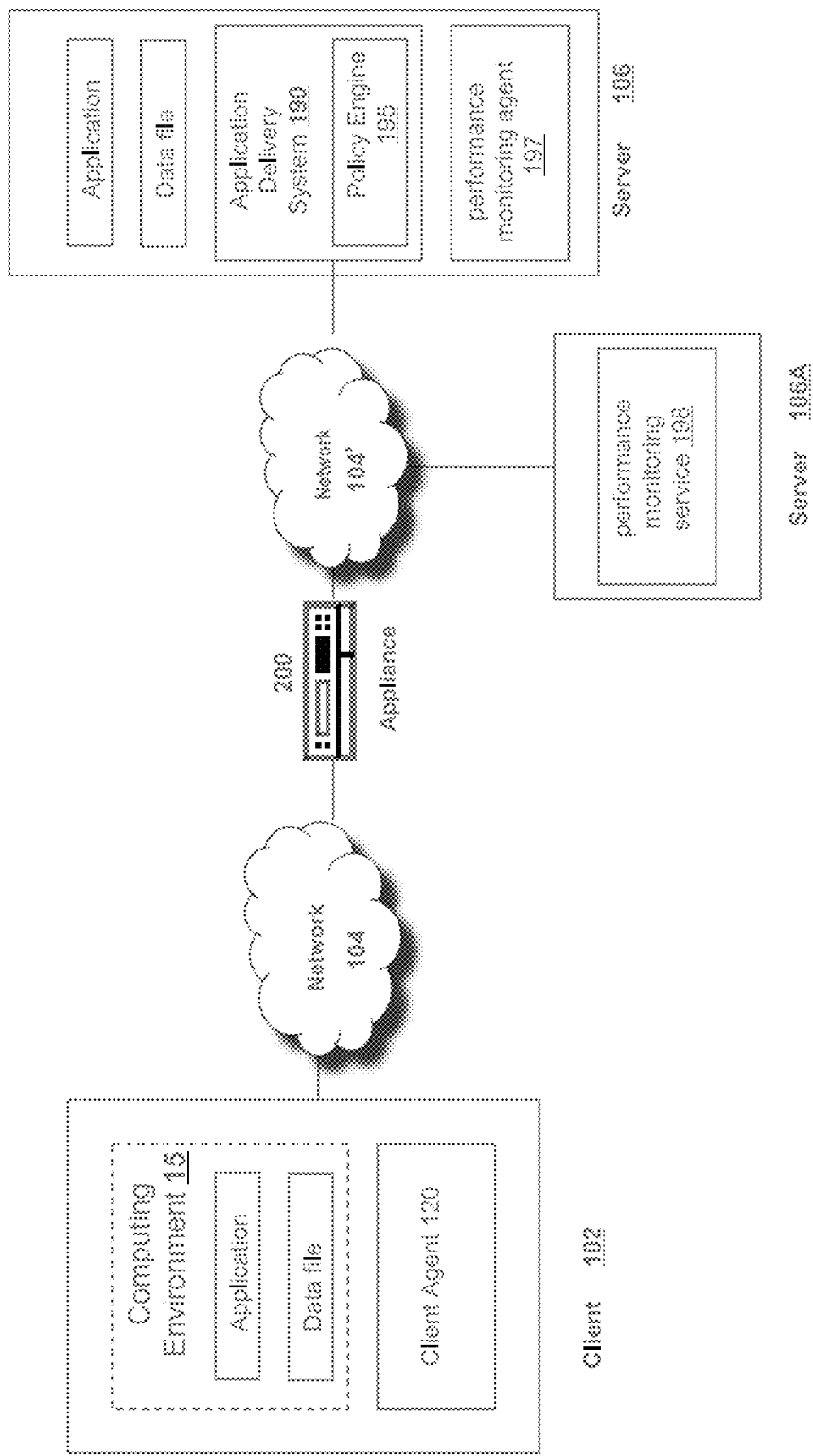

| Service Name | Monitor Name | Activity | Probe Time |
|---|---|---|---|
| Service 1 | Monitor 1 | Non-Schedulable | Time 1 |
| Service 1 | Monitor 2 | Schedulable | Time 2 |
| Service 1 | Monitor n1 | Schedulable | Time 3 |
| Service 2 | Monitor 1 | Schedulable | Time 4 |
| Service 2 | Monitor 2 | Non-Schedulable | Time 5 |
| Service 2 | Monitor n2 | Schedulable | Time 6 |
| Service N | Monitor 1 | Non-Schedulable | Time 7 |
| Service N | Monitor 2 | Non-Schedulable | Time 8 |
| Service N | Monitor nN | Schedulable | Time 9 |

Table 700

FIG. 7B

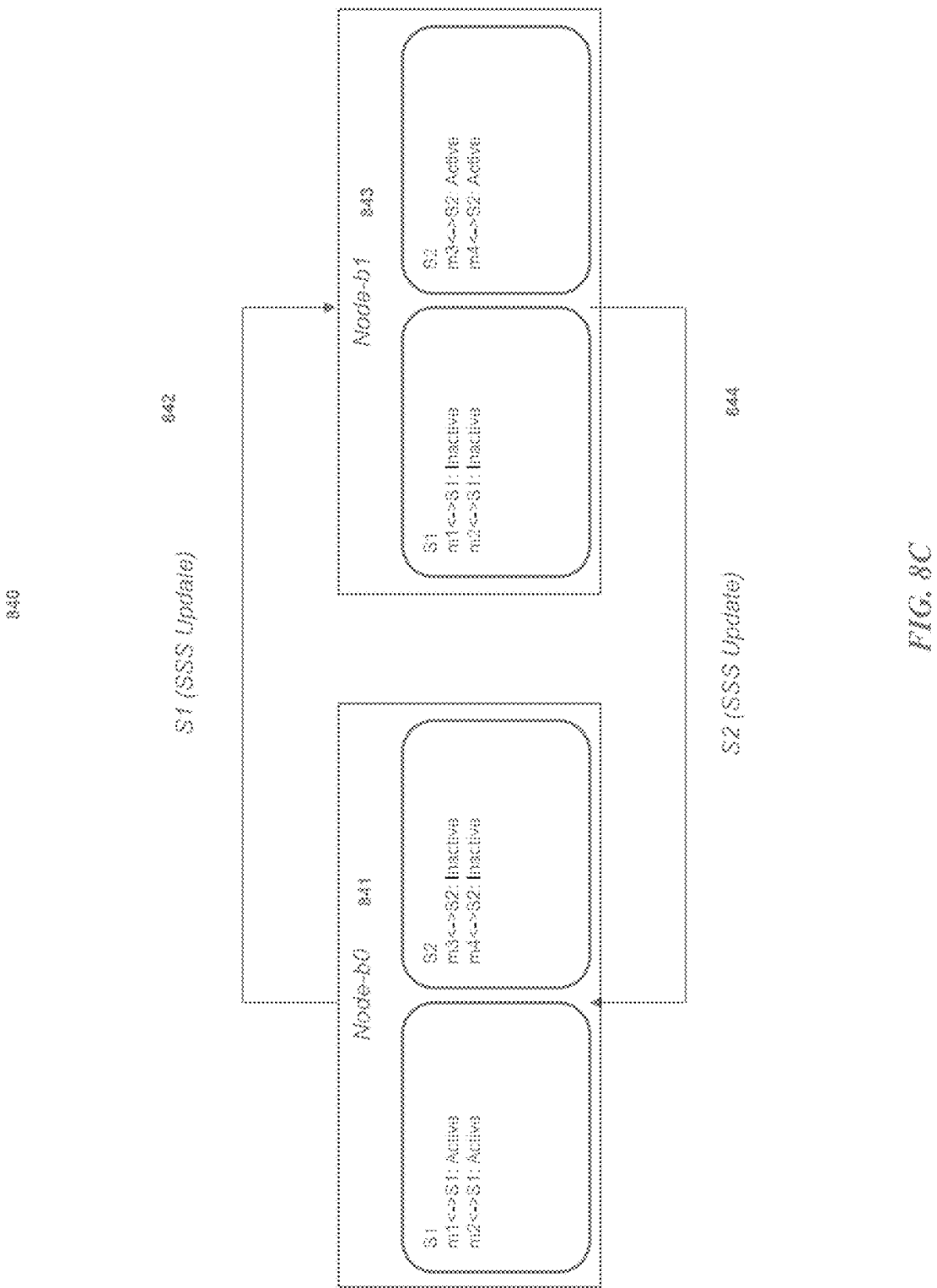

| Application | Identifier | Service Name | Monitor Name |
|---|---|---|---|
| Application 1 | dev_number 1 | Service 1 | Monitor 1 |
| Application 2 | dev_number 2 | Service 1 | Monitor 1 |
| Application 3 | dev_number 3 | Service 1 | Monitor 1 |
| Application 2 | dev_number 2 | Service 2 | Monitor 2 |
| Application 3 | dev_number 3 | Service 2 | Monitor 2 |
| Application 4 | dev_number 4 | Service 2 | Monitor 2 |
| Application 3 | dev_number 3 | Service 3 | Monitor 3 |
| Application 4 | dev_number 4 | Service 3 | Monitor 3 |
| Application 5 | dev_number 5 | Service 3 | Monitor 3 |
| Application n | dev_number n | Service n | Monitor n |

Table 1030

*FIG. 10B*

SYSTEMS AND METHODS FOR APPLICATION SPECIFIC LOAD BALANCING

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD

The present application generally relates to data communication networks. In particular, the present application relates to systems and methods for application specific load balancing.

BACKGROUND

Load balancing is a method for distributing workloads across multiple computing resources and these resources typically have the same characteristics. For example, in application load balancing among servers, servers typically have the same set of applications and are homogenous in terms of application availability. In performing load balancing among one or more servers executing a plurality of services, any differences in the types of applications available on the one or more servers can cause challenges.

BRIEF SUMMARY

The present application is directed towards systems and methods for application specific load balancing among servers. The systems and methods described herein allow for servers to be load balanced despite differences in terms of application and application availability. The systems and methods load balance client requests for applications based on application availability on one or more servers. In one aspect, the method includes receiving, by a device intermediary to a plurality of clients and a plurality of services executing on a plurality of servers, a request from a client for an application. The device may identify an identifier for the application from a table comprising a list of applications and a corresponding identifier assigned to each application. The method further includes determining, by the device using the identifier, that one or more services of the plurality of services provide the application and selecting a service from the one or more services to forward the request. The method further includes forwarding, by the device, the request to the selected service.

In some embodiments, the method includes establishing, by the device, one or more monitors to monitor each service to identify applications available on each service. The device may maintain, responsive to monitoring by the one or more monitors, the list of applications in the table available for each service. In an embodiment, the method may include querying, by the device using the identifier, a second table comprising a list of identifiers available for each service. The device may determine that the one or more services are identified in the second table with the identifier corresponding to the application. In some embodiments, the method includes selecting, by the device, the service that is determined to be available. The method may further include determining, by the device, that a monitor is enabled for the service and the service has the application.

In another aspect, the method may include establishing, by a device intermediary to a plurality of clients and a plurality of services executing on a plurality of servers, one or more monitors to monitor each service to determine applications available on each service. The device may determine a number of applications available on each service and assign an identifier to each application available via the plurality of services. The method further includes maintaining, by the device responsive to monitoring, a table comprising identification of each service of the plurality of services and a list of identifiers corresponding to each application available via each service.

In some embodiments, the method includes receiving, by the device, responses from probes of the one or more responses. The monitor responses may indicate applications available on the respective service. In an embodiment, the device may establish a second table comprising a list of applications and corresponding identifiers assigned to each application in the list of applications. In some embodiments, the device may compare responsive to monitoring, the list of identifiers available for each service in the table and update the table responsive to the comparison. In an embodiment, the device may receive a request from a client for an application. The device may identify the identifier for the application and determining using the identifier via the table, that one or more services of the plurality of services provide the application. In some embodiments, the device may select a service from the one or more services to forward the request and forwarding, by the device, the request to the selected service.

In another aspect, the present disclosure is directed towards a system for application specific load balancing. The system includes a device intermediary to a plurality of client and a plurality of services executing on a plurality of servers. In an embodiment, the device can be configured to receive a request from a client for an application and identify an identifier for the application from a table comprising a list of applications and a corresponding identifier assigned to each application. The device can further be configured to determine, using the identifier, that one or more services of the plurality of services provides the application and select a service from the one or more services to forward the request. The device may be configured to forward the request to the selected service.

In some embodiments, the device can be configured to establish one or more monitors to monitor each service to identify applications available on each service. The device may be configured to maintain, responsive to monitoring by the one or more monitors, the list of applications in the table available for each service. In an embodiment, the device can be further configured to query using the identifier, a second table comprising a list of identifiers available for each service. The device may be configured to determine that the one or more services are identified in the second table with the identifier corresponding to the application. In some embodiments, the device may be configured to select the service that is determined to be available.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 1D is a block diagram of another embodiment of an environment for delivering a computing environment from a server to a client via an appliance.

FIG. 7B is a block diagram of an embodiment of a table on a core used for monitoring in a multi-core system.

FIG. 8C is an illustrative diagram of a method for monitoring in a cluster system.

FIG. 10B is a block diagram of an embodiment of a table used for load-balancing among web servers.

Figure 1A:
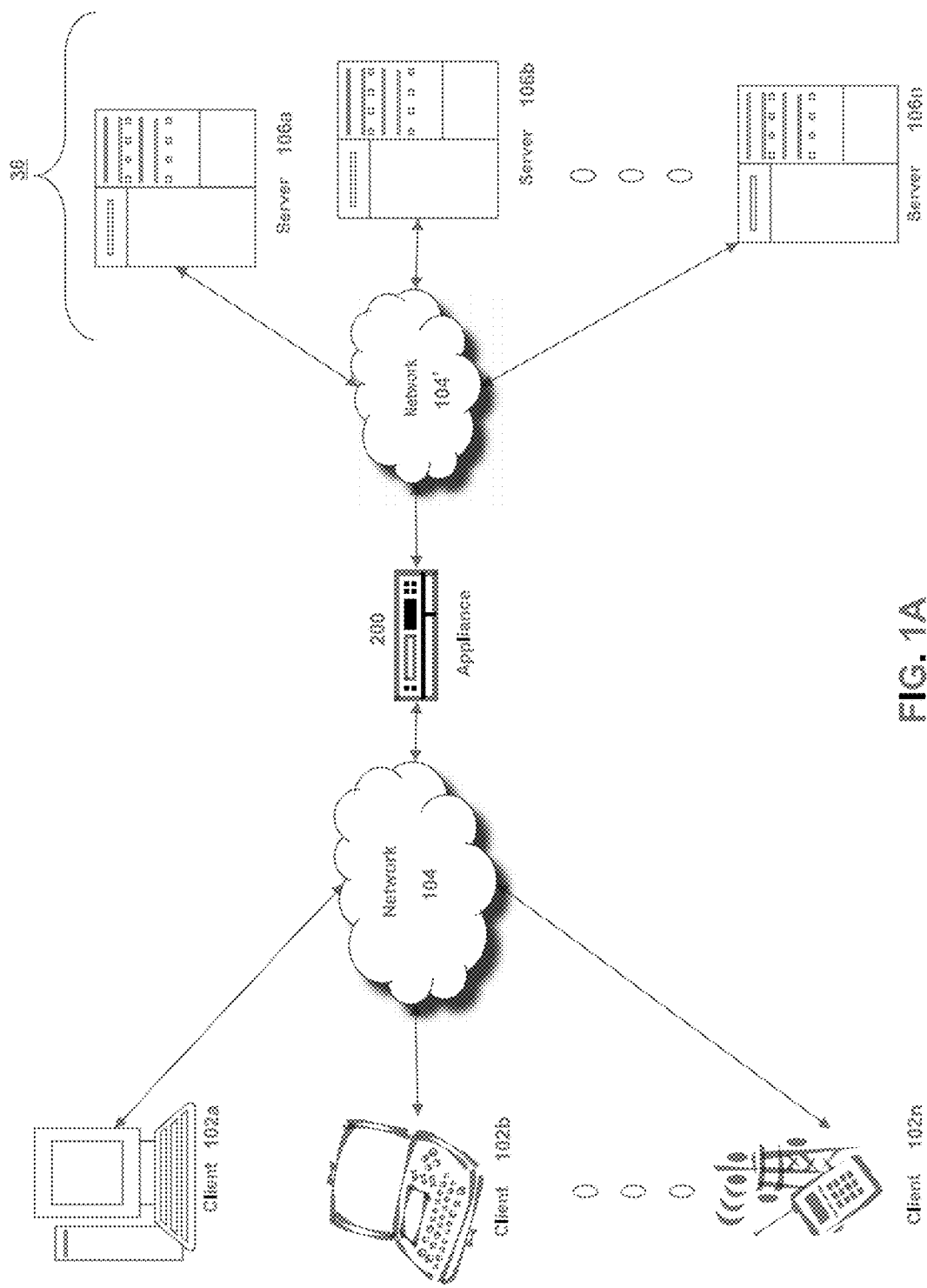
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for delivering a computing environment to a remote user.

Section C describes embodiments of systems and methods for accelerating communications between a client and a server.

Section D describes embodiments of systems and methods for virtualizing an application delivery controller.

Section E describes embodiments of systems and methods for providing a multi-core architecture and environment.

Section F describes embodiments of systems and methods for providing a clustered appliance architecture environment.

Section G describes embodiments of systems and methods for monitoring in a multi-core system.

Section H describes embodiments of systems and methods for monitoring in a cluster system.

Section I describes embodiments of systems and methods for application specific load-balancing.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
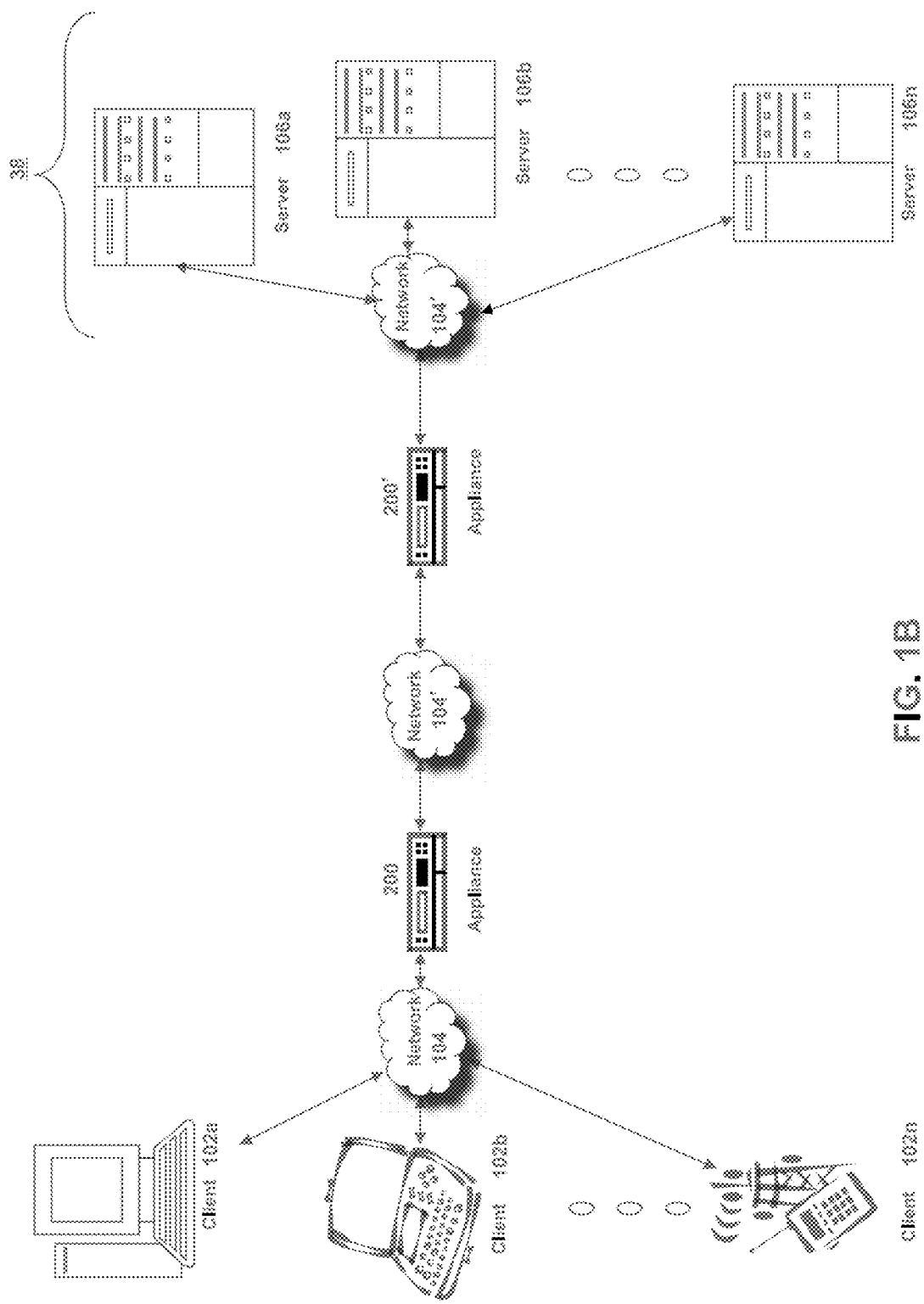
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server.

Figure 1C:
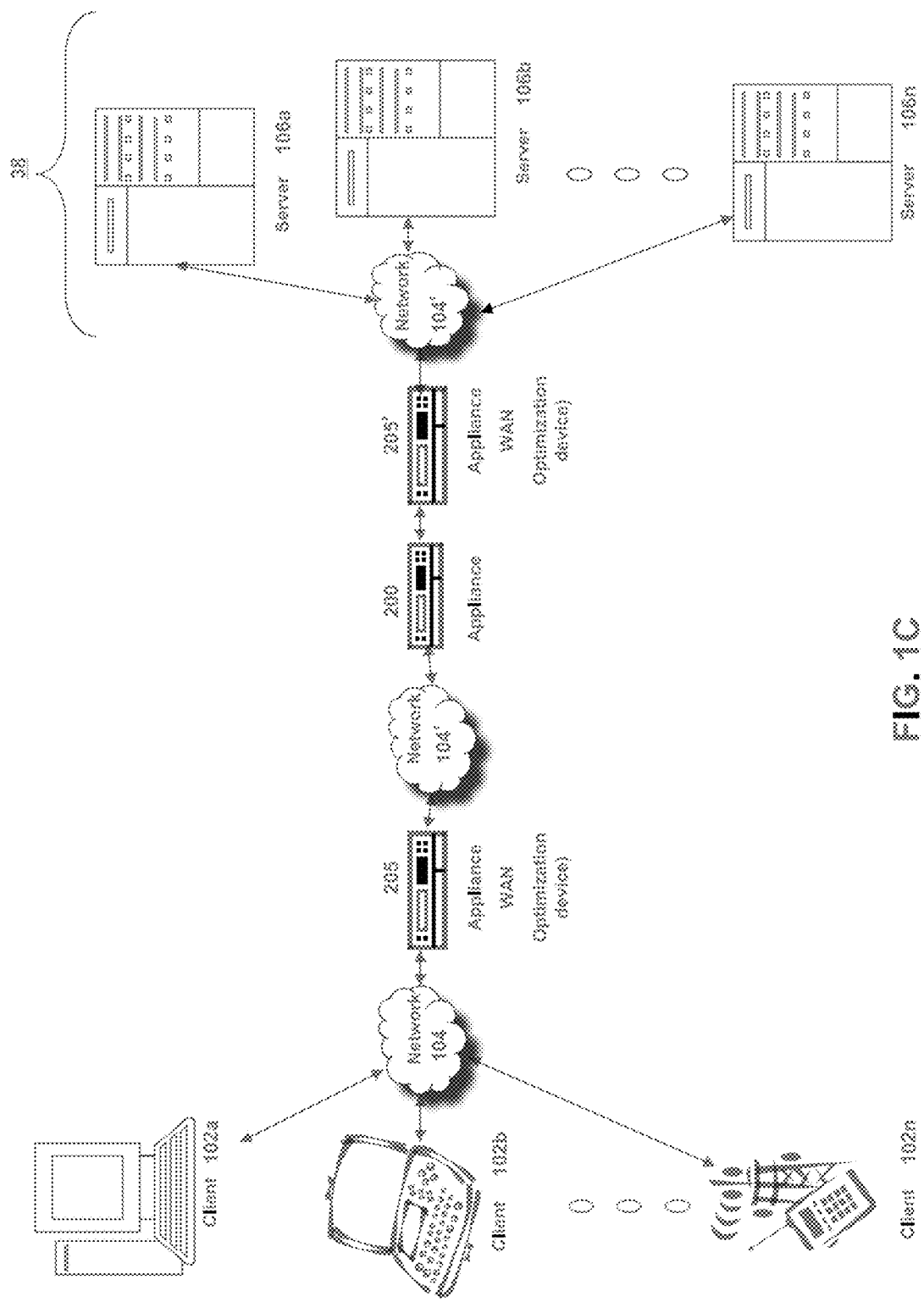
FIG. 1C is a block diagram of another embodiment of an environment for delivering a computing environment from a server to a client via an appliance.

Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38.'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as Lansdale manufactured by Citrix Systems, Inc. of Ft. Lauderdale, Fla. In other embodiments, the appliance 205 includes any of the product embodiments referred to as BIG-IP link controller and WAN jet manufactured by F5 Networks, Inc. of Seattle, Wash. In another embodiment, the appliance 205 includes any of the WAX and WACO WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Picketer Inc. of Cupertino, Calif., such as the Packet Shaper, shared, and Sky product embodiments provided by Picketer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFTS). In another embodiment, the appliance 205 accelerates the delivery of files, such as via the Common Internet File System (COIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
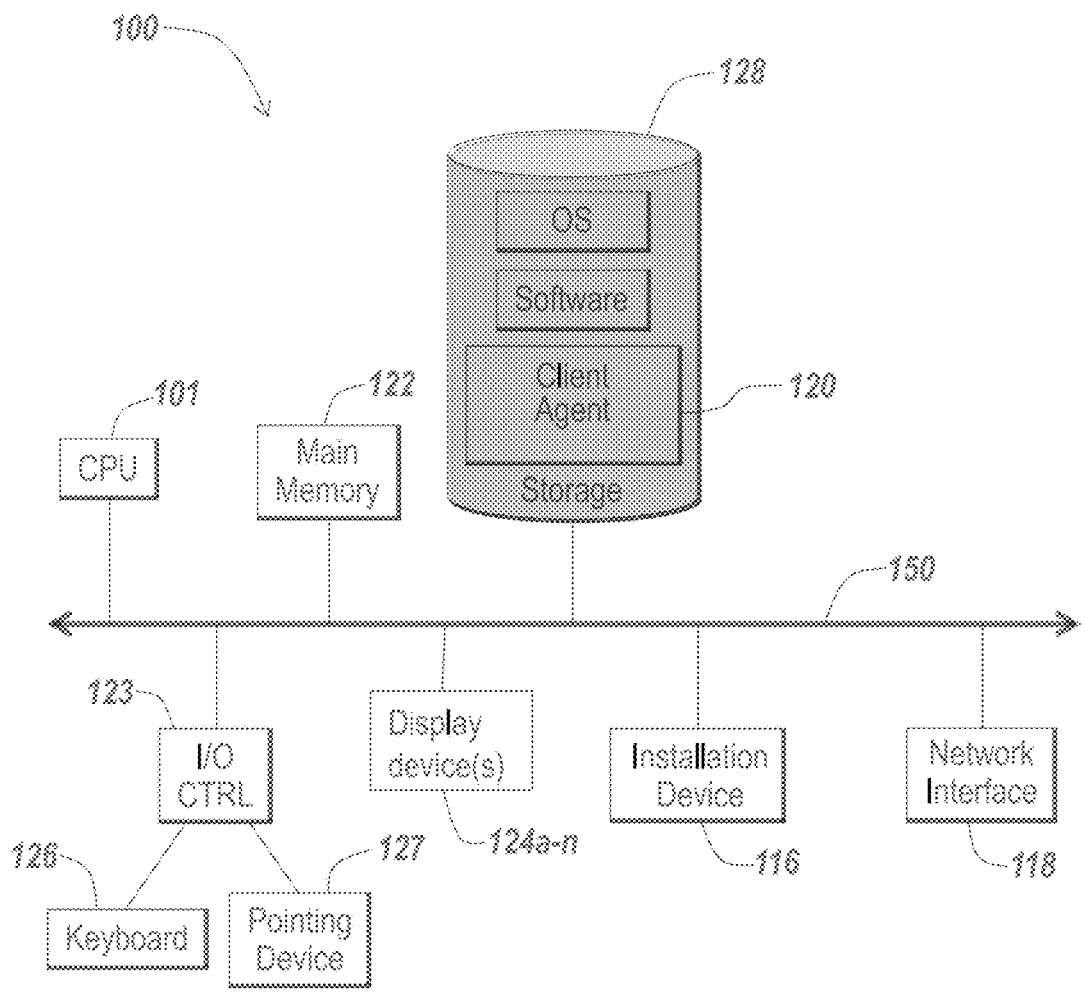
FIGS. 1E-1H are block diagrams of embodiments of a computing device.
Figure 1F:
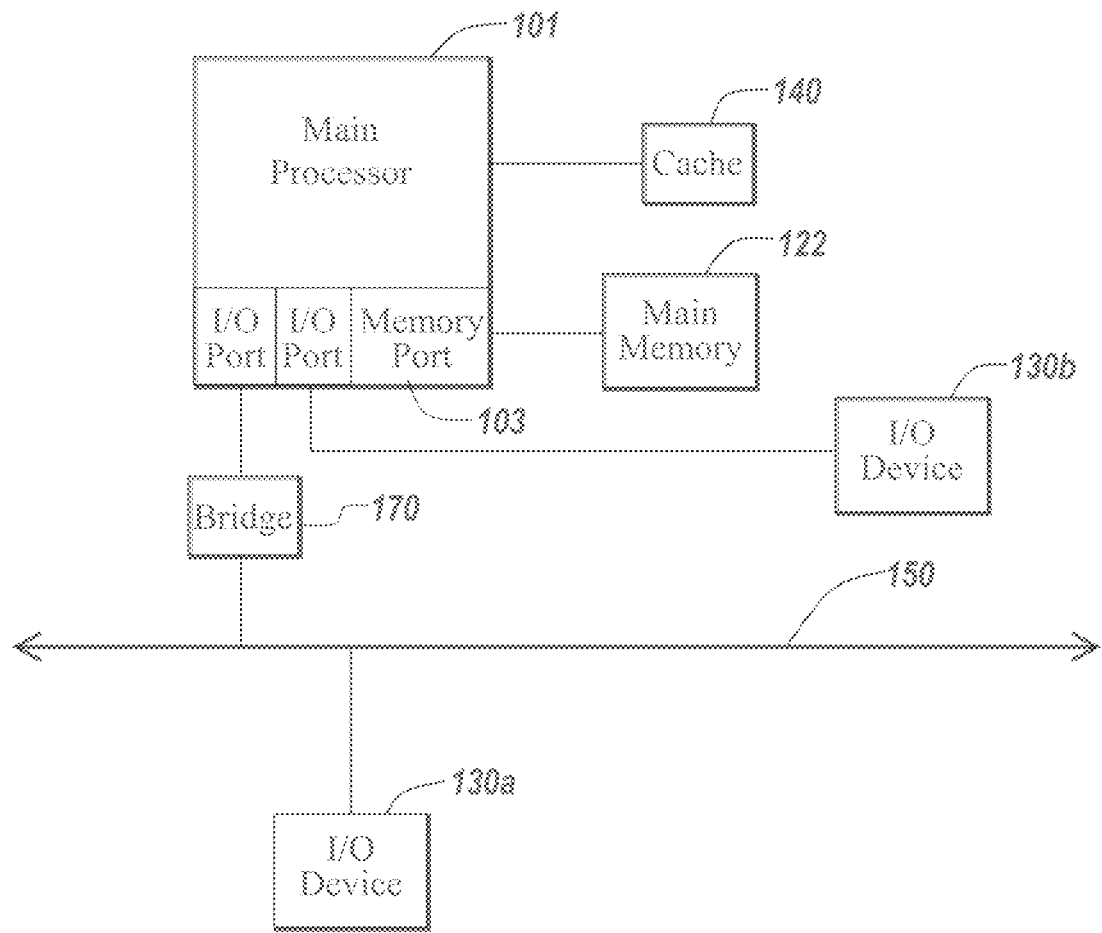

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130*b* via HyperTransport, Rapid I/O, or InfiniBand. FIG. 1F also depicts an embodiment in which local busses and direct communication are mixed: the processor 101 communicates with I/O device 130*b* using a local interconnect bus while communicating with I/O device 130*a* directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
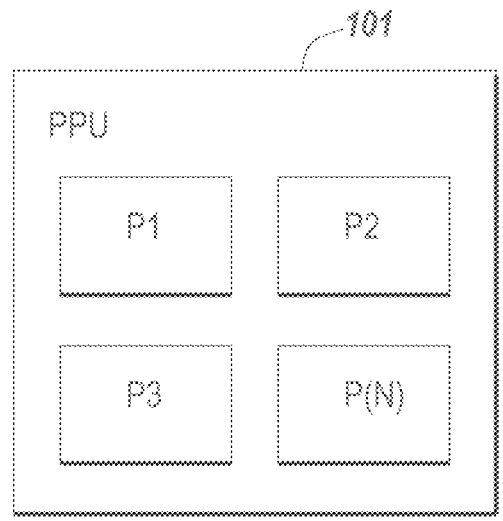

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
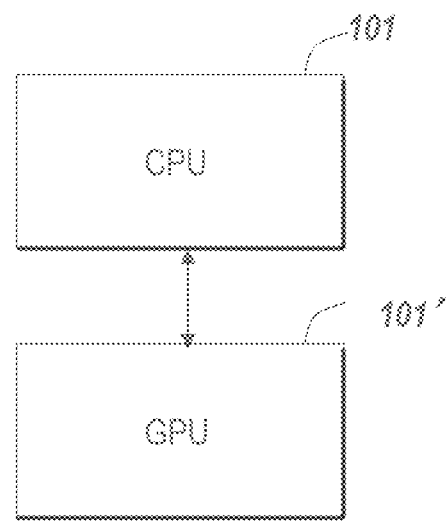

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
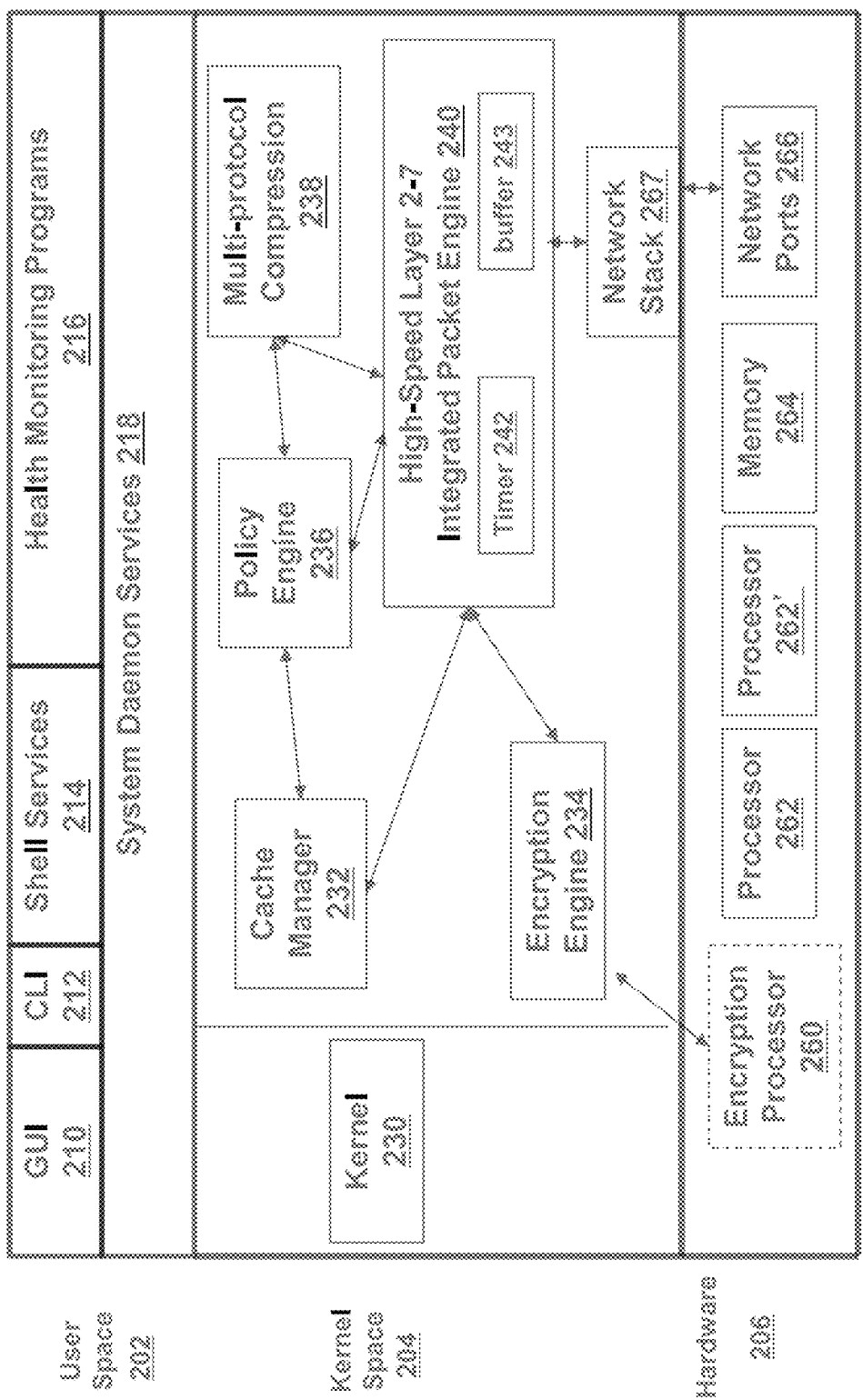
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, S A P and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
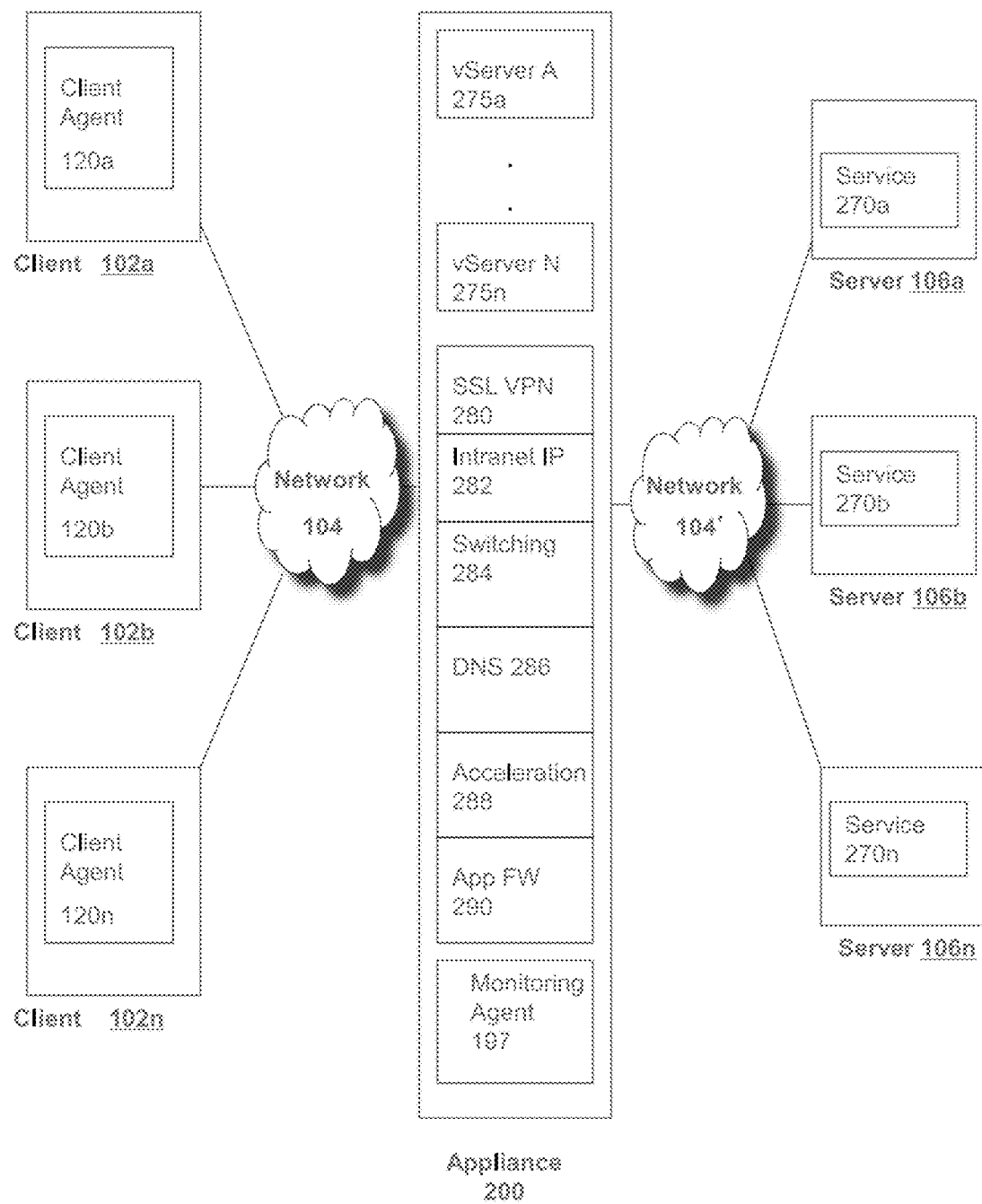
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 2B. In one embodiment, the appliance 200 receives the monitoring agent 197 from the monitoring service 198 or monitoring server 106 as depicted in FIG. 2B. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C Client Agent

Figure 3:
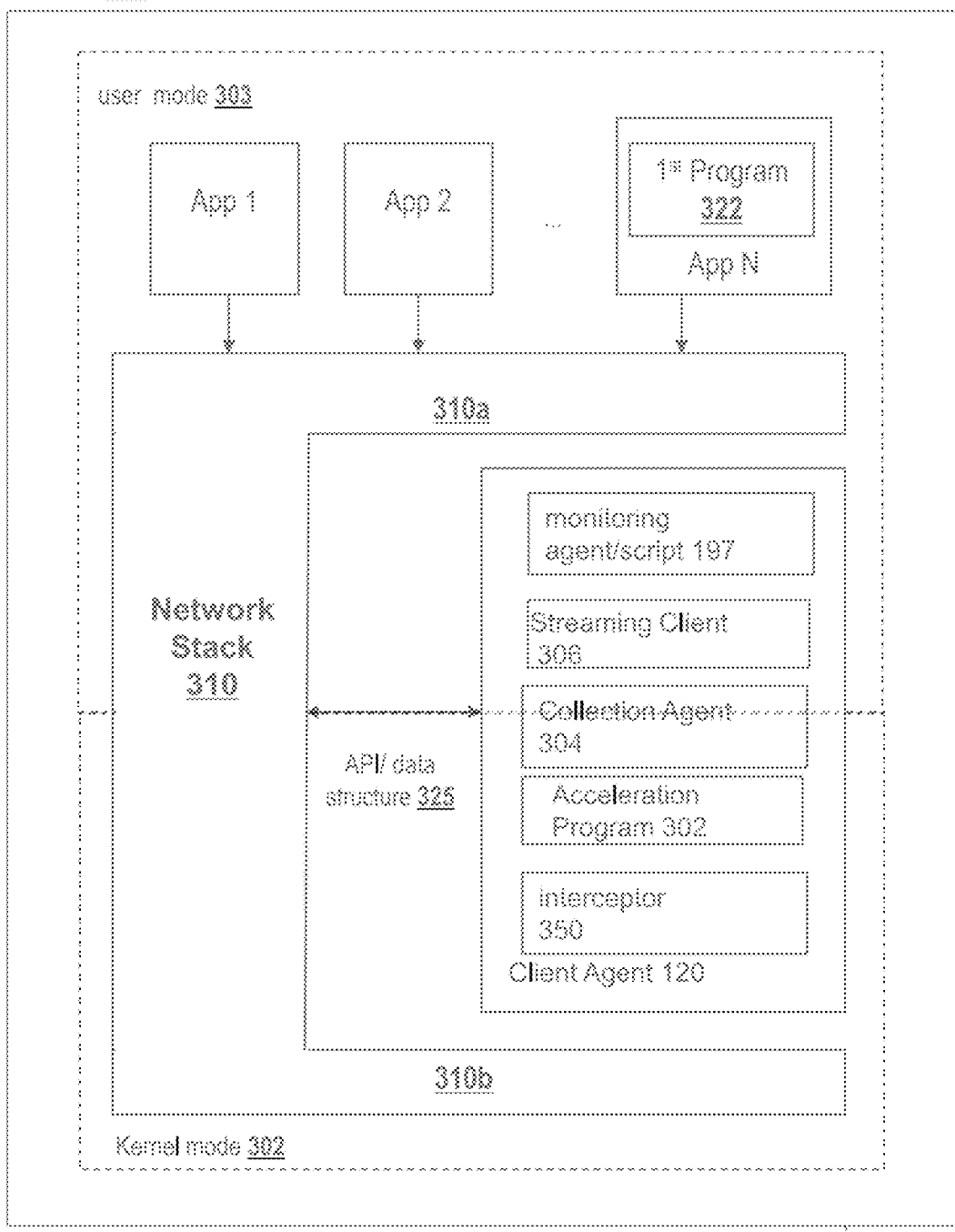
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system and/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
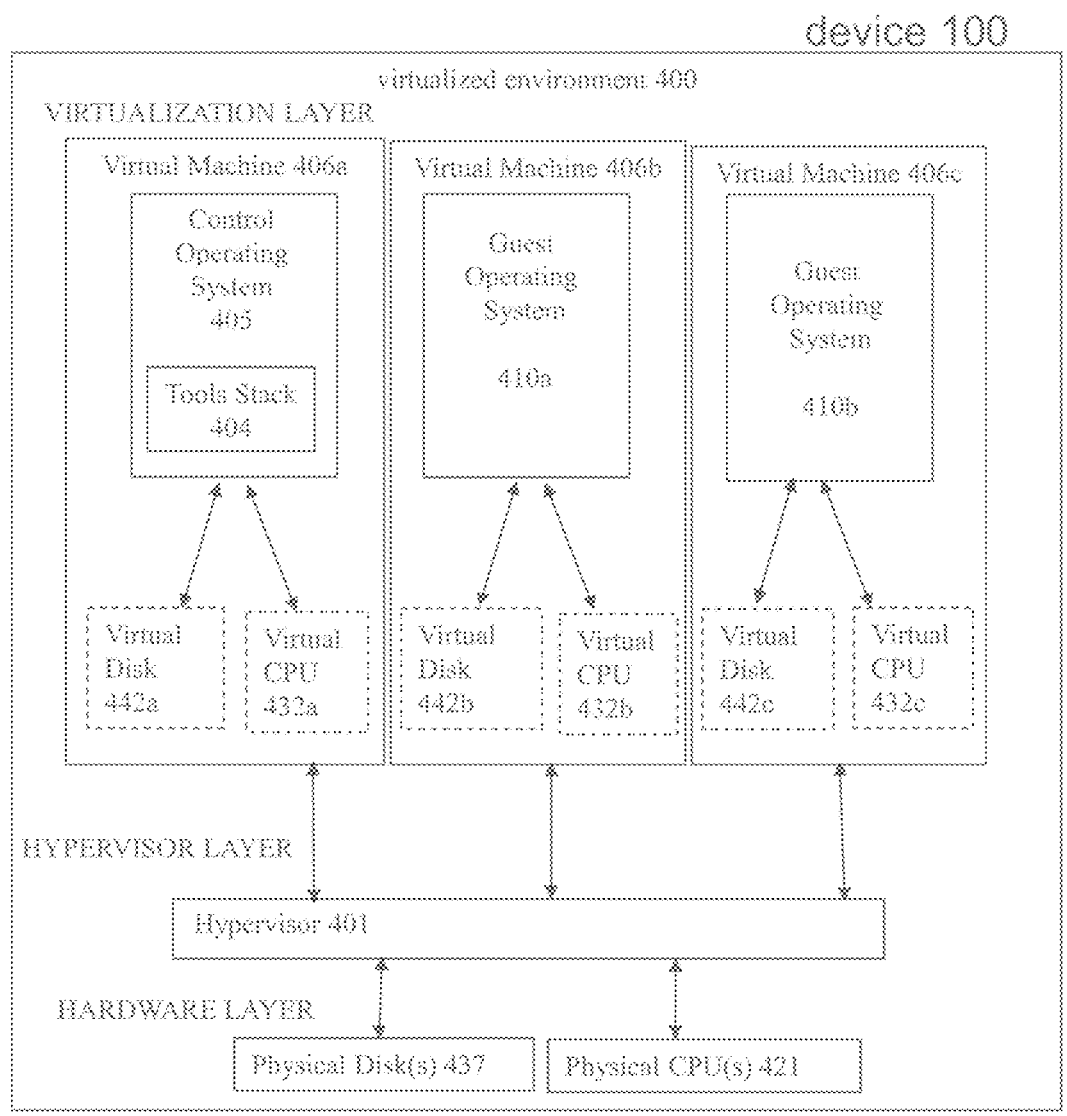
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
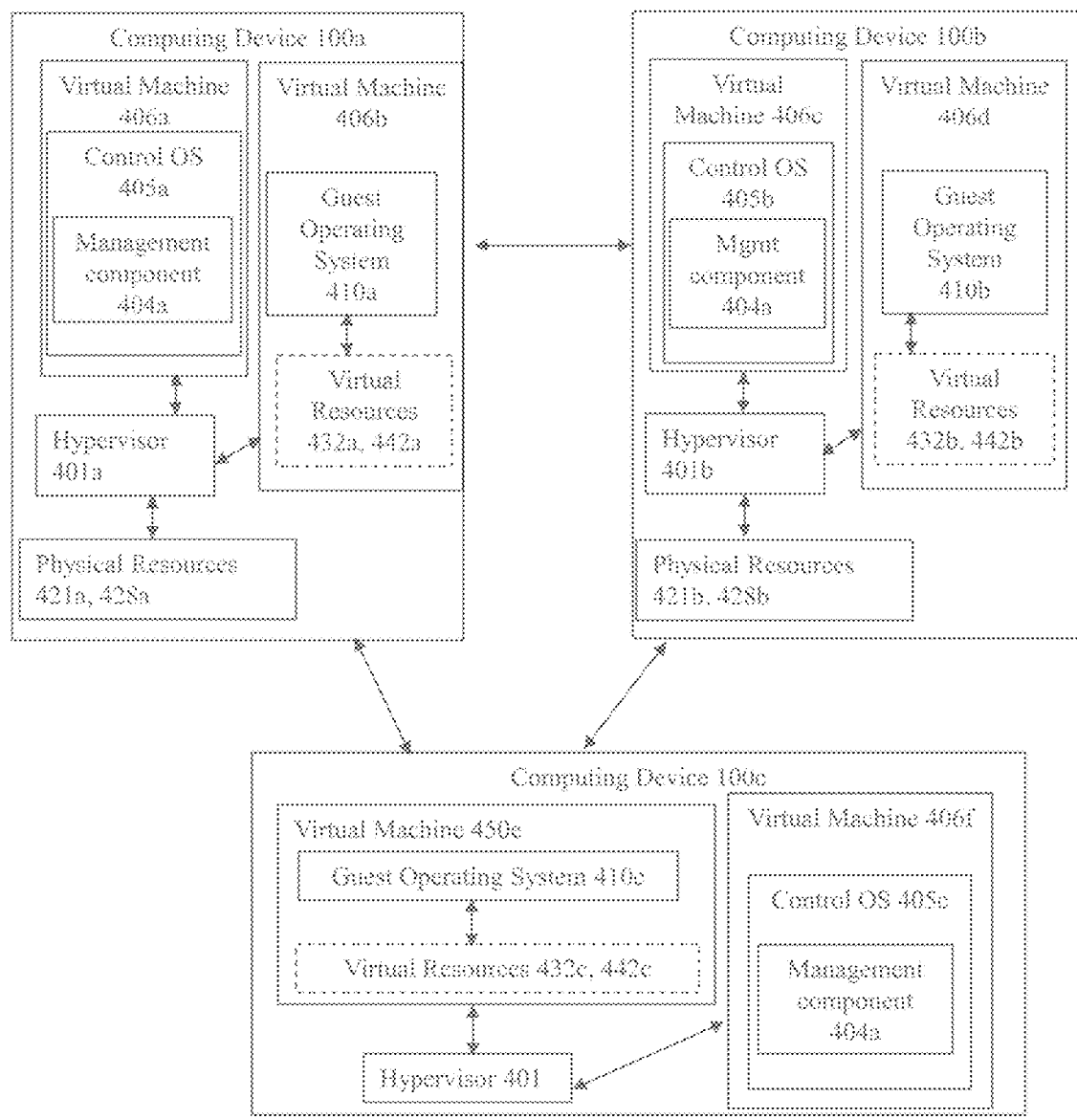
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
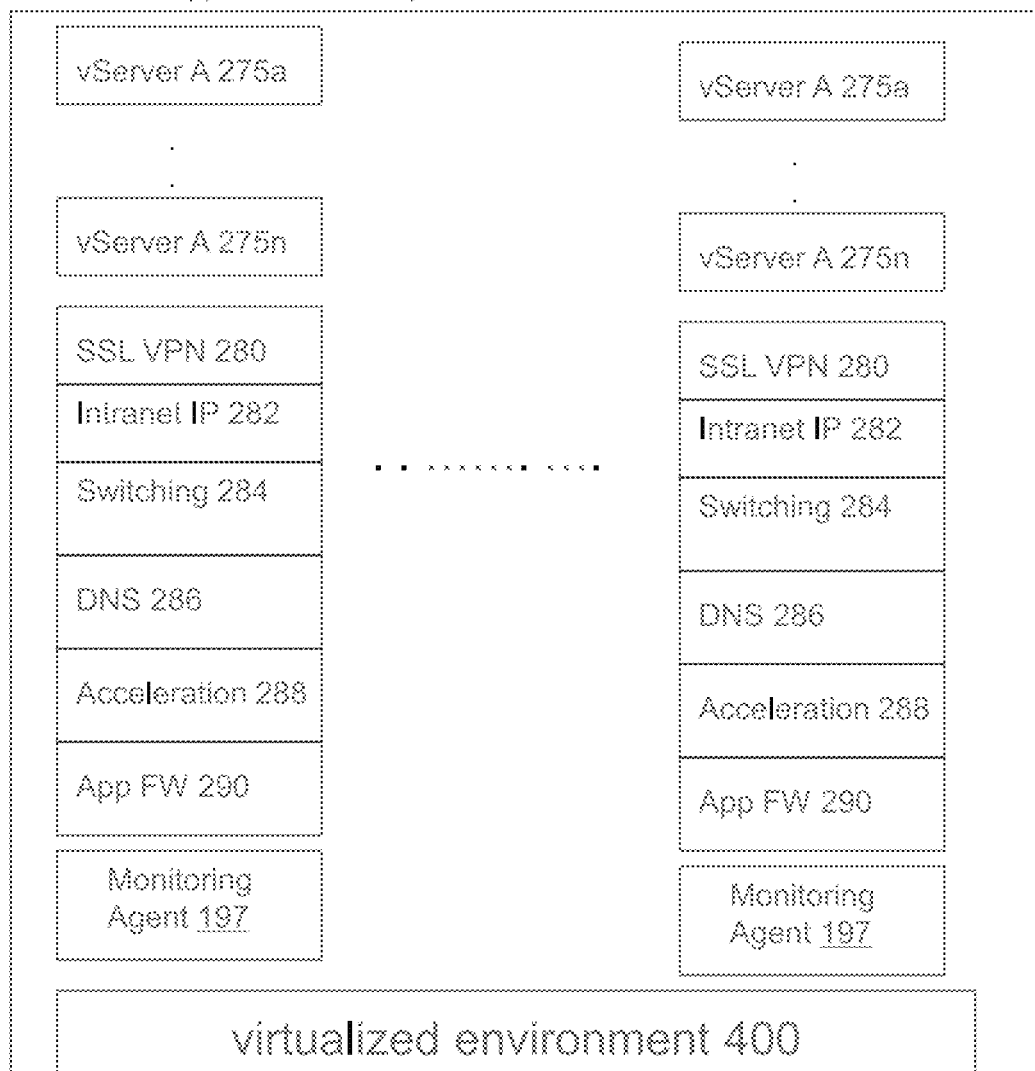
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
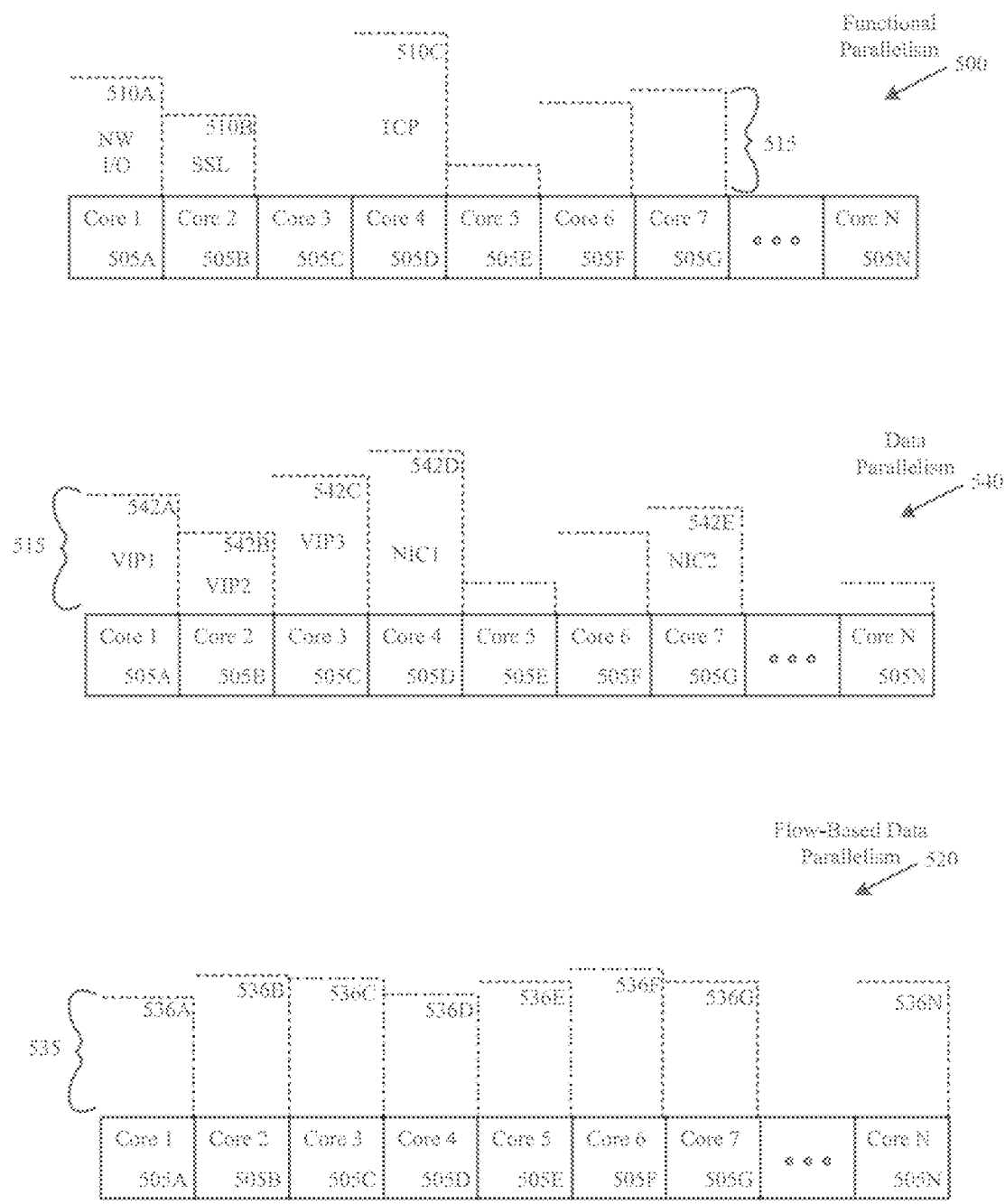
FIG. 5A are block diagrams of embodiments of approaches to implementing parallelism in a multi-core system.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
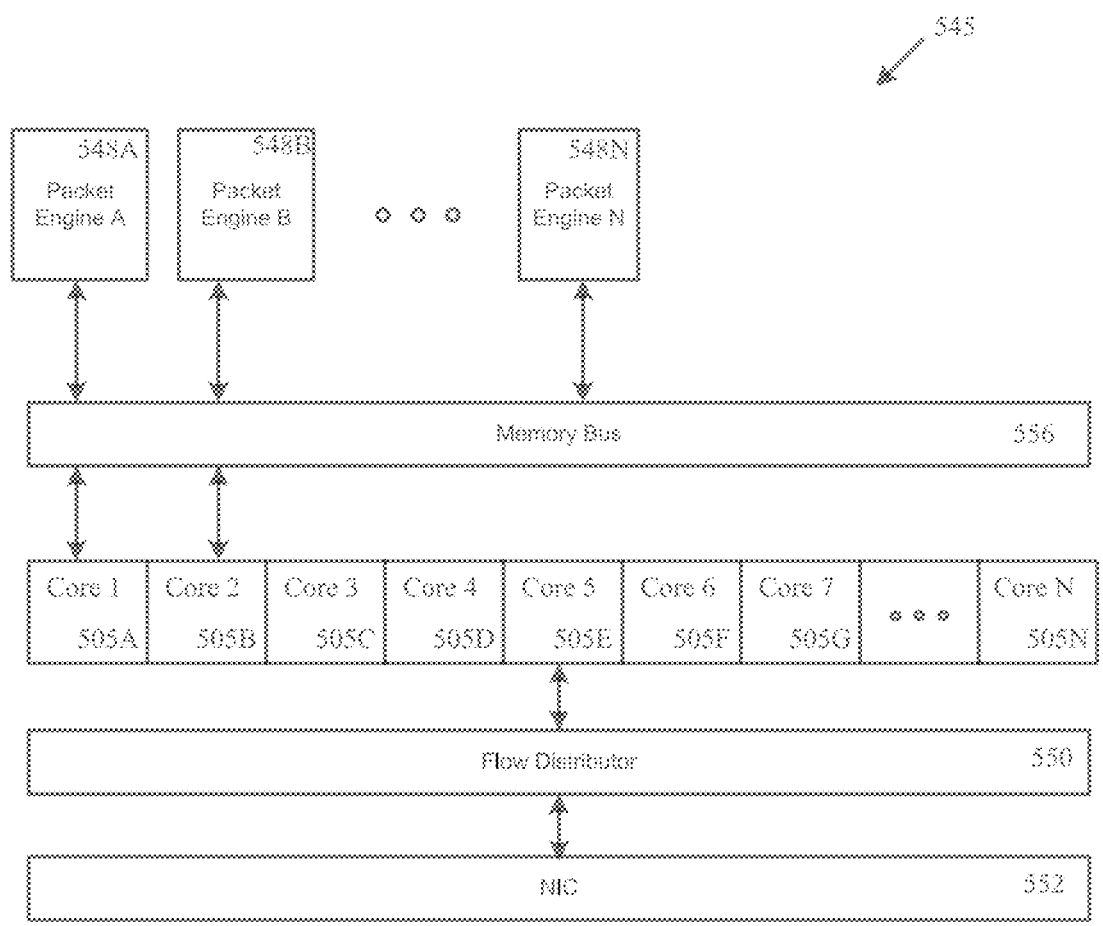
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one or more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/or manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

4-tuple of source TCP Port, source IP version 4 (IPv4) address, destination TCP Port, and destination IPv4 address.

4-tuple of source TCP Port, source IP version 6 (IPv6) address, destination TCP Port, and destination IPv6 address.

2-tuple of source IPv4 address, and destination IPv4 address.

2-tuple of source IPv6 address, and destination IPv6 address.

2-tuple of source IPv6 address, and destination IPv6 address, including support for parsing IPv6 extension headers.

The hash result or any portion thereof may be used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
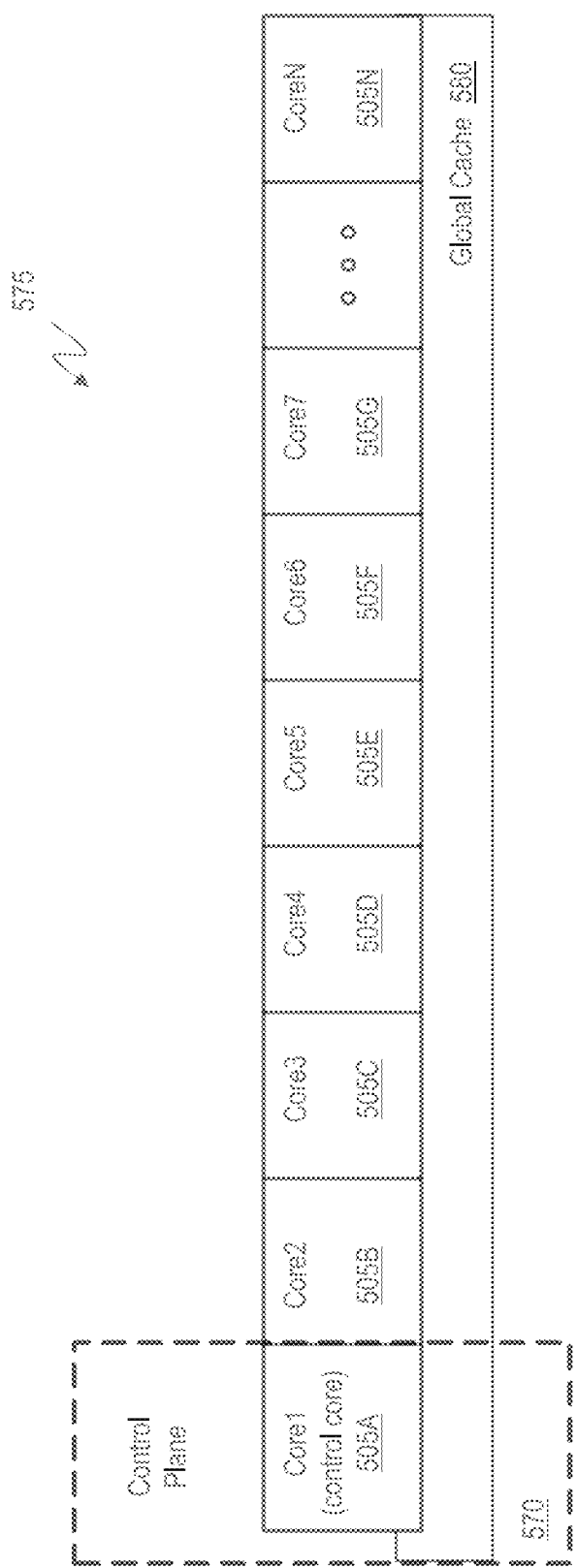
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Providing a Distributed Cluster Architecture

As discussed in the previous section, to overcome limitations on transistor spacing and CPU speed increases, many CPU manufacturers have incorporated multi-core CPUs to improve performance beyond that capable of even a single, higher speed CPU. Similar or further performance gains may be made by operating a plurality of appliances, either single or multi-core, together as a distributed or clustered appliance. Individual computing devices or appliances may be referred to as nodes of the cluster. A centralized management system may perform load balancing, distribution, configuration, or other tasks to allow the nodes to operate in conjunction as a single computing system. Externally or to other devices, including servers and clients, in many embodiments, the cluster may be viewed as a single virtual appliance or computing device, albeit one with performance exceeding that of a typical individual appliance.

Figure 6:
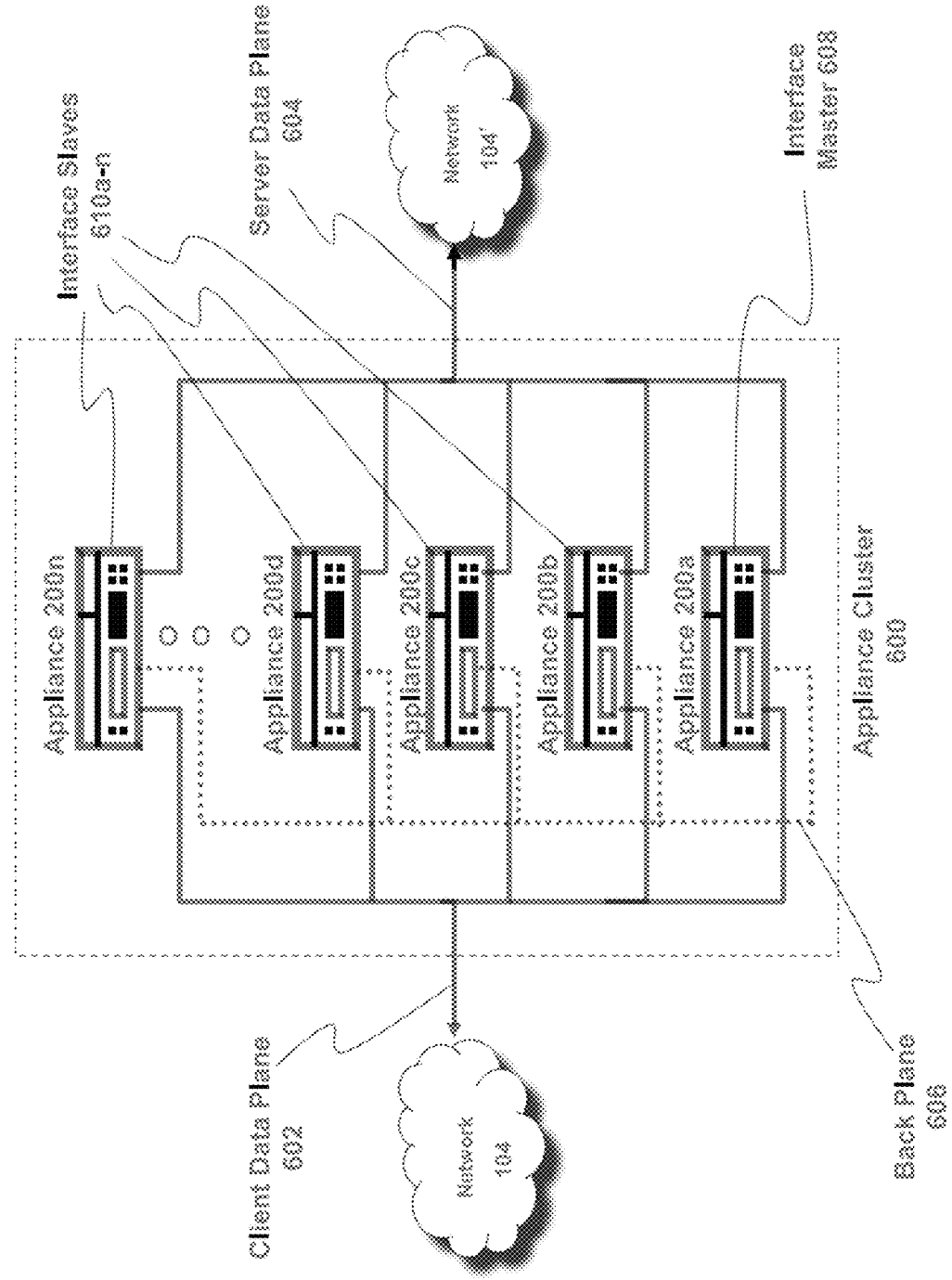
FIG. 6 is a block diagram of an embodiment of a cluster system.

Referring now to FIG. 6, illustrated is an embodiment of a computing device cluster or appliance cluster 600. A plurality of appliances 200a-200n or other computing devices, sometimes referred to as nodes, such as desktop computers, servers, rackmount servers, blade servers, or any other type and form of computing device may be joined into a single appliance cluster 600. Although referred to as an appliance cluster, in many embodiments, the cluster may operate as an application server, network storage server, backup service, or any other type of computing device without limitation. In many embodiments, the appliance cluster 600 may be used to perform many of the functions of appliances 200, WAN optimization devices, network acceleration devices, or other devices discussed above.

In some embodiments, the appliance cluster 600 may comprise a homogenous set of computing devices, such as identical appliances, blade servers within one or more chassis, desktop or rackmount computing devices, or other devices. In other embodiments, the appliance cluster 600 may comprise a heterogeneous or mixed set of devices, including different models of appliances, mixed appliances and servers, or any other set of computing devices. This may allow for an appliance cluster 600 to be expanded or upgraded over time with new models or devices, for example.

In some embodiments, each computing device or appliance 200 of an appliance cluster 600 may comprise a multi-core appliance, as discussed above. In many such embodiments, the core management and flow distribution methods discussed above may be utilized by each individual appliance, in addition to the node management and distribution methods discussed herein. This may be thought of as a two-tier distributed system, with one appliance comprising and distributing data to multiple nodes, and each node comprising and distributing data for processing to multiple cores. Accordingly, in such embodiments, the node distribution system need not manage flow distribution to individual cores, as that may be taken care of by a master or control core as discussed above.

In many embodiments, an appliance cluster 600 may be physically grouped, such as a plurality of blade servers in a chassis or plurality of rackmount devices in a single rack, but in other embodiments, the appliance cluster 600 may be distributed in a plurality of chassis, plurality of racks, plurality of rooms in a data center, plurality of data centers, or any other physical arrangement. Accordingly, the appliance cluster 600 may be considered a virtual appliance, grouped via common configuration, management, and purpose, rather than a physical group.

In some embodiments, an appliance cluster 600 may be connected to one or more networks 104, 104'. For example, referring briefly back to FIG. 1A, in some embodiments, an appliance 200 may be deployed between a network 104 joined to one or more clients 102, and a network 104' joined to one or more servers 106. An appliance cluster 600 may be similarly deployed to operate as a single appliance. In many embodiments, this may not require any network topology changes external to appliance cluster 600, allowing for ease of installation and scalability from a single appliance scenario. In other embodiments, an appliance cluster 600 may be similarly deployed as shown in FIGS. 1B-2B or discussed above. In still other embodiments, an appliance cluster may comprise a plurality of virtual machines or processes executed by one or more servers. For example, in one such embodiment, a server farm may execute a plurality of virtual machines, each virtual machine configured as an appliance 200, and a plurality of the virtual machines acting in concert as an appliance cluster 600. In yet still other embodiments, an appliance cluster 600 may comprise a mix of appliances 200 or virtual machines configured as appliances 200. In some embodiments, appliance cluster 600 may be geographically distributed, with the plurality of appliances 200 not co-located. For example, referring back to FIG. 6, in one such embodiment, a first appliance 200a may be located at a first site, such as a data center and a second appliance 200b may be located at a second site, such as a central office or corporate headquarters. In a further embodiment, such geographically remote appliances may be joined by a dedicated network, such as a T1 or T3 point-to-point connection; a VPN; or any other type and form of network. Accordingly, although there may be additional communications latency compared to co-located appliances 200a-200b, there may be advantages in reliability in case of site power failures or communications outages, scalability, or other benefits. In some embodiments, latency issues may be reduced through geographic or network-based distribution of data flows. For example, although configured as an appliance cluster 600, communications from clients and servers at the corporate headquarters may be directed to the appliance 200b deployed at the site, load balancing may be weighted by location, or similar steps can be taken to mitigate any latency.

Still referring to FIG. 6, an appliance cluster 600 may be connected to a network via a client data plane 602. In some embodiments, client data plane 602 may comprise a communication network, such as a network 104, carrying data between clients and appliance cluster 600. In some embodiments, client data plane 602 may comprise a switch, hub, router, or other network devices bridging an external network 104 and the plurality of appliances 200a-200n of the appliance cluster 600. For example, in one such embodiment, a router may be connected to an external network 104, and connected to a network interface of each appliance 200a-200n. In some embodiments, this router or switch may be referred to as an interface manager, and may further be configured to distribute traffic evenly across the nodes in the application cluster 600. Thus, in many embodiments, the interface master may comprise a flow distributor external to appliance cluster 600. In other embodiments, the interface master may comprise one of appliances 200a-200n. For example, a first appliance 200a may serve as the interface master, receiving incoming traffic for the appliance cluster 600 and distributing the traffic across each of appliances 200b-200n. In some embodiments, return traffic may similarly flow from each of appliances 200b-200n via the first appliance 200a serving as the interface master. In other embodiments, return traffic from each of appliances 200b-200n may be transmitted directly to a network 104, 104', or via an external router, switch, or other device. In some embodiments, appliances 200 of the appliance cluster not serving as an interface master may be referred to as interface slaves.

The interface master may perform load balancing or traffic flow distribution in any of a variety of ways. For example, in some embodiments, the interface master may comprise a router performing equal-cost multi-path (ECMP) routing with next hops configured with appliances or nodes of the cluster. The interface master may use an open-shortest path first (OSPF) In some embodiments, the interface master may use a stateless hash-based mechanism for traffic distribution, such as hashes based on IP address or other packet information tuples, as discussed above. Hash keys and/or salt may be selected for even distribution across the nodes. In other embodiments, the interface master may perform flow distribution via link aggregation (LAG) protocols, or any other type and form of flow distribution, load balancing, and routing.

In some embodiments, the appliance cluster 600 may be connected to a network via a server data plane 604. Similar to client data plane 602, server data plane 604 may comprise a communication network, such as a network 104', carrying data between servers and appliance cluster 600. In some embodiments, server data plane 604 may comprise a switch, hub, router, or other network devices bridging an external network 104' and the plurality of appliances 200a-200n of the appliance cluster 600. For example, in one such embodiment, a router may be connected to an external network 104', and connected to a network interface of each appliance 200a-200n. In many embodiments, each appliance 200a-200n may comprise multiple network interfaces, with a first network interface connected to client data plane 602 and a second network interface connected to server data plane 604. This may provide additional security and prevent direct interface of client and server networks by having appliance cluster 600 server as an intermediary device. In other embodiments, client data plane 602 and server data plane 604 may be merged or combined. For example, appliance cluster 600 may be deployed as a non-intermediary node on a network with clients 102 and servers 106. As discussed above, in many embodiments, an interface master may be deployed on the server data plane 604, for routing and distributing communications from the servers and network 104' to each appliance of the appliance cluster. In many embodiments, an interface master for client data plane 602 and an interface master for server data plane 604 may be similarly configured, performing ECMP or LAG protocols as discussed above.

In some embodiments, each appliance 200a-200n in appliance cluster 600 may be connected via an internal communication network or back plane 606. Back plane 606 may comprise a communication network for inter-node or inter-appliance control and configuration messages, and for inter-node forwarding of traffic. For example, in one embodiment in which a first appliance 200a communicates with a client via network 104, and a second appliance 200b communicates with a server via network 104', communications between the client and server may flow from client to first appliance, from first appliance to second appliance via back plane 606, and from second appliance to server, and vice versa. In other embodiments, back plane 606 may carry configuration messages, such as interface pause or reset commands; policy updates such as filtering or compression policies; status messages such as buffer status, throughput, or error messages; or any other type and form of inter-node communication. In some embodiments, RSS keys or hash keys may be shared by all nodes in the cluster, and may be communicated via back plane 606. For example, a first node or master node may select an RSS key, such as at startup or boot, and may distribute this key for use by other nodes. In some embodiments, back plane 606 may comprise a network between network interfaces of each appliance 200, and may comprise a router, switch, or other network device (not illustrated). Thus, in some embodiments and as discussed above, a router for client data plane 602 may be deployed between appliance cluster 600 and network 104, a router for server data plane 604 may be deployed between appliance cluster 600 and network 104', and a router for back plane 606 may be deployed as part of appliance cluster 600. Each router may connect to a different network interface of each appliance 200. In other embodiments, one or more planes 602-606 may be combined, or a router or switch may be split into multiple LANs or VLANs to connect to different interfaces of appliances 200a-200n and serve multiple routing functions simultaneously, to reduce complexity or eliminate extra devices from the system.

In some embodiments, a control plane (not illustrated) may communicate configuration and control traffic from an administrator or user to the appliance cluster 600. In some embodiments, the control plane may be a fourth physical network, while in other embodiments, the control plane may comprise a VPN, tunnel, or communication via one of planes 602-606. Thus, the control plane may, in some embodiments, be considered a virtual communication plane. In other embodiments, an administrator may provide configuration and control through a separate interface, such as a serial communication interface such as RS-232; a USB communication interface; or any other type and form of communication. In some embodiments, an appliance 200 may comprise an interface for administration, such as a front panel with buttons and a display; a web server for configuration via network 104, 104' or back plane 606; or any other type and form of interface.

In some embodiments, as discussed above, appliance cluster 600 may include internal flow distribution. For example, this may be done to allow nodes to join/leave transparently to external devices. To prevent an external flow distributor from needing to be repeatedly reconfigured on such changes, a node or appliance may act as an interface master or distributor for steering network packets to the correct node within the cluster 600. For example, in some embodiments, when a node leaves the cluster (such as on failure, reset, or similar cases), an external ECMP router may identify the change in nodes, and may rehash all flows to redistribute traffic. This may result in dropping and resetting all connections. The same drop and reset may occur when the node rejoins. In some embodiments, for reliability, two appliances or nodes within appliance cluster 600 may receive communications from external routers via connection mirroring.

In many embodiments, flow distribution among nodes of appliance cluster 600 may use any of the methods discussed above for flow distribution among cores of an appliance. For example, in one embodiment, a master appliance, master node, or interface master, may compute a RSS hash, such as a Toeplitz hash on incoming traffic and consult a preference list or distribution table for the hash. In many embodiments, the flow distributor may provide the hash to the recipient appliance when forwarding the traffic. This may eliminate the need for the node to recompute the hash for flow distribution to a core. In many such embodiments, the RSS key used for calculating hashes for distribution among the appliances may comprise the same key as that used for calculating hashes for distribution among the cores, which may be referred to as a global RSS key, allowing for reuse of the calculated hash. In some embodiments, the hash may be computed with input tuples of transport layer headers including port numbers, internet layer headers including IP addresses; or any other packet header information. In some embodiments, packet body information may be utilized for the hash. For example, in one embodiment in which traffic of one protocol is encapsulated within traffic of another protocol, such as lossy UDP traffic encapsulated via a lossless TCP header, the flow distributor may calculate the hash based on the headers of the encapsulated protocol (e.g. UDP headers) rather than the encapsulating protocol (e.g. TCP headers). Similarly, in some embodiments in which packets are encapsulated and encrypted or compressed, the flow distributor may calculate the hash based on the headers of the payload packet after decryption or decompression. In still other embodiments, nodes may have internal IP addresses, such as for configuration or administration purposes. Traffic to these IP addresses need not be hashed and distributed, but rather may be forwarded to the node owning the destination address. For example, an appliance may have a web server or other server running for configuration or administration purposes at an IP address of 1.2.3.4, and, in some embodiments, may register this address with the flow distributor as its internal IP address. In other embodiments, the flow distributor may assign internal IP addresses to each node within the appliance cluster 600. Traffic arriving from external clients or servers, such as a workstation used by an administrator, directed to the internal IP address of the appliance (1.2.3.4) may be forwarded directly, without requiring hashing.

G. Systems and Methods for Monitor Distribution in Multi-Core Systems

The systems and methods described herein are directed towards monitor distribution in multi-core systems. In general overview, the systems and methods distribute ownership of monitors for services and ownership of monitoring of services, each of which may have one or more associated monitors, over a plurality of cores. If a core owns or is responsible for a monitor for a service, the core may be responsible for sending probes to the service according to the monitor and receiving the result of each probe. If a core owns or is responsible for monitoring of a service, the core may be responsible for tracking the state of the service by processing the results of probes sent to the service by itself or other cores. As a result, the workload for monitoring and tracking the state of services may be distributed across the plurality of cores.

Each core in the plurality of cores may be responsible for monitors for services, and each core may send probes to the services according to the monitors and receive the results. If a core is not responsible for the service, the core may send the results of its probes for the service to the owner core. If a core owns the service, and is thus responsible for tracking the state of the service, the core may determine the state of the service. The core may determine the state of the service by processing the results of probes for the service. The core may determine the state of the service by processing the results of probes sent by itself, probes sent by other cores, or both. The owner core may send messages to other cores regarding the state of the service or a change in the state. The owner core responsible for the service may be considered or referred to as the consolidator of the monitoring for the service.

A core may be generally described herein as being an owner of a service or owning monitoring of a service. If a core owns a service, the core or the packet processing engine on the core may take responsibility for establishing and/or maintaining a state of the service for the multi-core system. In another aspect, a core that owns a service may be a core or packet processing engine that is designated as the core or the packet processing engine of the plurality of cores and/or plurality of packet engines of the multi-core system to be responsible for monitoring the service.

Figure 7A:
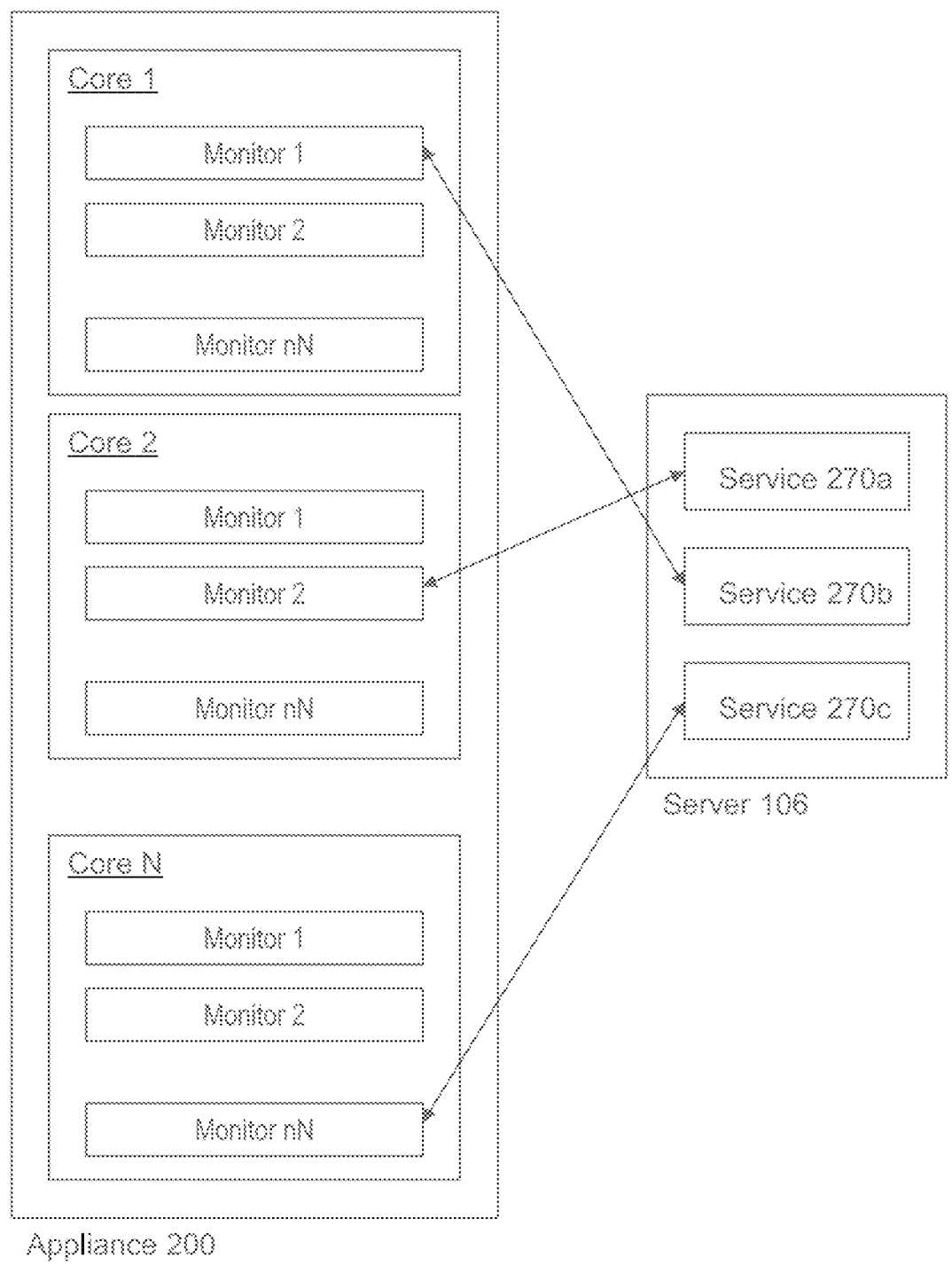
FIG. 7A is a block diagram of an appliance for using a plurality of monitoring agents to monitor network services.

Referring now to FIG. 7A, a block diagram of an appliance 200 using a plurality of monitoring agents on a plurality of cores to monitor a plurality of network services is shown. In brief overview, an appliance 200 comprises a plurality of monitoring agents arranged in a table. Each of the plurality of cores may include a copy of the table, which is described in fuller detail in FIG. 7B. Each of the plurality of monitoring agents is assigned to monitor a service. In one embodiment, each of the plurality of monitoring agents may be assigned a weight. Monitoring agents may also be referred to as probes.

Still referring to FIG. 7A, an appliance 200 comprises a plurality of monitoring agents or monitors. A monitoring agent may comprise any program, script, daemon, or other computing routine that reports a performance or operational characteristic of a network service 270 to the appliance 200. A monitoring agent may communicate with a network service 270 once, or on a predetermined frequency, such as every 1 msec or 1 sec. In some embodiments, a monitoring agent may use a request/reply messaging mechanism or protocol with the server. In other embodiments, a monitoring agent may have a custom or proprietary exchange protocol for communicating with the server. In some embodiments, a single monitoring agent may monitor a plurality of servers. In other embodiments, a plurality of agents may monitor a single server. In still other embodiments, a plurality of monitoring agents may each monitor a plurality of servers, wherein each of the plurality of servers is monitored by a plurality of monitoring agents.

In the embodiment shown, the one or more monitoring agents are associated with one or more network services 270. In other embodiments, the one or more monitoring agents may monitor an appliance 200, vServer, network service 270, client, or any other network resource. In one embodiment, a user specifies a type of network service to associate with the one or more monitoring agents. In another embodiment, a user customizes a monitoring agent. In still another embodiment, a generic monitoring agent is used. In yet another embodiment, the one or more monitoring agents determine the response time of the one or more network services 270 for responding to a request of one of the following types: ping, transport control protocol (tcp), tcp extended content verification, hypertext transfer protocol (http), http extended content verification, hypertext transfer protocol secure (https), https extended content verification, user datagram protocol, domain name service, and file transfer protocol.

In some embodiments, the one or more monitoring agents are protocol-specific agents, each agent determining availability for a network service of a particular protocol-type. In some embodiments, a monitoring agent determines a response time of a server 106 or network service 270 to a TCP request. In one of these embodiments, the agent uses a "TCP/ICMP echo request" command to send a datagram to the network service 270, receive a datagram from the network service 270 in response, and determine a response time based on the roundtrip time of the datagram. In another of these embodiments, the monitoring agent verifies that the response from the network service 270 included expected content and did not contain errors.

In other embodiments, a monitoring agent determines availability of a network service 270 to a UDP request. In one of these embodiments, the agent uses a "UDP echo" command to send a datagram to the network service 270, receive a datagram from the network service 270 in response, and determine a response time based on the roundtrip time of the datagram. In another of these embodiments, the monitoring agent verifies that the response from the network service 270 included expected content and did not contain errors.

In still other embodiments, the monitoring agent determines availability of a network service 270 to an FTP request. In one of these embodiments, the monitoring agent sends an FTP command, such as a "get" command or a "put" command, to the network service 270 and determines a time needed by the network service 270 to respond to the command. In another of these embodiments, the monitoring agent verifies that the response from the network service 270 included expected content, such as contents of a file requested by a "get" command, and did not contain errors.

In yet other embodiments, the monitoring agent determines availability of a network service 270 to an HTTP request. In one of these embodiments, the monitoring agent sends an HTTP command, such as a "get" request for a uniform resource locator (URL) or a file, to the network service 270 and determines a time needed by the network service 270 to respond to the request. In another of these embodiments, the monitoring agent verifies that the response from the network service 270 included expected content, such as the contents of a web page identified by the URL, and did not contain errors.

In further embodiments, the monitoring agent determines availability of a network service 270 to a DNS request. In one of these embodiments, the monitoring agent sends a DNS request, such as a dnsquery or nslookup for a known network address, to the server 106 or network service 270 and determines a time needed by the server 106 or network service 270 to respond to the request. In another of these embodiments, the monitoring agent verifies that the response from the network service 270 included expected content, such as the domain name of a computing device 100 associated with the known network address, and did not contain errors.

A monitoring agent may be assigned a weight by a network appliance 200. A weight may comprise an integer, decimal, or any other numeric indicator. In some embodiments, a user may configure the weight corresponding to a given monitoring agent. In some embodiments, all monitoring agents may be assigned equal weight. In other embodiments, a plurality of monitoring agents may each be assigned different weights. The weights may be assigned to the monitors based on any criteria indicating relative importance, including without limitation importance of the monitored service, reliability of the monitoring mechanism, and the frequency of monitoring.

In one embodiment, a monitoring agent may be assigned a weight based on the relative importance of the service the appliance monitors. For example, if most user requests in a given environment were HTTP requests, a monitoring agent monitoring HTTP availability of a server 106 might be assigned a weight of 10, while a monitoring agent monitoring FTP availability of a server 106 might be assigned a weight of 3. Or, for example, if an administrator placed a high priority on UDP applications, a monitoring agent monitoring UDP availability of a server may be assigned a weight of 20, while a DNS monitoring agent may be assigned a weight of 5.

In some embodiments, an appliance 200 may compute a sum of the weights of the monitoring agents currently reporting a network service 270 as operational. For example, if five monitoring agents, each assigned a weight of 30, are monitoring a network service 270, and three of the five monitoring agents report the network service 270 as available, the appliance may determine the sum of the monitoring agents currently reporting the network service 270 as operational to be 90. Or for example, if only two monitoring agents, one with a weight of 20 and the other with a weight of 40, are reporting a server 106 as available, the appliance may compute the sum of the monitoring agents currently reporting a server 106 as operational to be 60.

Referring now to FIG. 7B, a block diagram of an embodiment of a table 700 used for monitoring services in a multi-core system is depicted. The table 700 may be store on or in communication with a packet processing engine 548. Each packet processing engine 548 may be associated with a table 700. The entries of the tables 700 associated with the packet processing engines 548 may include copies of information regarding the monitors.

In brief overview, the table 700 may include entries corresponding to monitors for services. Each entry may correspond to a monitor. Each entry in the table 700 may include fields of information associated with the monitor. The fields of information may include the service name, the monitor name, the activity status of the monitor with respect to the core, and the next time the monitor is scheduled to send a probe to the service (also referred to herein as the "probe time"). In some embodiments, the fields of information may include the identity of the core that owns the service being monitored. In some embodiments, the fields of information may include the identity of the core that owns the monitor. In many embodiments, the fields of information may include the weight assigned to the monitor.

In various embodiments, a packet processing engine 548 may create an entry in the table 700 when the packet processing engine 548 receives an instruction from the multi-core device 545 to create a monitor for a service. In some embodiments, the multi-core device 545 may send the instruction to create a monitor to the packet processing engine 548 that will own the monitor. In other embodiments, the multi-core device 545 may send the instruction to create the monitor to all the packet processing engines 548. In some of these embodiments, each packet processing engine 548 may create an entry for the monitor in its respective tables 700 according to the instruction. In other of these embodiments, a packet processing engine 548 may disregard the instruction to create a monitor if the packet processing engine 548 will not own the monitor.

The packet processing engine 548 may process the instruction to create the entry in the table 700. In some embodiments, the packet processing engine 548 may process the instruction via parsing. In some embodiments, the packet processing engine 548 may parse the instruction into the service name, the monitor name, and the information for the monitoring schedule. In other embodiments, the packet processing engine 548 may parse the instruction into the service name, the number of monitors for the service, and information for the monitoring schedules. In many embodiments, the packet processing engine 548 may create a new entry in the table 700 and store the service name and the monitor name. In additional embodiments, the packet processing engine 548 may create multiple entries according to the number of monitors for the service, according to the instruction. In these embodiments, the packet processing engine 548 may store, for each entry, the service name and a monitor name chosen according to a predetermined method. In many embodiments, the packet processing engine 548 may store, for each entry, the information for the monitoring schedule. In additional embodiments, the packet processing engine 548 may store, for any entry, any information obtained by further parsing of the instruction.

The packet processing engine 548 may access the information for the monitoring schedule stored for an entry to calculate a next probe time for a monitor. The packet processing engine 548 may then store the next probe time for the monitor. In many embodiments, the information for the monitoring schedule may include a frequency of monitoring. In various embodiments, the information for the monitoring schedule may include a formula to calculate the next probe time. In some embodiments, upon sending a probe to a service, the packet processing engine 548 may calculate the next probe time and overwrite the obsolete probe time for the entry. In other embodiments, the packet processing engine 548 may delete the entry and create a new entry for the monitor with the next probe time.

The packet processing engine 548 may determine the owner of the monitor according to a predetermined algorithm, as described in further detail below. The packet processing engine 548 may configure the activity status of the monitor with respect to the core according to the determination. If the packet processing engine 548 determines the core owns the monitor, the activity status of the monitor may be set to "schedulable." As a result, the packet processing engine 548 schedules probes for the service according to the monitor's activity status. If the packet processing engine 548 determines the core does not own the monitor, the activity status of the monitor may be set to "non-schedulable." As a result, the packet processing engine 548 does not schedule probes for the service according to the monitor's activity status.

Figure 7C:
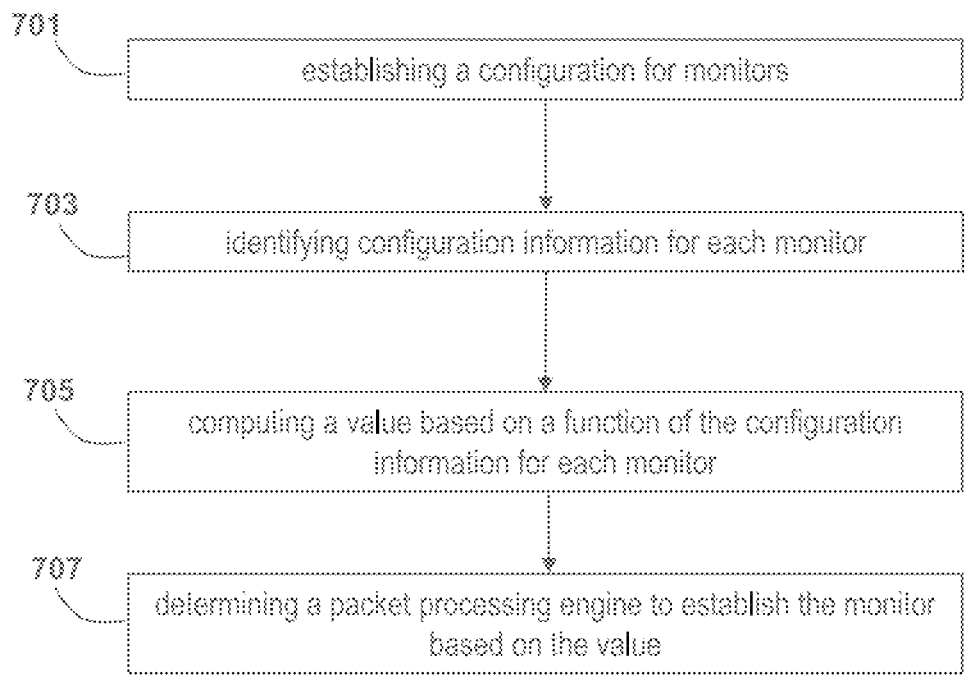
FIG. 7C is a flow diagram of an embodiment of a method for configuring a table used for monitoring in a multi-core system.

Referring now to FIG. 7C, a flow diagram depicting an embodiment of steps of a method for configuring a table used for monitoring services in a multi-core system is shown and described. In brief overview, the method includes establishing (step 701) a configuration for monitors. The configuration may identify a plurality of monitors to monitor one or more services managed by a plurality of packet processing engines operating on each of the plurality of cores. The method further includes identifying (step 703) for each of the plurality of packet processing engines, from the configuration, a monitor name and service name for each monitor of the plurality of monitors. The method further includes computing (step 705), by each of the plurality of packet processing engines, for each monitor of the plurality of monitors a value based on a function of the monitor name and the service name. The method further includes determining (step 707), by each of the plurality of packet processing engines, a packet processing engine from the plurality of packet processing engines to establish the monitor for the service based on the value corresponding to an identifier of the packet processing engine. Although the steps are described with respect to one packet processing engine operating on one core, methods for configuring tables by each of the packet processing engines would be apparent to one of ordinary skill in the art.

In further detail, at step 701, the packet processing engine 548 may establish the configuration for monitors by allocating memory and creating a table for the monitors. The packet processing engine 548 may create entries for the table in response to instructions from the multi-core device to create monitors for services. The packet processing engine 548 may process the instructions to obtain the fields for the entries. For example, the packet processing engine 548 may parse an instruction to obtain the service name and the monitor name.

The multi-core system may use any type and form of monitor configuration to establish one or more monitors. The configuration may be established via a set of one or more commands or instructions, such as a set of commands received via the graphical user interface (GUI) 210 or the command line interface (CLI) 212, as described in FIG. 2A. In some embodiments, the packet processing engine 548 may parse an instruction of a configuration to determine a type of monitor. In some embodiments, the packet processing engine 548 may parse an instruction to determine a type of monitor. For example, the packet processing engine 548 may determine that the monitor probes the state of a service, a least response time of a service, a dynamic response time of the service, or any other characteristic of the service. In additional embodiments, the packet processing engine 548 may parse the instruction to obtain the weight of the monitor. The packet processing engine 548 may parse an instruction to obtain information for a monitoring schedule. The packet processing engine 548 may use the information for the monitoring schedule to calculate the next probe time. In any of these embodiments, the packet processing engine 548 may store in an entry any of the information obtained by parsing an instruction to create monitor or any information derived from the parsing.

The packet processing engine 548 may establish the entries of the table 700 in any order. In some embodiments, the packet processing engine 548 establishes entries in the order that the packet processing engine 548 receives instructions to create the monitors. In other embodiments, the packet processing engine 548 establishes entries in order of the service and monitor names. In further embodiments, the packet processing engine 548 establishes entries in order of the probe times. In some embodiments, the packet processing engine 548 establishes entries according to ownership of the monitors. For example, the packet processing engine 548 may group monitors the packet processing engine 548 owns apart from the monitors that belong to other cores.

At step 703, the packet processing engine 548 may identify configuration information for each monitor. In some embodiments, the packet processing engine 548 may identify a monitor name and a service name for each monitor from fields in the entry for each monitor. The packet processing engine 548 may load copies of the monitor and service names into a buffer for additional processing. The packet processing engine may identify other configuration information for each monitor as identified in table 700. In various embodiments, the packet processing engine 548 may identify the type of monitor, the weight of the monitor, the identity of the core that owns the monitor, the identity of the core that owns the service associated with the monitor, or any other configuration information.

At step 705, for each monitor, the packet processing engine 548 may compute a value based on any configuration information for a monitor. In some embodiments, the packet processing engine 548 may compute a value using a function of the monitor name and service name. In various embodiments, the monitor name may be an identifier of a monitor. In many embodiments, the service name may be an identifier of a service. In numerous embodiments, the packet processing engine 548 may compute a value based on a function of any configuration information, such as the monitor name, service name, type of monitor, weight of the monitor, identity of the core that owns the monitor, identity of the core that owns the service associated with the monitor, or any combination thereof. The function or the result of the function may be used to identify the owner of the monitor. The result may be used as a lookup or index into a table that identifies cores. The function may be a hash function that identified an index into an indirection table to select the core. As a result, the value may correspond to an identifier of a packet processing engine. The packet processing engine 548 may compute the value using any function that results in a desired distribution of monitor ownership among the packet processing engines 548. The packet processing engine 548 may compute the value using copies of the monitor name, service name, or any other configuration information loaded into a buffer.

In some embodiments, the packet processing engine 548 computes the value according to the sums of the ASCII values of the monitor and service names. In these embodiments, the packet processing engine 548 may add the sum of ASCII values of the monitor name to the sum of ASCII values of the service name. In one of these embodiments, the packet processing engine 548 may divide this sum by the number of packet processing engines. In another of these embodiments, the packet processing engine 548 may perform a modulo operation upon the sum according to the number of packet processing engines. In further embodiments, the packet processing engine 548 may create a variable that stores the number of monitors that have been created. In these embodiments, the packet processing engine 548 may add the sum of the ASCII values of the service name to the number of created monitors. The packet processing engine 548 may then divide the sum by the number of packet processing engines or perform a modulo operation according to the number of packet processing engines. After the packet processing engine 548 computes the value, the packet processing engine 548 may increment the variable to account for the newly created monitor.

The packet processing engine 548 may determine the packet processing engine to establish the monitor for the service based on the computed value. In some embodiments, the packet processing engine 548 may compare the computed value to a value assigned to the packet processing engine 548 upon boot-up, wherein the value indicates the packet processing engine 548's order among the plurality of packet processing engines. In other embodiments, the packet processing engine 548 may compare the computed value to an identifier of the packet processing engine 548. If the comparison indicates the packet processing engine 548 owns the monitor, the packet processing engine 548 sets the activity status of the monitor to "schedulable." As a result, the packet processing engine 548 will schedule probes for the service according to the monitor. If the comparison indicates that the packet processing engine 548 does not own the monitor, the packet processing engine 548 sets the activity status of the monitor to "non-schedulable." As a result, the packet processing engine 548 does not schedule probes for the service, although the information for the monitor will remain in the table 700.

Figure 7D:
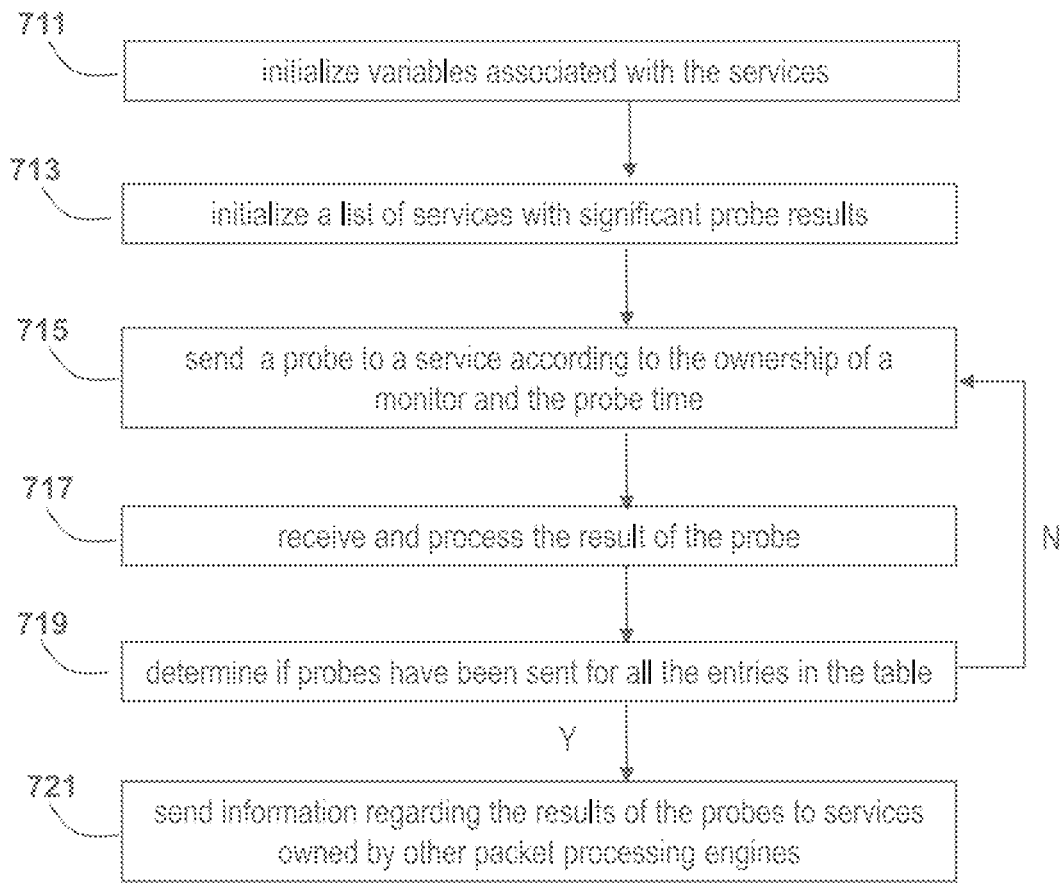
FIG. 7D is a flow diagram of an embodiment of a method for monitoring services in a multi-core system.

Referring now to FIG. 7D, a flow diagram depicting steps of an embodiment of a method for monitoring services in a multi-core system is shown and described. In brief overview, the method includes sending probes to monitor services according to iterations through the entries of the table 700. For one iteration through the table 700, the method includes initializing variables (step 711) associated with the services. The method further includes initializing (step 713) a list of services with significant probe results. The method further includes sending (step 715) a probe to a service according to the ownership of a monitor and the probe time. The method further includes receiving and processing (step 717) the result of the probe. The method further includes determining (step 719) if probes have been sent for all the entries in the table 700. The method further includes sending (step 721) information regarding the results of the probes to services owned by other packet processing engines.

For each iteration through the table 700, the packet processing engine 548 may initialize variables associated with the services. A variable may be related to the results of probes for a service. A variable may indicate a change in state for a service. The packet processing engine 548 may create and initialize the variables when the multi-core device 545 boots up. In this embodiment, the packet processing engine 548 may initialize the variables at the beginning of each iteration through the table 700. In other embodiments, the packet processing engine 548 may initialize the variables at the end of each iteration through the table 700.

The packet processing engine 548 may send a probe to a service according to the ownership of a monitor and the probe time. The packet processing engine 548 may examine activity status of the monitor to determine if the packet processing engine 548 owns the monitor. If the activity status is "non-schedulable," the packet processing engine 548 does not own the monitor. The packet processing engine 548 then examines the activity status for the next entry in the table 700. In this manner, the packet processing engine 548 continues examining the entries in the table 700 until the packet processing engine 548 encounters a monitor that the packet processing engine 548 owns. When the packet processing engine 548 encounters a monitor that the packet processing engine 548 owns, the packet processing engine 548 compares the scheduled probe time for the monitor with a signal from a clock. If the scheduled probe time is less than or equal to the signal from the clock, the packet processing engine 548 creates a probe according to the monitor and sends the probe to the service. The packet processing engine 548 may calculate the next probe time and overwrite the probe time field of the entry with the newly calculated probe time. The packet processing engine 548 may then continue examining the activity statuses and probe times of entries in the table 700 until the packet processing engine 548.

With the examining of activity statuses and probe times and sending of probes, the packet processing engine 548 may receive and process the result of a probe. The packet processing engine 548 may use the result of a probe to adjust a variable associated with a service. In some embodiments, the packet processing engine 548 may increment or decrement the variable according to the result of a probe. For example, if the probe indicates a service is "up," the packet processing engine 548 may increment the variable, but if the probe indicates a service is "down," the packet processing engine 548 may decrement the variable. In some embodiments, the magnitude of the increment or decrement is a predetermined value. In other embodiments, the magnitude of the increment or decrement depends on the result of the probe.

After adjusting the variable, the packet processing engine 548 may determine if the packet processing engine 548 owns the service being monitored. If the packet processing engine 548 owns the service, the packet processing engine 548 may use the variable to update the state of the service, as described in FIG. 7E. If the packet processing engine 548 does not own the service, the packet processing engine 548 evaluates the variable associated with the service to determine if the packet processing engine 548 needs to report the results of the probe to the owner packet processing engine 548. In some embodiments, the packet processing engine 548 may compare the variable with a predetermined threshold. If the variable is greater than the threshold, the packet processing engine 548 may determine if the service is already included in the list of services with probe results. If the service is not in the list, the packet processing engine 548 may add the service to the list. If the variable is less than the threshold, the packet processing engine 548 may remove the service from the list.

After the packet processing engine 548 finishes sending probes and processing the results for the entries in the table 700, the packet processing engine 548 may send information regarding the results of the probes to services owned by other packet processing engines. In many embodiments, the packet processing engine 548 may examine the list of services with probe results. For each service in the list, the packet processing engine 548 may prepare a message with the service name and the value of the variable associated with the service. The packet processing engine 548 may send the message to the packet processing engine that owns the service. The packet processing engine 548 may delete the service from the list. In some embodiments, the packet processing engine 548 deletes the service after sending the message to the packet processing engine that owns the service. In other embodiments, the packet processing engine 548 deletes all the services from the list after all the messages with variables for the services have been sent to the respective packet processing engines. The packet processing engine 548 returns to (step 711) to process another iteration through the table 700.

Figure 7E:
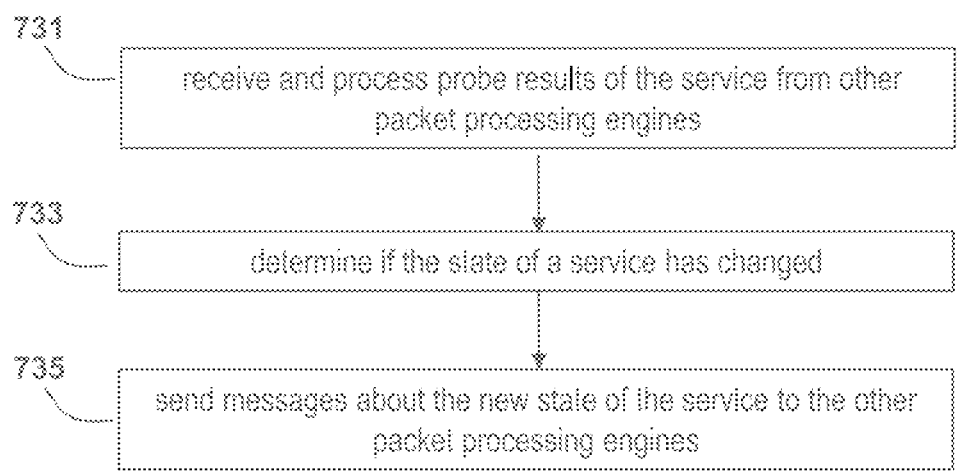
FIG. 7E is a flow diagram of an embodiment of a method for updating the state of a service according to the results of monitoring the services in a multi-core system.

Referring now to FIG. 7E, a flow diagram depicting steps of an embodiment of a method for updating the state of a service in a multi-core system is shown and described. The method includes receiving and processing (step 731) by a packet processing engine 548 that owns a service (also referred to herein as "owner packet processing engine") the probe results for the service from other packet processing engines. In some embodiments, the owner packet processing engine 548 receives a message from another packet processing engine. The message may include a service name and a value of a variable associated with the service. The value of the variable may reflect the results of probes sent to the service by the packet processing engine that sent the message. The owner packet processing engine may update a variable associated with the state of a service according to the value in the message. In some embodiments, the owner packet processing engine may add the value in the message to the variable associated with the state of the service, and in other embodiments, the owner packet processing engine may subtract the value.

The method also includes determining (step 733) if the state of a service has changed. In some embodiments, the owner packet processing engine determines if the state of a service has changed by comparing the variable associated with the state of the service to a predetermined threshold. In some embodiments, the owner packet processing engine detects if the variable was previously less than the threshold and the updated owner packet processing engine exceeds the threshold. In other embodiments, the owner packet processing engine detects if the variable previously exceeded the threshold and the updated variable is less than the threshold.

The method also includes sending (step 735) messages about the new state of the service to the other packet processing engines. In some embodiments, in response to the detection, the owner packet processing engine creates a message including the state of the service, according to the updated variable. The owner packet processing engine may send the message to all of the other packet processing engines. In other embodiments, in response to the detection, the owner packet processing engine places the service in a list of services whose statuses have changed. In these embodiments, the owner packet processing engine may create and send messages regarding the states of the services in the list on a predetermined basis. For example, the owner packet processing engine may create and send the messages according to a predetermined frequency, and then delete all the services from the list.

An example of monitor distribution in a multi-core system is herein described. In this example, the multi-core system has 8 cores and monitors 4 services. The multi-core system is configured to have 20 monitors that monitor the 4 services, and 5 monitors are dedicated to each service. The multi-core system establishes service names and monitor names for each of the 20 monitors. The multi-core system may compute a hash value for each monitor based on the service and monitor names. The hash value may determine which core owns a monitor and is responsible for sending probes to the service according to the monitor. In this example, a hash value may fall between 0 and 8000. If the hash value falls between 0 and 999, core 1 owns the monitor. If the hash value falls between 1000 and 1999, core 2 owns the monitor, and so on. In this example, core 1 owns the first service, and the hash values for the monitors determine that cores 1, 2, 5, 6, and 8 own the monitors for the first service. Core 3 owns the second service, and the hash values for the monitors determine that cores 2, 3, 4, 6, and 7 own the monitors for the second service. Core 5 owns the third service, and the hash values for the monitors determine that cores 1, 3, 4, 5, and 8 own the monitors for the third service. Core 7 owns the fourth service, and the hash values for the monitors determine that cores 2, 4, 5, 7, and 8 own the monitors for the fourth service.

Each core in the multi-core system includes a table that stores entries for all 20 monitors. Each core sets the activity statuses for entries to "schedulable" for the monitors it owns and "unschedulable" for the monitors it does not own. In one example, core 1 sets the activity statuses for its monitors for the first and third services to "schedulable," but sets activity statuses for all other monitors in its table to "unschedulable." In another example, core 2 sets the activity statuses for its monitors for the second and fourth services to "schedulable," but sets activity statuses for all other monitors in its table to "unschedulable." The remaining cores set the activity statuses for monitors in its table in the same manner.

If a monitor is set to "schedulable," a core may send probes according to the monitor to the service. The core may receive the results of the probes. If the core does not own the service, the core may send a message including the results of the probes to the owner core. For example, core 1 may send the results of its probes for the third service to core 5. In another example, core 4 may send the results of its probes for the second service to core 3, the results of its probes for the third service to core 5, and the results of its probes for the fourth service to core 7.

If a core does own a service, the core may determine the state of the service according to results of the probes for the service. The core may determine the state by processing the results of its own probes or results sent from other cores. For example, core 1 may process the results of its probes for the first service to update the state. Core 1 may also process the results of probes sent from cores 2, 5, 6, and 8 to update the state of the first service. In another example, core 5 may process the results of its probes for the third service to update the state. Core 5 may also process the results of probes sent from cores 1, 3, 4, and 8 to update the state of the third service. In any of these examples, once a core has updated the state of a service it owns, the core may send a message to the other cores regarding the state of the service.

H. Systems and Methods for Monitor Distribution in Cluster Systems

The systems and methods of the present solution illustrated in FIGS. 8A-9C are directed to monitoring in a cluster system. The systems and methods distribute the monitors for a service and the ownership of a service across a cluster system comprising a plurality of nodes. The nodes in the cluster can be configured to have different sets of virtual servers and services. The ownership and monitoring of the services can be distributed among all the nodes in the cluster.

Figure 8A:
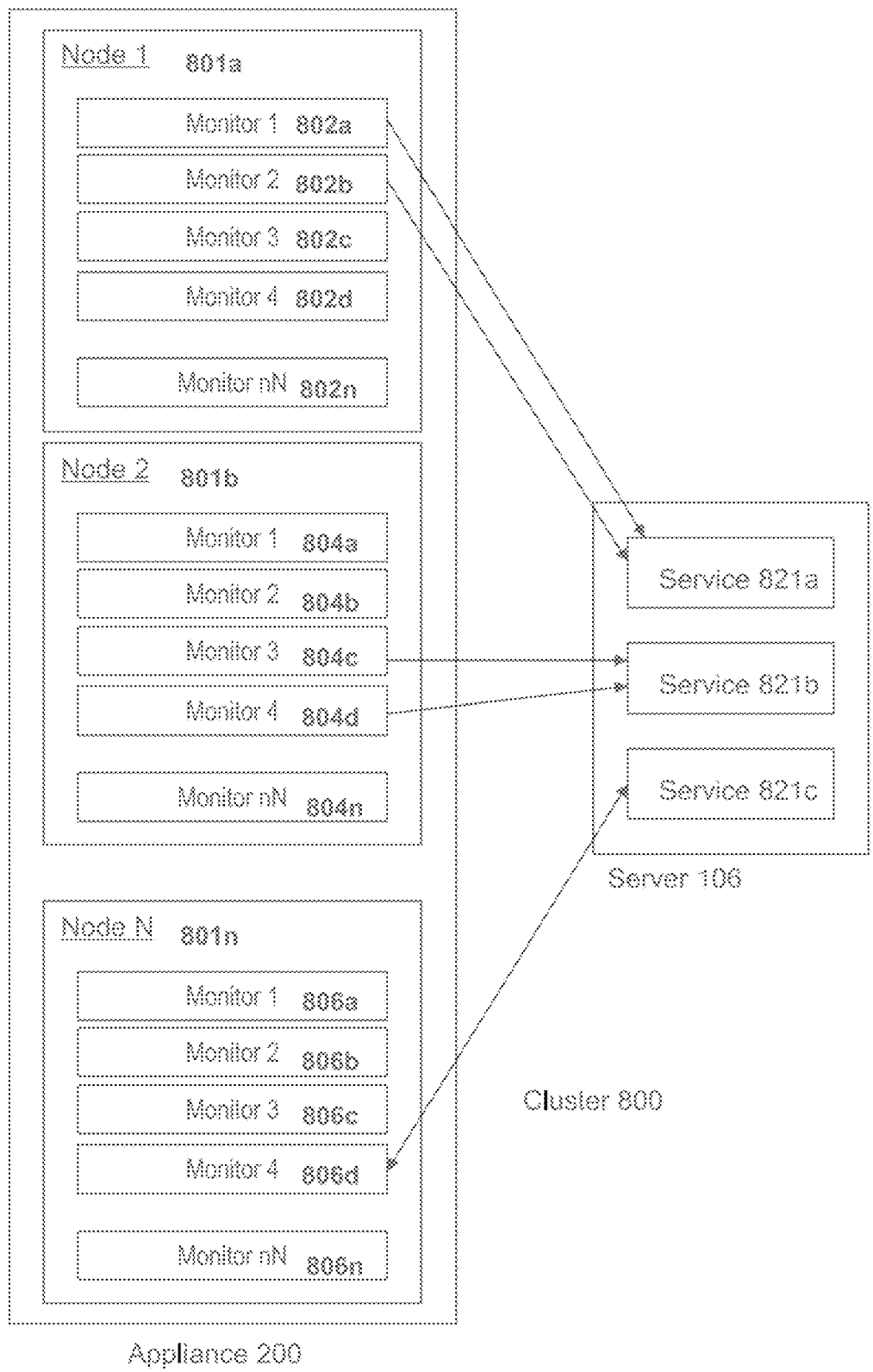
FIG. 8A is a block diagram of an embodiment of a system for monitoring in a cluster.

Referring now to FIG. 8A, a block diagram of an appliance 200 using a plurality of nodes 801 to monitor a plurality of network services in a cluster system is shown. The appliance 200 may be a multi-core appliance or multi-node set of appliances in a cluster system 800. A node 801 may be a connection point in a cluster system 800. Nodes 801 may be capable of receiving, transmitting and/or forwarding information over a network. In the embodiment shown, the one or more nodes 801 may be associated with one or more network services 821. In other embodiments, the one or more nodes 801 may monitor an appliance 200, vServer, network service 821, client, or any other network resource. Although illustrated on a separate server 106, in many embodiments each node 801*a*-801*n* within the cluster may execute one or more services 821*a*-821*c*. For example, a first service 821*a* may be executed on a first node 801*a* (and monitored by a first monitor 802*a*), or a second service 821*b* may be executed on both a first and second node 801*a* and 801*b*, such as a distributed database service (and monitored by a monitor 802, 804 on each device, with one monitor designated as an "owner" of the service, as discussed in more detail below).

In one embodiment, a node 801 comprises a plurality of monitoring agents 802, 804, 806. The monitoring agents 802, 804, 806 may be bound to a network service 821. A monitoring agent 802, 804, 806 may comprise an application, service, server, daemon, routine, subroutine, or other executable logic for monitoring performance, load balancing, latency, status, or other information of a service, vserver, or application provided by a server 106 and/or cluster 800.

In yet other embodiments, the monitoring agent determines availability of a network service 821 to an HTTP request. In one of these embodiments, the monitoring agent sends an HTTP command, such as a "get" request for a uniform resource locator (URL) or a file, to the network service 821 and determines a time needed by the network service 270 to respond to the request. In another of these embodiments, the monitoring agent verifies that the response from the network service 821 included expected content, such as the contents of a web page identified by the URL, and did not contain errors.

Cluster 800 may be a network of appliances 200 working together in a single system. In some embodiments, the appliances may be referred to as nodes 801. In the cluster 800 system, network traffic may be distributed among the nodes 801 to provide load balancing in the system. The nodes 801 may communicate amongst each other. In some embodiments, when a node 801 is added or removed from the cluster 800, the load in the cluster may be redistributed among the nodes 801 still active in the cluster 800.

In some embodiments, the service 821 is a daemon process or network driver for listening, receiving and/or sending communications for an application, such as email, database or an enterprise application. In some embodiments, the service 821 may communicate on a specific IP address, or IP address and port.

Figure 8B:
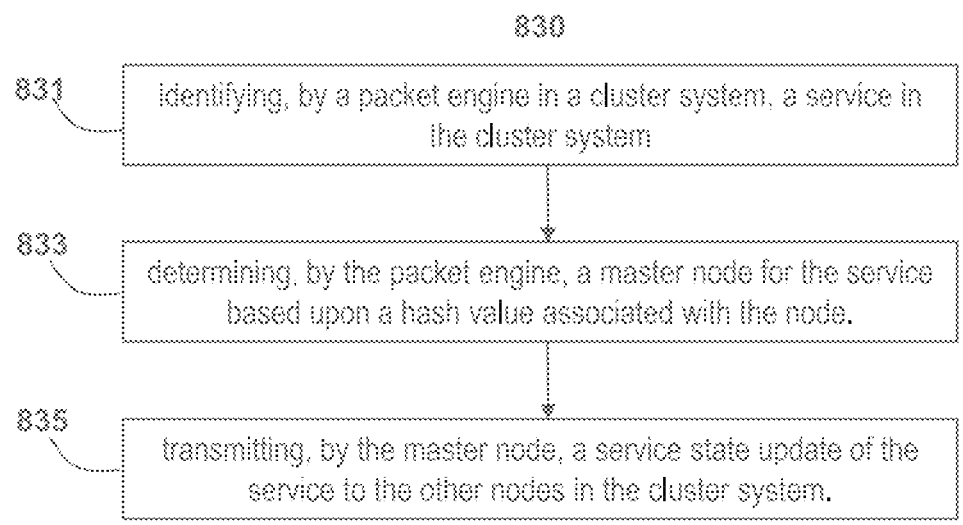
FIG. 8B is a flow diagram of an embodiment of a method for distributed monitoring of one or more services across a plurality of nodes in a cluster system.

Referring now to FIG. 8B, an embodiment of a flow diagram of an embodiment of a method 830 for distributed monitoring of one or more services across a plurality of nodes in a cluster system. At step 831, the method includes identifying, by a PE in a cluster system, a service in the cluster system. At step 833, the method also includes determining, by the PE, a master node for the service based upon a hash value associated with the node. At step 835, the method further includes transmitting, by the master node, a service state update of the service to the other nodes in the cluster system.

In some embodiments, the distribution may be done at a service level rather than at a monitor level. This design, in some embodiments, may help to reduce the number of probe status updates from different nodes in the cluster to the to the monitoring master. In an embodiment, the distribution may be done using a probable record linkage technique (sometimes referred to as "PRL") module, the module based on a consistent hashing algorithm.

Referring to step 833 in more detail, each of the nodes in the cluster can determine a service, from a plurality of services, to be monitored by the corresponding node. The determined node can monitor the service for the cluster of nodes. The determined node may be referred to as a master node for the service it is monitoring. In an embodiment, the node is selected to monitor the service based on a hash of an identity of the service in the configuration for the cluster. In some embodiments, a service unique ID hash may be used to determine the master node for a service 821. In an embodiment, each node may identify ownership of a service to monitor based on the hash identity of service including a name of the service configured in the configuration for the cluster. The PRL module may use the service unique ID hash to determine the master node for a service 821. Once the master node has been determined, in some embodiments, the master node may begin probing the service. In still other embodiments, the master node may begin probing the service responsive to receiving a "add service" command from a PE in the cluster system. In further embodiments, once the "add service" command has been received a new field may be added to update the server information and to store the unique entity ID which will be obtained from the configuration system process.

In some embodiments, each node establishes, responsive to the determination to monitor a service, a monitor for each service to be monitored by the node. Each of the nodes may establish a master monitor among the plurality of monitors established on the node. The master node may be selected to monitor the service for the node. In an embodiment, the master monitor can update the remaining monitors on the node with the status of the service. Within the node 801, the monitor bindings may be distributed among the processing engines. The non-master nodes (sometimes referred to as non-owner nodes or slave nodes) may set a "don't probe" bit in all the mapped ID address (sometimes referred to as MIPS) associated with the service in all the processing engines so that the non-master nodes do not probe the service at all.

In some embodiments, each node 801 may monitor set of services 821 it owns or are assigned to it according to a hash of information about the services 821, all of the services 821 it owns, or at least one of the services 821 it owns. Each node 821 may use the existing service state synchronization (hereinafter referred to as "SSS") mechanism to update the service state and layer 2 information of the service in the cluster system. In some embodiments, a first monitor on a first node in the cluster of nodes can identify a status of a service to be monitored by the cluster. The monitor for a service may be referred to as a master monitor, a first monitor, or a master packet engine.

Whenever the service state changes for a service or the monitoring owner of the service changes, in some embodiments, the master node's master packet engine (PE0) may create a new SSS instance and populate it with the layer 2 information and service state information. The unique entity ID from the corresponding server information may be copied to a new member entity ID, which may be added in the SSS data structure. In further embodiments, the copied unique entity ID may be used to find the corresponding service's server information on the receiving end.

In some embodiments, the master node may stop the old (previous) master node from monitoring the service by adding a new field to the SSS data. The new field may include data indicating the new master node 801 for a service for all the nodes 801 in the cluster system. In still other embodiments, a new hash table may be added for efficient searching. The new hash table may include a function (entity ID) which can be used as an input to a hashing function and the entry ID may provide an indicator for server information. In further embodiments, the entries may be added into the hash table in at least one of the following scenarios: adding of a service 821 or domain based service, and adding of a service group member. In other embodiments, the entries may be removed from the hash table in at least one of the following scenarios: removing of a service 821 or domain based service, and removing of a service group member.

The master node or PE0 may add the SSS data to a queue, for example a global list. In an embodiment, the first monitor on the first node may transmit to each node in the cluster a message (e.g., SSS data) including the status of the service. In some embodiments, the SSS data may be broadcast to all the nodes 801 which own the service 821. In one embodiment, the maximum number of SSS entries supported may be 25K. In still other embodiments, the maximum number of SSS entries supported may be 70K. In still other embodiments, any number of entries may be supported.

In some embodiments, a PE in a cluster system, may check whether there is any SSS entry present in the global list. In still other embodiments, an application programming interface (API) may check every 10 ms. In further embodiments, if SSS entries are present on the global list, the PE may notify the nodes which own those particular services or service groups. The master node, in some embodiments, may broadcast the SSS entries to the owner nodes using a node to node messaging (NNM) interface or protocol.

In some embodiments, the SSS updates will be transmitted using the NNM service based upon a priority level in the NNM layer. In one embodiment, the highest priority bit set in the NNM layer may have the highest priority level. Upon receiving the SSS update, in some embodiments, three conditions must be verified before updating the services server information: whether server information is present; whether the "add service" command has been receive and whether SSS update is from the current master node, as discussed in more detail below.

The first condition to be verified may be whether the server information is present in the node 801. In some embodiments, to find the server information entry corresponding to the received SSS entry, the packet engine may search the hash table. If the server information is found in the node 801 and the first condition is met, then the packet engine may move on to verify the second condition. If the server information is not found in the node 801, then the packet engine may cache the SSS entry or store the SSS entry in a cache memory.

The second condition may be verifying that the "add service" command was received. In some embodiments, the "add service" command should have been received and processed by all the PEs in the node. To verify that the "add service" command has been received, the server information reference count may be checked. In further embodiments, if all the PEs have received and processed the "add service" command, the PE may check if the third condition, whether the SSS update was sent by the current master node, is met. If not, the SSS entry may be cached.

In an embodiment, the master monitor may compare a service identity in a server database to a unique identity in the service state update to confirm the monitor is a current monitor for the service. In some embodiments, to determine if the third condition has been met, the PE may compare the view ID stored in the server information against the view ID received from the master node 801 in the SSS update. If the view ID in the server information is greater than the view ID in the received message than the message did not come from the current master node and is obsolete. In this case, the SSS message may be ignored. If the view ID in the server information is less than or equal to the view ID in the received message, the SSS message will be used to update the server information. In some embodiments, comparing the view ID of the server information to the view ID of the received message may handle issues that arise when a node receives both an "add service" command and a server information update message. In further embodiments, the server information update may be received by a node before the node has received the "add service" command. By caching the server update, the node 801 can wait to update the service information until the "add service" command has been received.

In some embodiments, to determine whether the local node is the old or previous monitoring owner of the service, a comparison between the SSS monitor's view ID and the server information view ID is performed. If the SSS's monitor view ID comes out to be greater than the server information's master monitor view ID, then the local node is the old or previous master. If it is determined that the local node is the old master node, the master node flag on the local node may need to be reset to disable monitoring.

In some embodiments, once all three conditions have been met, the PE may send out a core to core messaging (C2C) broadcast of the received SSS entry that was sent to all the PEs. In one example, without limitation, a SSS entry for clustering is illustrated below:

```
typedef struct sssdata {
NS_CLIST_ENTRY(sssdata) session_list; /* Can be used for free
sessions list */ struct {
u16bits vlan;      /* 2 bytes */
u16bits mss; // mss of the peer
u08bits etheraddr[NSAPI_ETHER_ADDR_LEN];/* ethernet
MAC address */
u08bits chan;      /* 1 byte */
u08bits reserved;
} l2_params;
u16bits port; // servicegroup member port
u08bits state; //state of the entity
u08bits namelen;
ssstypes_t st;
u32bits ip;
u32bits ttl; // dbs resolved ip ttl
u32bits delta_probe_ticks;
u32bits time;
ipv6_128_addr_t ipv6addr;
char sg_dbs_server_name[SERVER_UFN];
u32bits flags;
/* View id of the MOS which is sending the SSS update */
u32bits cl_mon_ownership_view_id;
u32bits cl_multicast_nodes;
u08bits cl_tx_type;
u08bits cl_src_nodeid;
u08bits reserved;
u08bits cl_cload_th_flag;
u32bits cl_cload_cur_load;
u32bits cl_tot_mon_lrtm_time;
// using zero bytes to accommodate any name length changes later.
char name[0]; // dbs, normal, gslb
} sssdata_t;
```

Now referring to FIG. 8C, an illustrative diagram of a method for monitoring in a cluster system 840. For clarity, only two nodes are illustrated, but one of skill in the art may readily appreciate that the present systems and methods may be scaled up to any number of nodes within the cluster. In one embodiment, a two-node cluster may include nodes b0 841 and b1 843. Two services S1 and S2 may be executed by each node, such as distributed databases or applications. Monitors m1 and m2 may be bound to service S1 and m3 and m4 may be bound to S2, based on the result of a hash applied to information of service S1 and S2. S1 may be monitored by b0 841, while S2 is monitored by b1 843. In still other embodiments, within b0, m1 and m2 may be distributed among a plurality of PEs running on b0 and similarly within b1, m3 and m4 may be distributed among a plurality of PEs running on b1. Whenever S1's state changes, b0 841 may inform b1 843 via a service update message 842. Similarly, whenever S2's state changes, b1 843 may inform b0 841 via a service update message 844.

Figure 8D:
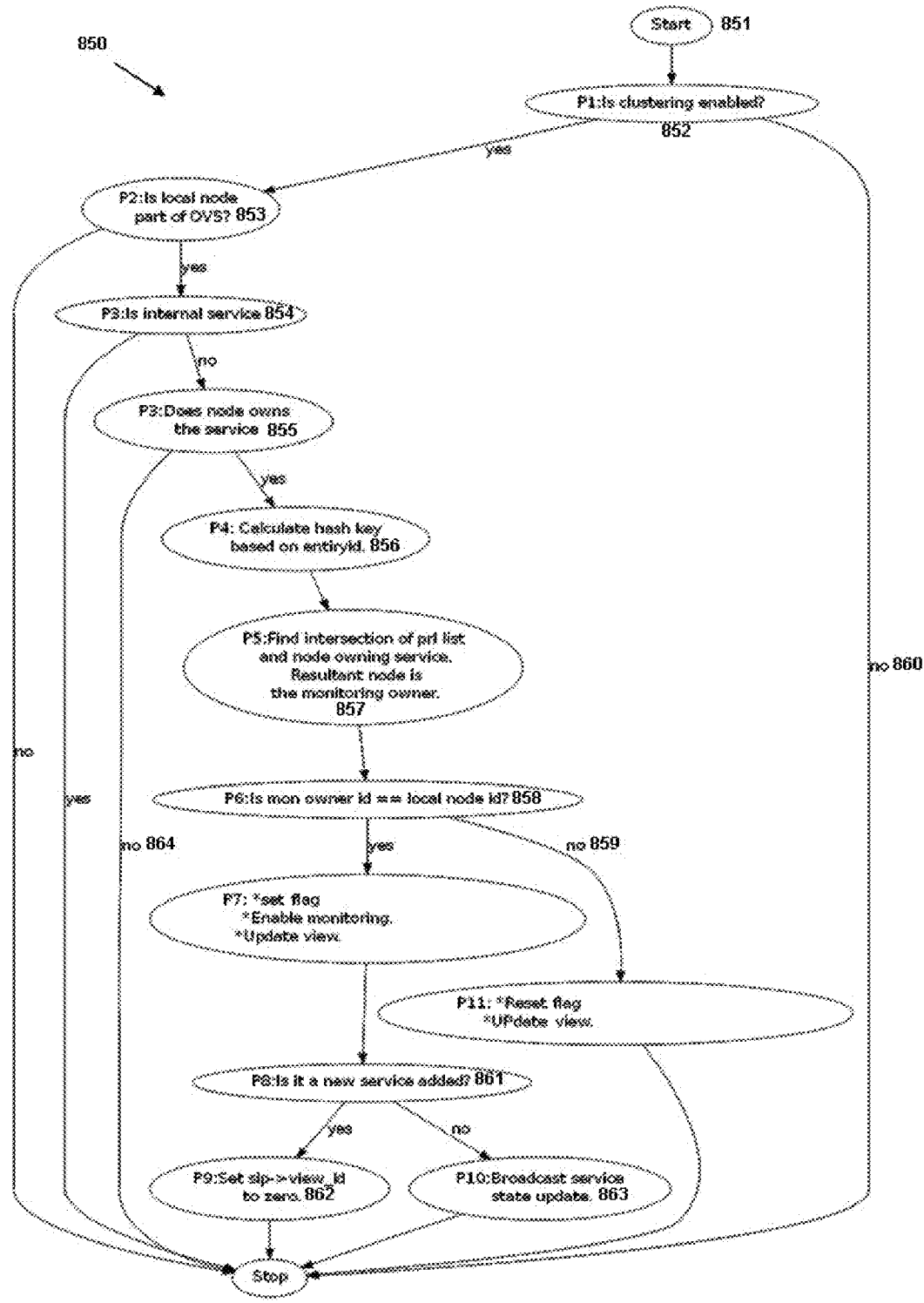
FIG. 8D is a flow diagram of a configuration event in a cluster system.

Now referring to FIG. 8D, a flow diagram of a configuration event in a cluster system is illustrated. In some embodiments, a configuration event may be an event generated from a configuration change (e.g., a topology change to the cluster). In an embodiment, ownership of the services in the cluster may be redistributed among the nodes in the cluster in response to a configuration event in the cluster. In one embodiment, the configuration event changes a topology of the cluster. Examples, without limitations, of a configuration change include adding or deleting a service, or naming a service or a service group. In further embodiments, when a new service/named service/service group member is added, a clustering-specific processing function may performed to distribute monitoring among the active nodes in the cluster, such as an RSS hash of information about each service to distribute monitoring of said services among the nodes. The monitor of a service may generate a service state update for the service in response to the configuration event in the cluster. The monitor may keep re-transmitting an acknowledgment message to each node in the cluster until each node in the cluster acknowledges receipt of the service state update.

In some embodiments, to distribute the monitoring, the following operations may be performed by the distribute event handler. At step 852, the distribute event handler may check if the clustering is enabled or not. If the clustering is not enabled then no operations need to be performed. At step 853, the distribute event handler may identify if the local node is part of the Open vSwitch (OVS). If the local node is not part of OVS, then no operations will be performed at this time. Whenever the node joins the cluster at a later point, then the clustering specific operations may performed then. At step 854, the distribute event handler may determine if the service is an internal service. If the service is an internal service than no monitoring distribution is required. At step 855, the distribute event handler may check if the service is owned by the local node or not. This check may be required due to asymmetric configuration of all the services that are not owned by all the nodes in the cluster. If the node does not own the service, then do not perform any operations. At step 856, the distribute event handler may calculate the hash key of the service based on the entity ID. At step 857, the distribute event handler may obtain the PRL list and find the first intersection of the node that will be the monitoring owner of the service. At step 858, the distribute event handler may determine if the owner node ID is the local node ID.

At step 859, if the local node is the monitoring master of the add service then, in some embodiments, the distribute event handler may set a flag in the server information, representing the current node as the master node. In further embodiments, the distribute event handler may enable the monitoring for the service. In still other embodiments, the distribute event handler may copy the current view ID from the global list to the master node. At step 861, the distribute event handler may determine if the monitoring distribution was called due to addition of a new service. At step 862, the distribute event handler may set the server information value to zero. Because the service may be a new service, no node will have previously updated the service state, so it may be initialized. At step 863, the monitoring distribution API may be called to redistribute the existing service ownership. To redistribute the existing ownership, the API may send an SSS broadcast update message to declare the new ownership and to avoid race conditions. At step 860, if the local node is not the monitoring master of the add service, in some embodiments, the server information monitoring flag is reset and the server information master view is updated. The monitoring may be disabled when the new owner updates by sending SSS message.

Figure 8E:
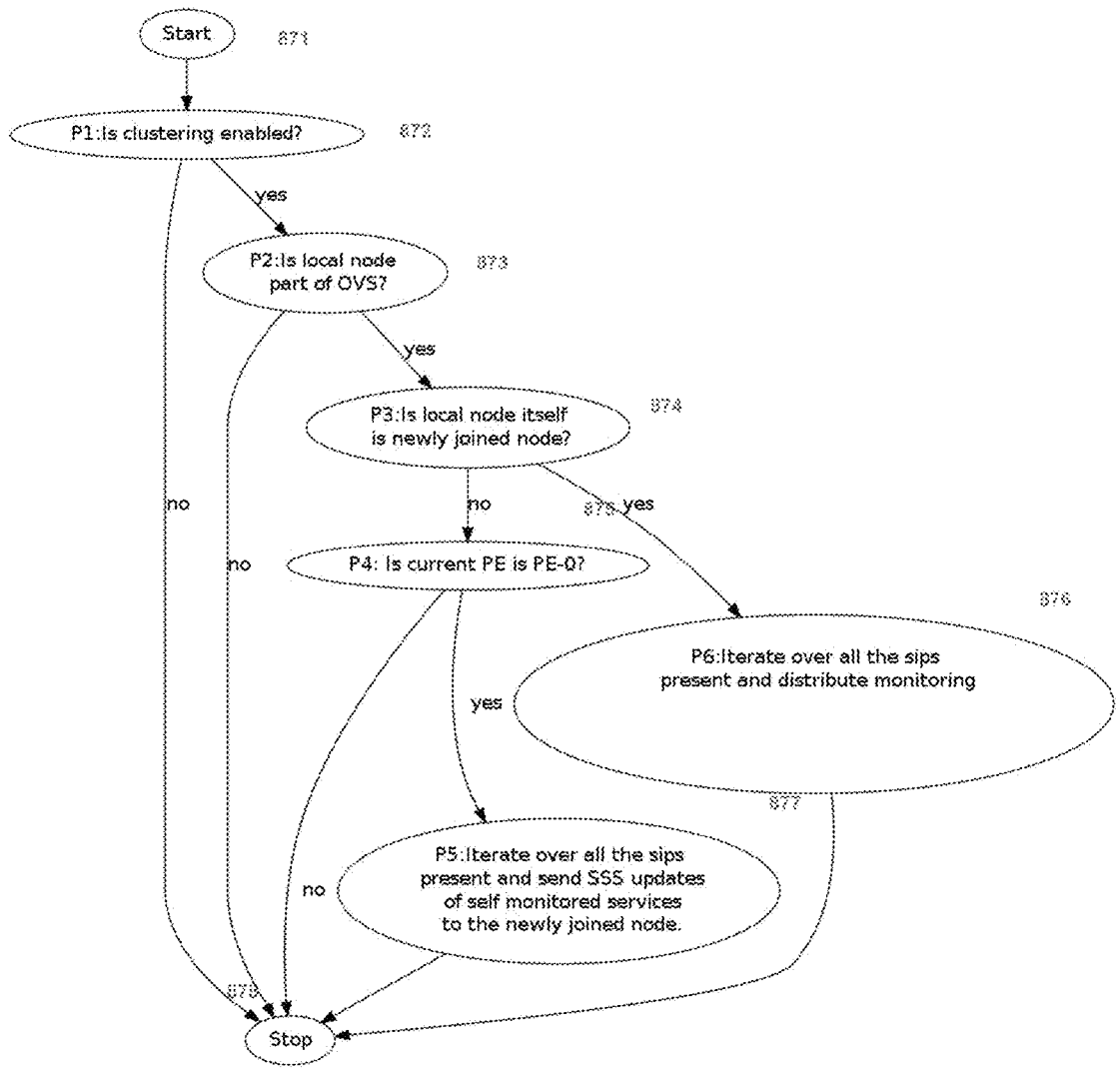
FIG. 8E is a flow diagram of another configuration change in a cluster system.

Now referring to FIG. 8E, illustrated is a flow diagram of a configuration change in a cluster system, such as deleting an entity. In some embodiments, whenever an existing service, named service, or service group member is deleted, no clustering specific processing will be required. However, in other embodiments, configuration messages may need to be broadcast to avoid race conditions or other errors.

In some embodiments, a quorum service provider may send messages to all nodes in the form of events whenever any node joins or leaves the OVS. When a node event handling occurs, a new application type may be registered in the PE cluster module and corresponding new application handles will be added to the command list. In further embodiments, multiple events can occur simultaneously. In such cases, the PE will queue the core to core messaging (CCM) events in a new list for later processing by the system by the PE.

In some embodiments, when a node joins the OVS, an event will be generated by the Quorum Service Provider (QSP) and it will be sent to all the PEs of all the nodes. The add event message may be queued onto the CCM events list. Each PE may call the event handler for the join event, responsive to receiving the event from the QSP.

Still referring to FIG. 8E, in some embodiments, the following operations will be performed by the join event handler. At step 872, the join event handler may determine if the clustering is enabled or not. If the clustering is not enabled then no more operations may be necessary. At step 873, the join event handler may identify if the local node is part of the OVS. If the local node is not part of OVS then no more operations need to be performed. At step 874, the join event handler may determine if the local node is the new node due to which join event has been received. At step 875, the join event handler may determine if the local PE is PE0. At step 877, if the local node is not the newly joined node then, in some embodiments, the PE0 may only go through all the server information in the global server and send service state update (SSS) of the services to which the local node is monitoring to the newly added node. At step 876, in some embodiments, if the local node is not the newly added node, then the PE may go through all the server information in the global server and call the distribute event handler to redistribute the monitoring ownership for all the services in the list.

Figure 8F:
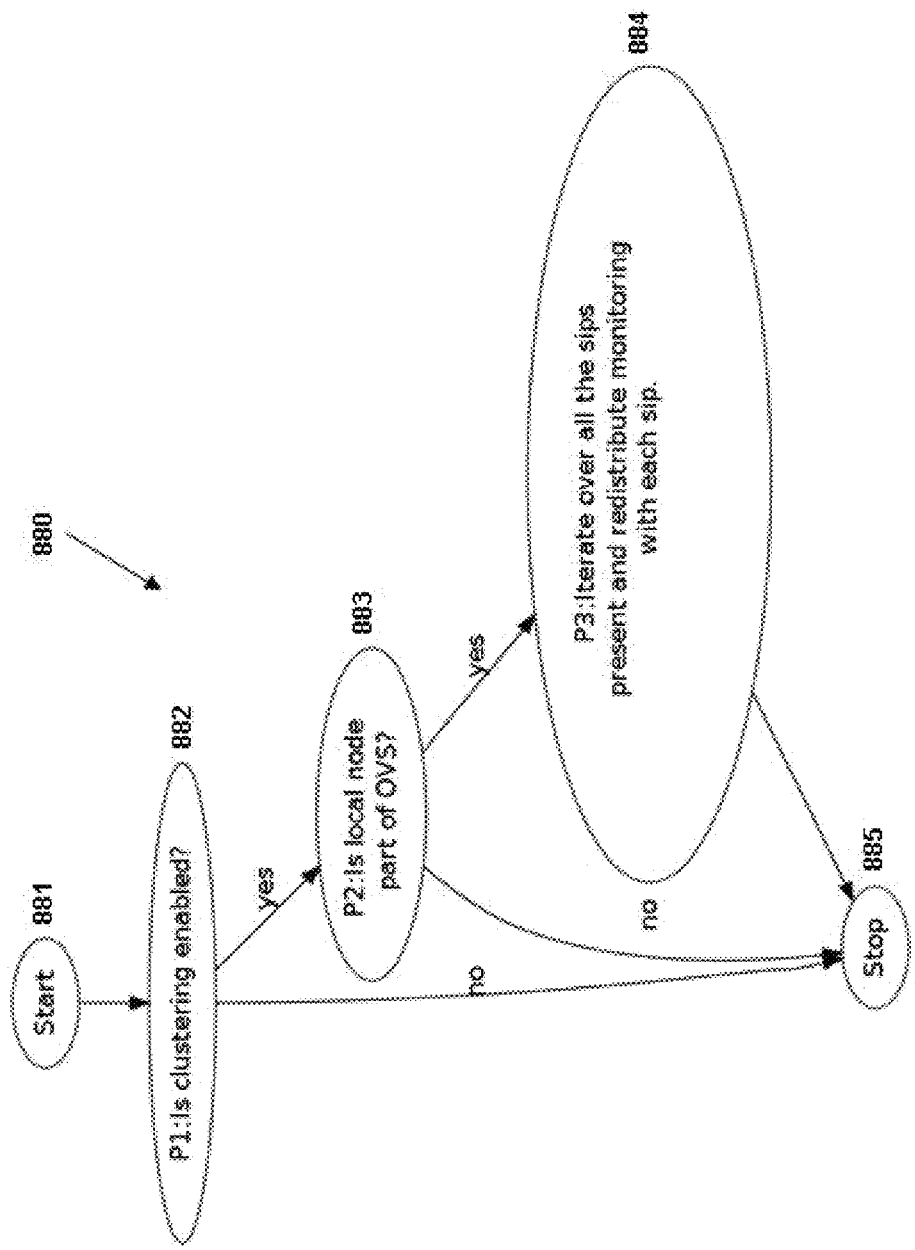
FIG. 8F is a flow diagram illustrating when a node leaves a cluster.

Now referring to FIG. 8F, illustrated is a flow diagram illustrating a when a node leaves a cluster. In some embodiments, when any node leaves the cluster, for example and without limitation because either it has gone down or the node has been removed from the cluster by configuration, an event will be received by all the nodes in the cluster. In further embodiments, the event notification may be transmitted by a PE. In still other embodiments, the leave event may be queued onto the CCM events list.

In some embodiments, the following operations may be performed by a leave event handler. At step 882, a leave event handler may determine if clustering is enabled or not. If the clustering is not enabled than no more operations need to be performed. At step 883, the leave event handler may identify if the local node is part of the OVS. If the local node is not part of the OVS, then no more operations need to be performed. At step 884, each of the PEs may access the server information in the global server and call the distribute handler to distribute the monitoring for all the services in the list. In some embodiments, a PE NNM message handling interface may provide facility to parse and call message handlers based on the message groups and their respective messages types.

Figure 8G:
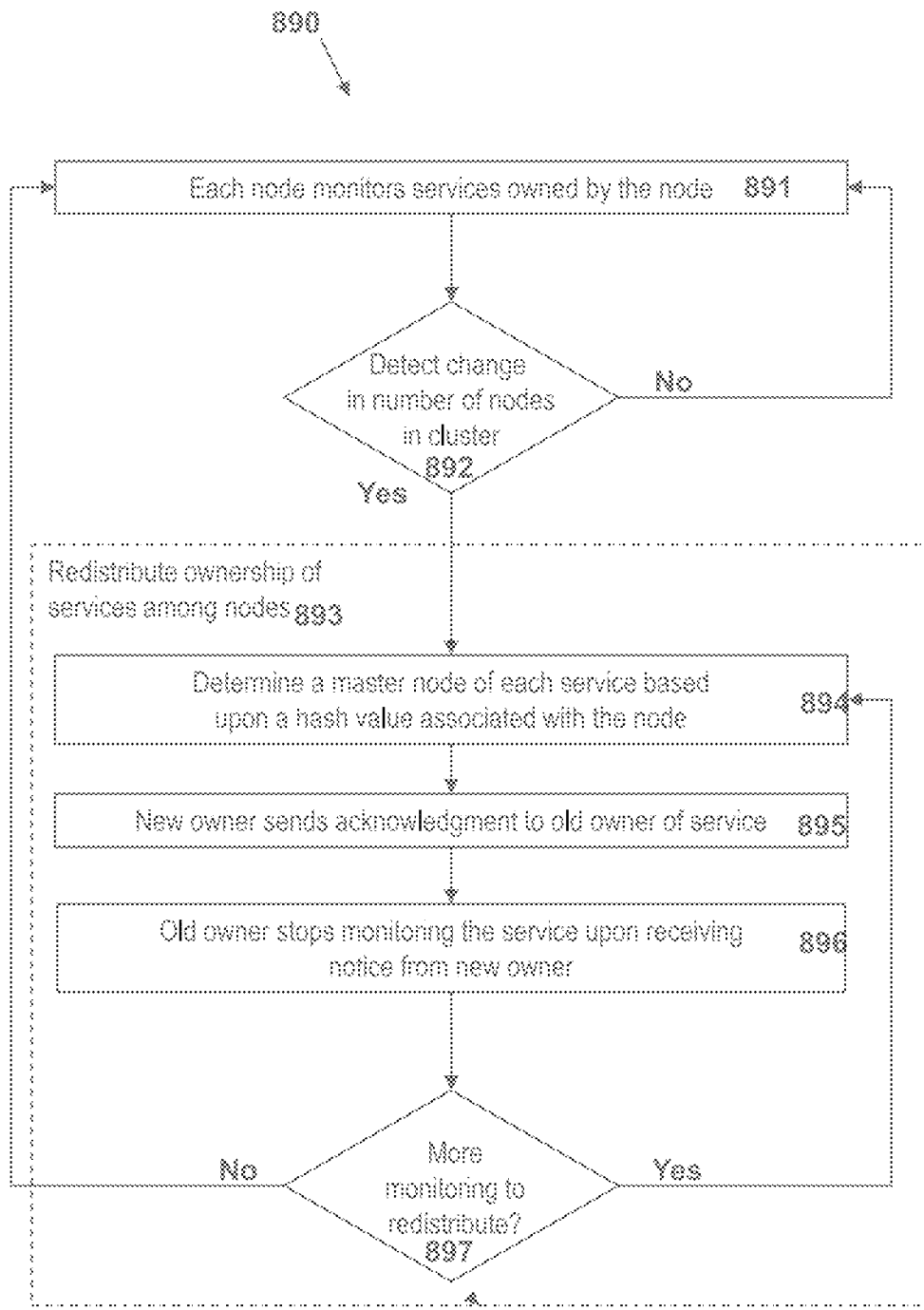
FIG. 8G is a flow diagram for a method for redistribution of ownership of services in a cluster system.

Now referring to FIG. 8G, illustrated is a method 890 for redistribution of ownership of services 821 in a cluster system 800. At step 891, in some embodiments of distributed monitoring within a cluster, a plurality of nodes 801 may each monitor the services 821 they have ownership of. At Step 892, a change in the number of nodes 801 active in the cluster 800 may be detected, or the nodes may receive a notification of a change in the number of active nodes. In some embodiments, the change may be detected responsive to a node 801 joining the cluster 800. In other embodiments, the change may be detected responsive to a node 801 leaving the cluster 800 or becoming unresponsive. If no change in the number of nodes 801 in a cluster 800 is detected, the nodes 801 may continue to monitor the services 821 they each own. At step 893, further comprising steps 894-897 in some embodiments, if a change in the number of nodes 801 has been detected, the ownership of services 821 may be redistributed among the plurality of nodes 801 active in the cluster 800. The services 821, in some embodiments, may be redistributed to balance the load in the cluster 800. In other embodiments, the services 821 may be redistributed equally among the plurality of nodes 801 in the cluster 800. In further embodiments, the redistribution of ownership of services 821 may be performed according to method 830 as discussed above.

At step 894 as part of step 893, a master node 801 for each service 821 may be determined based upon a hash value associated with the node 801. At step 895, the new owner of the service 821 may send an acknowledgement to the old owner of the service 821. The acknowledgement may indicate to the old owner that the service has a new owner node 801. At step 896, the old owner may stop monitoring the service upon receiving notice from the new owner node 801. The old owner node 801 may continue to monitor the services 821 it still has ownership of. If there are additional services and monitoring duties or ownership to redistribute, then steps 894-897 may be repeated in some embodiments. In many embodiments, steps 894-897 may performed iteratively for each service for which monitoring is to be redistributed, or may perform the steps in parallel or serial for the services. For example, step 894 may be performed for each service, then steps 895 and 896 for each service.

Figure 9A:
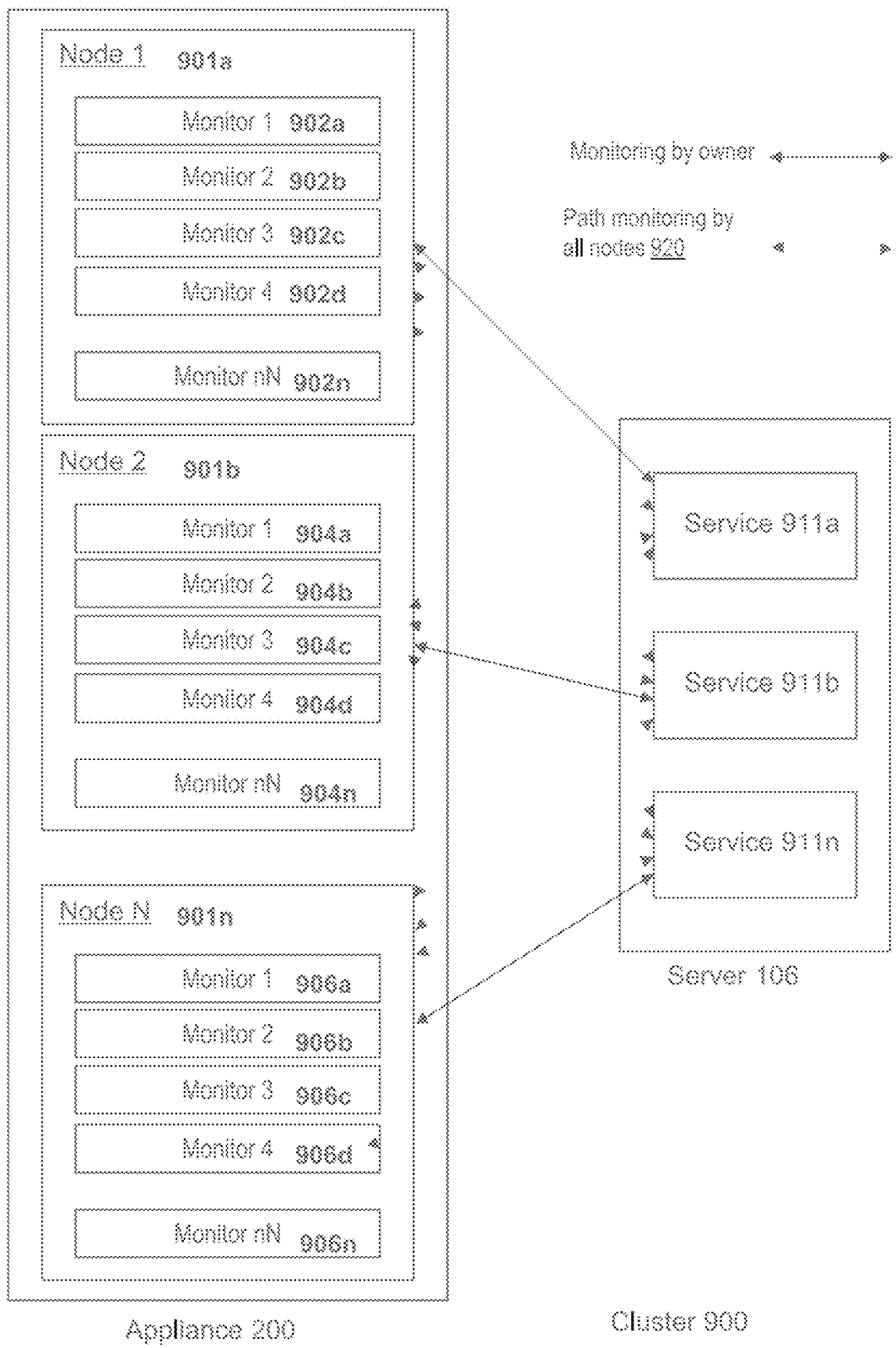
FIG. 9A is a block diagram of an appliance used for monitoring of one or more services across a plurality of nodes in a cluster system using path monitoring.

Now referring to FIG. 9A, illustrated is a block diagram of an appliance 200 used for monitoring of one or more services 911 across a plurality of nodes 901 in a cluster system 900 using path monitoring 920 (illustrated in dashed lines). The appliance 200 may be a multi-core or multi-node in a cluster system 900. A node 901 may be a connection point in a cluster system 900 and may be capable of receiving, transmitting or forwarding information over a network. In the embodiment shown, the one or more nodes 901 may be associated with one or more network services 911. In other embodiments, the one or more nodes 901 may monitor an appliance 200, vServer, network service 911, client, or any other network resource, with each node designated as the "owner" of a service 911*a*-911*c* and monitoring said service (solid line). Each owner may communicate status of their monitored service to the other nodes via node-to-node messaging. Each service 911 may also have a path monitoring 920 capability.

In some embodiments, a monitor for a service may enable a path monitoring option for the service. The path monitoring 920 may allow all nodes in a cluster to determine reachability to the service without communicating with the master node 901. In one embodiment, when the path monitoring option is enabled, non-owner nodes in the cluster may probe the service to determine a service reachability from the respective node to the service. As shown, in some embodiments, path monitoring 920 may be performed by all nodes 901 in the cluster system 900 to each service 911, irrespective of whether a node owns the service or not, to verify reachability of each service by the node. Once each node has determined the service reachability, the non-owner nodes may transmit a path monitoring state update to the owner node (e.g., monitor) of the service. The path monitoring state update may include the service reachability for the respective node to the service. The monitor of the service may update a status of the service with the service reachability information for each node in the cluster.

Figure 9B:
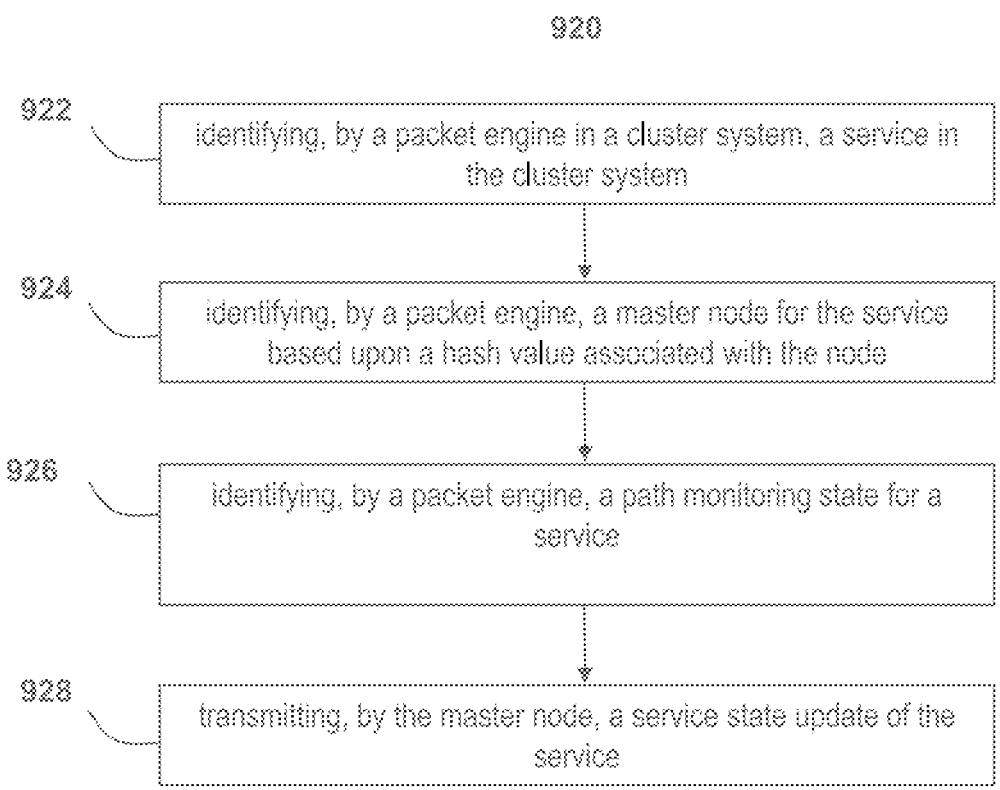
FIG. 9B is a diagram of a method for monitoring of one or more services across a plurality of nodes in a cluster system.

Now referring to FIG. 9B, a diagram of a method for monitoring of one or more services 911 across a plurality of nodes 901 in a cluster system. At step 922, the method may include identifying, by a PE in a cluster system, a service in the cluster system. At step 924, the method may also include identifying, by the PE, a master node for the service based upon a hash value associated with the node. At step 926, the method may further include identifying, by the PE, a path monitoring state for a service. At step 928, the method further includes transmitting, by the master node, a service state update of the service, to the other nodes in the cluster system.

The feature of probing the service from all the cluster nodes to check individual reachablility may be referred to as Path monitoring. Path monitoring may be enabled, configured or disabled via add and set commands for service and service groups, providing granular control on a per-service level. By default, the pathMonitor option may be disabled for all the service and service groups. When a PE enables the validate path option for any given service, each node that owns or executes the service may start probing the service using ICMP (ping probes). In some embodiments, the effective service state may be calculated at the time when SSS update may be received from the monitoring owner of the service. Individual nodes can have different service state based on the service reachability from the node.

In some embodiments, the method may include the path monitoring state for a service 911 being disabled initially. In still other embodiments, the method may include enabling, by a PE, the path monitoring state for a service 911. In further embodiments, the method may include probing, by the master node 901, the service 911 using the path monitor 920 of the service. In various embodiments, the service state update of the service may include both the service state and the path monitoring state.

In one implementation, the method may include disabling, by a master node 901, the path monitoring status of a service 911. The path monitoring status may be disabled using a service command. In still other embodiments, the method may include transmitting, by the master node 901, that the path monitoring 920 of a service has been disabled to the cluster system 900.

Individual nodes may have different service states based on the service reachability from the node. In some embodiments, a PE might want to bring down the service on each and every node 901 of the cluster 900, even if only one node 901 is not able to reach the service 911. For example, if a plurality of nodes are communicating with a database, and one node is unable to reach the database, a PE may choose to restart the service rather than have a percentage of requests go unfulfilled. In some embodiments, the path-Monitorindv option may be enabled by default and this option will be configurable only if the validatePath option is enabled. In an embodiment, if the pathMonitorindv is disabled then the service will be advertised down if one or more nodes are not able to reach the service.

In some embodiments, for any given service, each node may send the path monitor state update message to the monitoring owner of the service. The path monitoring state update message may consist of two parameters: a unique ID of the service and the current path monitor state. Upon receiving the "enable path monitoring" command the "default-pathmon" monitor may be created if not present. In further embodiments, the monitor may be bound to the service. In still other embodiments, the path monitor may be enabled on only OVS nodes, though the "enable pathmon" will be fired on all the online CVS nodes, to ensure no passive nodes will monitor service. The path monitoring cache may be checked so as to fetch all the path monitoring updates from the other OVS nodes that could have been received before "enable pathmon" command or even before "add service" command was fired on the local node. Then, in some embodiments, the local node PM probe may update the master node with the local PM state and the bitmap will be updated accordingly.

In some embodiments, upon receiving the "disable path monitoring" command, the path monitor will be unbound from the service. On non-master nodes the backed up state may be re-enforced. The backup state may store the latest monitoring state told to the node by the monitoring owner. In still other embodiments, on the master node, state recalculation may be triggered and the MOS will send the SSS update incase a change in state is detected.

In various embodiments, each and every OVS node might use path monitoring, and whenever there is a change in the path monitoring mip state, the node may broadcast the path monitoring update to all the active nodes on CVS set. In some embodiments, the incoming traffic may be redirected from a node n0, which has lost its connectivity with the network or services to other nodes which are still able to reach the services. In further embodiments, to notify other nodes of the loss of connectivity, each vserver and service may have a processing set associated with it, and the processing set to be updated on each and every node based on path monitoring bitmap to make it aware of which services are reachable from which all nodes.

In further embodiments, such as in the case of master node change, online client virtualization service (CVS), which may not be part of OVS, can become the new master node. When the CVS becomes the new master node, the, path monitoring bitmap may be updated along with the service state to allow it to monitor and update correctly. In still other embodiments, when a new node joins to the online CVS set, the node may be synced with the following information before it may be allowed to become part of OVS: each of the MOS nodes may send an SSS update to the newly joined node and each node may send the path monitoring updates for each and every service for which path monitor is active.

In some embodiments, when a change in the state of the path monitoring occurs, the local node may send the path monitoring update via a C2C message to the monitoring master to update, if the monitoring master core does not own or is bound to the service. In further embodiments, the node will broadcast the PM update message to all the nodes in the online CVS. One non-limiting example of a PM update message will be as shown below:

```
typedef struct nsmc_mon_pm_update_
{
u32bits pm_bitmap_delta;
u32bits pm_bitmap_available_delta;
u08bits pm_src_node_id;
u08bits pm_res[3];
u32bits pm_flags;
u32bits sip_uniq_id;
}nsmc_mon_pm_update;
typedef struct
{
nsmc_mon_msg_generic_hdr mon_msg_hdr;
u32bits num_updates;
nsmc_mon_pm_update updates[0];
} nsmc_mon_pm_update_msg;
```

In various embodiments, the same structure nsmc_mon_pm_update_msg may be sent as payload of node to node path monitoring update message. As the path monitoring update is broadcast to all the online CVS nodes, the update can land on any core on the destination node. Accordingly, the same core to core messaging service may be used to transmit the remote path monitoring update to the monitoring master.

In some embodiments, upon receiving the path monitoring update, the master node may update its local bitmap with the information received in the path monitoring update, irrespective of whether it is in OVS or not or it is the master node or not. In still other embodiments, if the recipient is not part of OVS, then the node may no longer receive path monitoring update messages. In further embodiments, where the recipient node is part of OVS, then the processing may be based on whether the node is the master node of the service or not. If the node is the master node of the service, then in some embodiments, the node will recalculate the service state based on the updated bitmap and send an SSS update with any change in service state. Otherwise, if the node is not the master node of the service, then it will just digest the path monitoring update without doing any processing.

In some embodiments, where the "individual path monitoring decision" option is ENABLED, then all the non-master nodes may override their own state if the PM mip state is DOWN. Further, non master nodes may also take backup of the service state to reinstate the original state back in case of "disabling of path monitor". In various embodiments, the backed up state may be refreshed by the SSS update from the master node, in case there is any update while the service state is DOWN on the local node due to individual path monitoring decision.

The PM updates can be broadcast even if the individual path monitoring decision option is enabled as possessing set of the services is required to be updated. In some embodiments, when the "individual path monitoring decision" option is disabled, which it may be by default, the master node may consider the path monitoring bitmap for computation of the service state and send the service state as down if even a single node in the current OVS is not able to reach the service. Rest processing may be the same as in cases where the "individual path monitoring decision" option is disabled.

Figure 9C:
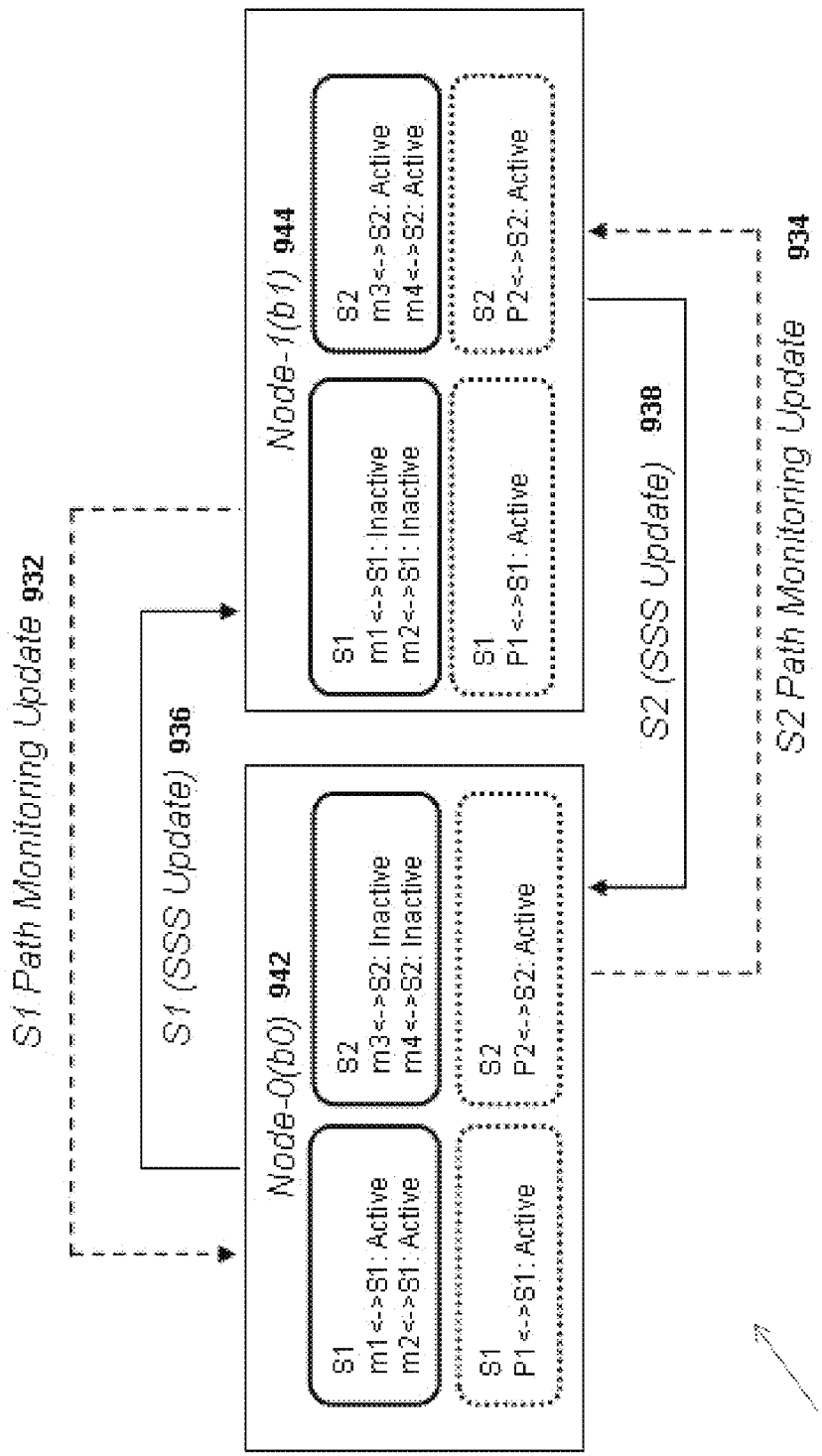
FIG. 9C is one illustrative example of a method for monitoring services in a cluster using path monitors.

Now referring to FIG. 9C, illustrated is one illustrative example of a method for monitoring services in a cluster using path monitors. In FIG. 9C, the two-node cluster system has nodes b0 942, and b1 944. Two services S1 and S2 are executed on each node, as well as monitors m1 and m2 which are bound to S1 and m3 and m4 which are bound to S2. Path monitors P1 932 and P2 934 may be executed for services S1 and S2, respectively. In some embodiments, the path monitor is not bonded to the actual sip. A separate sip may be created for any given service whenever validatePath option is enabled.

In one embodiment, a hash of identifiers of service S1 may yield b0 942 and a hash of identifiers of S2 may yield b1 944. Accordingly, the active monitor bindings on each node may include:

on b0 942: m1-S1, m2-S1 are marked active. P1-S1 and P2-S2 are also active; and on b1 944: m3-S2, m4-S2 are marked active. P1-S1 and P2-S2 are also active.

In further embodiments, whenever a service state changes, each node may update all other nodes about the service state change. The path monitors may be enabled on each and every node of the cluster for all the services. Responsive to status determined by the path monitors, each node may send reachability states for the service (e.g. up or reacheable, or down or unreachable) to the monitoring owner of the service.

In one implementation, for DBS services, there may be two bindings, for example primary server information and secondary server information. The ownership of the two bindings may be given to the same node as the ownership is service based. In further embodiments, whenever there is an IP address change, the owner node may send update to the other nodes in the cluster as part of SSS (service state) update. The recipient node may update the IP address and the service state accordingly. In some implementations, script based monitoring may be done by the master node and states may be transmitted to all the other nodes.

Figure 9D:
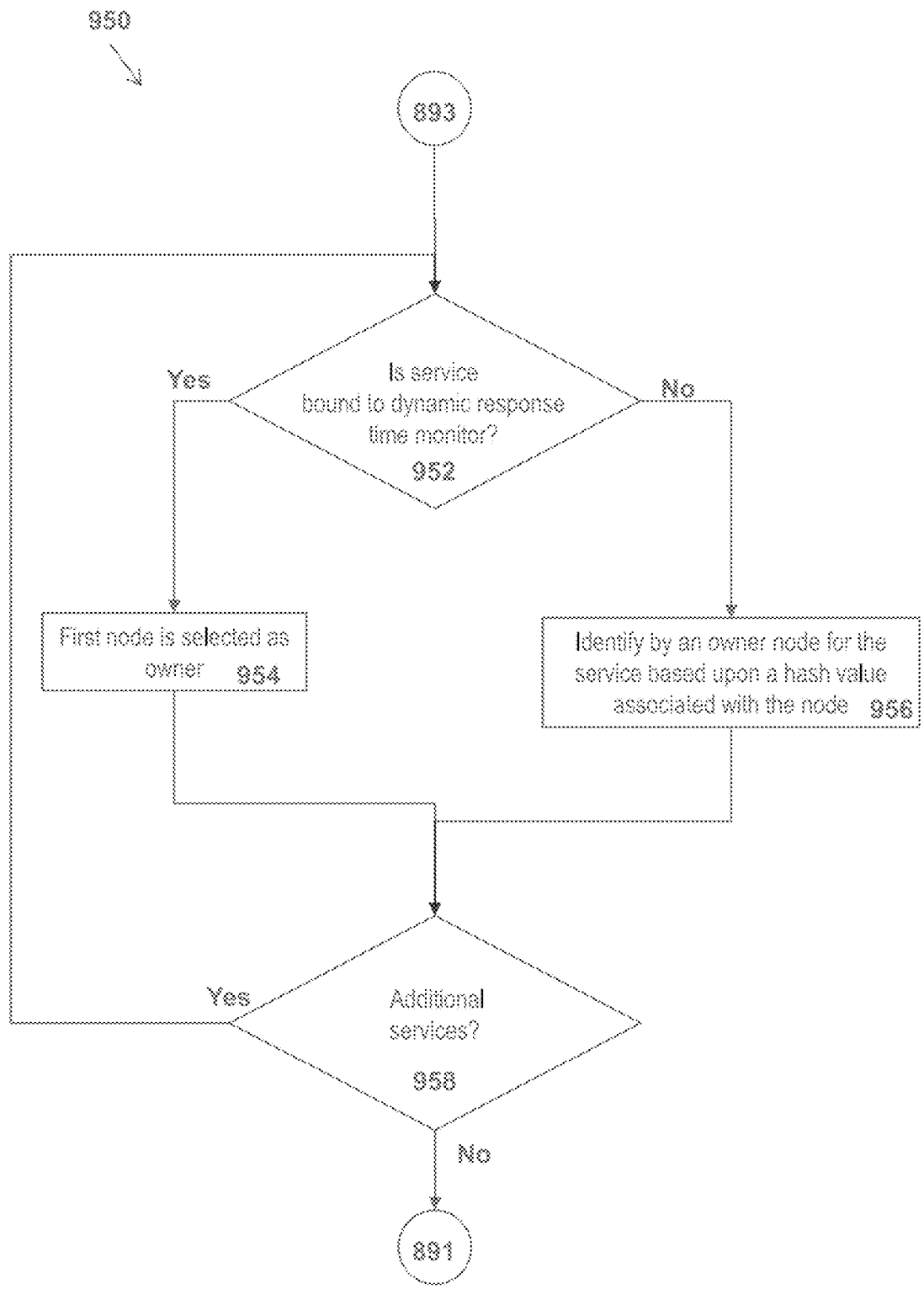
FIG. 9D is a diagram of a method for handling dynamic response time monitors.

Now referring to FIG. 9D, illustrated is a diagram of a method 950 for handling monitoring of dynamic response time monitors (DRTM). To handle dynamic response time monitors, in some embodiments, the ownership of all the services to which DRTM monitor has been bounded may be moved to the same node 901, irrespective of vserver binding, so that no node to node messages need to be sent. This may be done because response times may change every probe and accordingly, sending updated response times may be very expensive. In various embodiments, the owner node 901 will know the response time of all the services to which a DRTM monitor is bound, and therefore can calculate the dynamic timeout intervals independently. Accordingly, during redistribution of monitoring duties at step 893 of method 890 illustrated in FIG. 8G, if DRTM monitors are bound to services, method 950 may be executed.

Specifically, at step 952, a determination may be made as to whether a service 911 is bound to a dynamic response time monitor (DRTM). If so, at step 954, a first node 901 may be selected as owner node 901. Although referred to as a "first" node, the first node 901 may be any node in the cluster system 900, and this term is used simply to differentiate the DRTM monitoring node from other nodes. In fact, the DRTM monitoring node may, in many instances, be selected via a hash value as discussed above for the first iteration of step 954. If a service 911 is not bound to a DRTM, at step 956, an owner node 901 for a service may be identified based upon a hash value associated with the node 901 as discussed above. In some embodiments, Step 956 may be the same method as method 920. If there are other services for which monitoring needs to be distributed, then steps 952-958 may be repeated for each additional service. When the same service or another service bound to a DRTM comes up during an iteration of steps 952-958, the same "first" node may be selected at step 954, such that the chosen node is utilized for monitoring all services bound to a DRTM. In many embodiments, steps 954 and 956 may each include steps 895-896 of method 890 of FIG. 8G discussed above.

In some embodiments, to handle least response time method (LRTM), the monitoring will be distributed by the standard monitoring distribution discussed above and the MOS may send response time, LRTM messages or updates to all the other nodes. In various embodiments, the total response time may be used by all the nodes to perform load balancing. The LRTM message, may be sent only after current monitor has successfully sent at least one SSS update to all the nodes in some embodiments. In still other embodiments, the LRTM update may only be sent if at least one LRTM enabled monitor is attached with the service and the service is bound to at least one vserver whose load balancing method is set to LRTM. In further embodiments, the LRTM information message may be sent only if the total response time has diverted by at least 5% from the last sent value. The LRTM info may also be synced with the SSS update before the node joins OVS.

In some embodiments, to handle custom loading distributions, the monitoring may be distributed by standard monitoring distribution and the MOS may send the following information to all the other nodes: threshold reached flag, load learnt from the load monitors and round robin (Rr) contributions. In various embodiments, the above three parameters may be used by all the nodes to perform load balancing in case load balancing method is set to least load. The custom load message may only be sent after current monitor has successfully sent at least one SSS update to all the nodes. In some embodiments, the custom load update may send only an if at least one custom load enabled monitor is attached with the service. The custom load info message may only be sent, in some embodiments, if either load has diverted by at least 5% from the last sent value or the threshold flag has changed. In some embodiments, the custom load info may be synced with the SSS update before the node joins OVS.

In some embodiments, because traffic may be evenly distributed among nodes, a simple monitor may be sufficient for the requirement of monitoring a cluster system. For example and without limitation inline HTTP/S monitor and traffic monitor TCP.

I. Systems and Methods for Application Specific Load-Balancing

The systems and methods of the present solution illustrated in FIGS. 10A-11B are directed towards load balancing among servers based on application and application availability. Currently in some deployments of application load-balancing among backend servers, all back-end servers have the same set of applications and are homogeneous in terms of application availability. The present solution allows for servers to be heterogeneous in terms of application availability and load-balancing can be performed among them. Each of the servers may have different applications actively present on them and/or some applications may be present on some services but not others in a plurality of servers. A load balancing server intermediary to a plurality of clients and a plurality of services executing on a plurality of servers can handle client requests for applications based on application availability and forward the request to service based on application availability.

Figure 10A:
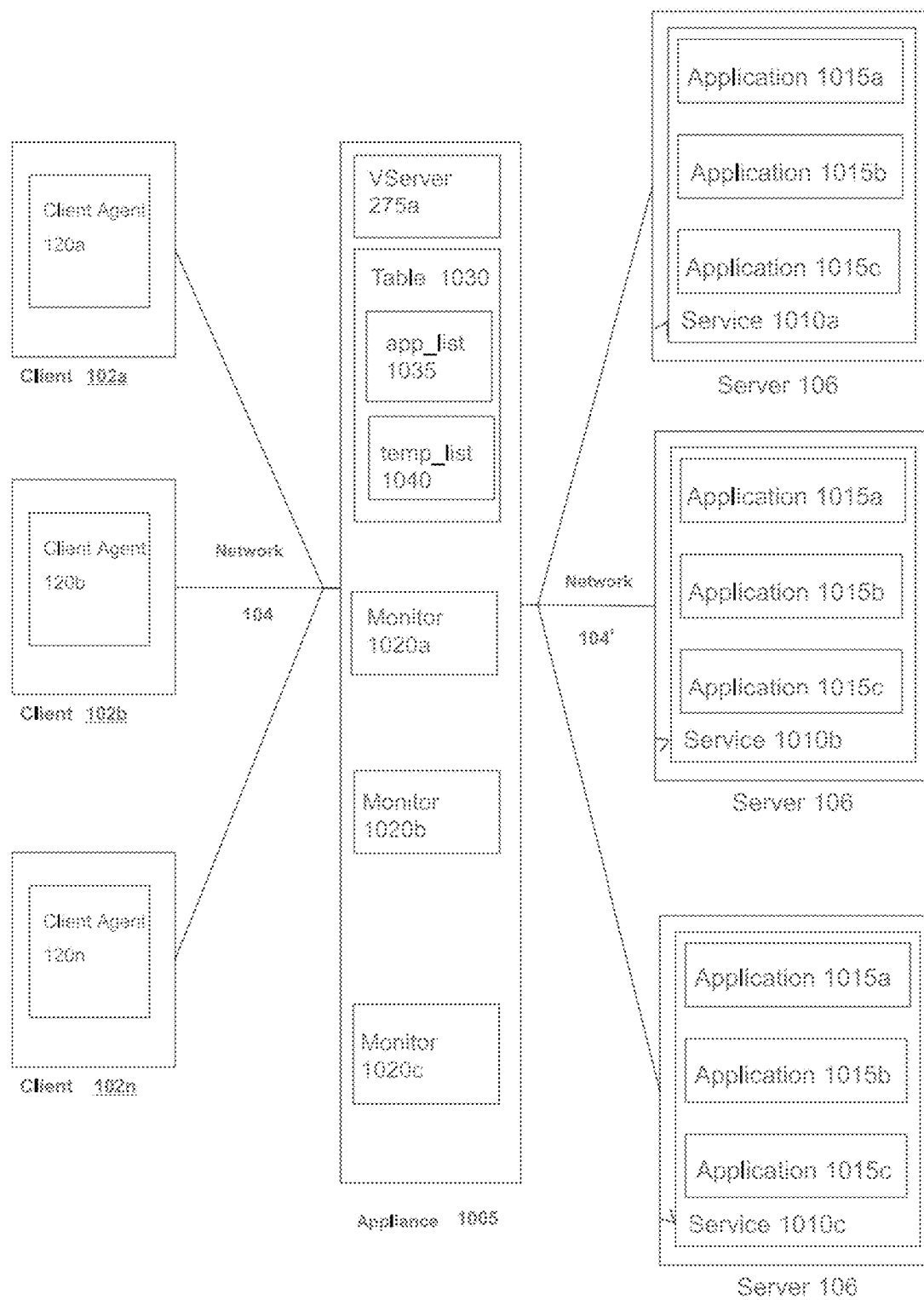
FIG. 10A is a block diagram of a system application specific load balancing for web servers.

FIG. 10A is a block diagram of a system for application specific load balancing for servers, such as web servers. In more detail, FIG. 10A depicts an appliance 200 intermediary to a plurality of clients 102a-n, and a plurality of services 1010a-n executing on a plurality of servers 106a-n. The appliance may perform load balancing for the plurality of servers 106a-n based on applications available on each of the services 1010a-n executing on the plurality of servers 106a-n. Each of the services 1010a-n may include one or more applications 1015a-n actively present and/or available.

In a brief overview, the appliance 200 includes a virtual server, referred to as a vServer 275, a plurality of monitoring agents 1020a-c, and a table 1030. The appliance 200 and its various components may be similar to the appliance 200 described above, for example with respect to FIGS. 1A-9D. In some embodiments, the appliance 200 provides load balancing among servers 106 in responding to requests from clients 102. The requests may identify a specific application by an identifier. The appliance 200 may load balance requests from clients 102 based upon the availability of applications 1015 active on the services 1010 and corresponding to the identifier.

An application 1015 may be any type of program, library, script or executables instructions, group of programs, or software designed to perform a predetermined or specific function or provide a certain set of services or functionality. In some embodiments, the application may comprise any type and form of database and/or database related services. For example and without limitation, an application may include at least one of a database program, web browser, word processor, development tools, image editing programs, or communication programs.

The vServer 275 may receive, intercept or otherwise processes communications between a client 102 and a server 106 in accordance with the configuration and operations of the appliance 200. The monitor 1020 may be referred to as a monitoring agent. Each of the plurality of monitoring agents 1020a-n may comprise any program, script, daemon, or other computing routine that reports a performance or operational characteristic of a service 1010a-n to the appliance 200. The monitor 1020 may communicate with a service 1010 to determine a number of applications 1015 present on the service 1010. In some embodiments, the monitor 1020 may use a request/reply messaging mechanism or protocol with the server. In one embodiment, responsive to probing a service 1010, a monitor 1020 may transmit a monitor response to the appliance 200. The monitor response may indicate the number of applications present on the service 1010. In some embodiments, a single monitor 1020 may monitor a plurality of servers 106. In other embodiments, a plurality of monitors 1020 may monitor a single server 106. In still other embodiments, a plurality of monitors 1020 may each monitor a plurality of servers 106, wherein each of the plurality of servers 106 is monitored by a plurality of monitors 1020. The monitor may be similar to the monitoring agents described above with respect to FIGS. 7A-9D.

In the embodiment shown, the one or more monitors 1020 are associated with one or more services 1010 executing on one or more servers 106. In other embodiments, the one or more monitors 1020 may monitor an appliance 200, vServer, network service 270, client, or any other network resource. The monitor 1020 may be similar to the monitoring agents described above with respect to FIGS. 7A-9D.

The table 1030 may comprise a data structure or object stored or maintained in memory. The table 1030 may comprise a table, data structure or object stored or maintained in storage or a database. The table 1030 may include an application list 1035, referred to as an app_list, and a temporary list 1040, referred to as a temp_list. The application list 1035 may include a list of applications actively present on a plurality of services 1010a-n. The temporary list 1040 may be a temporary list of applications dynamically creating during an update of the table 1030. The temporary list 1040 may be used to compare against the application list 1035 to determine if the number of applications actively present on the plurality of services 1010a-n has changed. The table 1030 will be described in greater detail below with respect to FIG. 10B.

FIG. 10B is a block diagram of an embodiment of a table on an appliance used for load-balancing among servers. For clarity, only one table 1030 is illustrated, but one of skill in the art may readily appreciate that the present systems and methods may be scaled to include any number of tables 1030. A table 1030 (e.g., GLOBAL_APP_HASH_TABLE) may be maintained for storing a list of application populated from monitor responses received from various monitors established for each service 1010. In some embodiments, the GLOBAL_APP_HASH_TABLE may be referred to as the first table. In an embodiment, the mapping for the table 1030 may be done according to a hash value of the application name (e.g., app_name). The various fields of information of the table 1030 may include an application name, an identifier, a service, and a monitor. Each entry of the table 1030 may correspond to an application 1015 present on one or more of the services 1010a-n. In an embodiment, each entry of the table 1030 may include information related to a particular application 1015, the identifier assigned to the application, a service 1010 that the application is actively present on and a monitor 1020 established for the service 1010. In other embodiments, the table 1030 may be organized in any way to store information related to at least one of an application, a service, a web server, or a monitoring agent.

In an embodiment, an entry in the table 1030 may be established when one or more monitors 1020 are bound to a service 1010. Once a monitor 1020 has been bound to a service 1010, the monitor 1020 may probe and/or query the respective service 1010 to determine a number of applications actively present on the service 1010. The appliance 200 can receive monitor responses from each of the monitors 1020 indicating the number of active applications present on the respective service 1010. The appliance 200 can populate the table 1030 using the results of the monitor queries and probes.

Each application identified by the plurality of monitors 1020 can be assigned an identifier and added to the table 1030. In an embodiment, the mapping for the table 1030 can be done by the identifier assigned to each application 1015. In some embodiments, the identifier may be a hash value of the application name. In other embodiments, the identifier can be any form and/or combination of letters, numerals, or characters. Each entry of the table may be based on the application name (app_name). The table can be created for any number of applications on any number of services. In one embodiment, the table can be created to store information for up to 2048 number of applications on each service.

In some embodiments, a second table may be maintained (e.g., GLOBAL_DEVNUM_HASH_TABLE). In the second table, each entry may be based on the application name (app_name) and mapping for the second table may be done using a hash value of an identifier (dev_number). The second table may include an identifier list including all of the identifiers assigned to each application and identifiers not assigned to any application yet. In some embodiments, the appliance 200 may query the second table to determine the corresponding identifier to an application. In other embodiments, the appliance 200 may query the second table to select an unused identifier and assign the identifier to an application. In some embodiments, the first table and the second table may include similar information, however the second table may be organized by the identifier and the first table may be organized by the application name. In other embodiments, the second table may be similar to the first table.

In an embodiment the table 1030 may be designed as described below:

```
app_name
{
dev_number;          /* 4 bytes*/
hash;                /* 4 byte*/
namelength;          /* 2 byte*/
ref_count;           /* 1 byte*/
appname[256];        /* 256 byte*/
app_name * next_app;
}
```

The next app may be for linklist type hash implementation of GLOBAL_APP_HASH_TABLE. The application list 1035 may include a list of all applications available on each of the services. In some embodiments, the application list 1035 may be organized based on identifiers assigned to each application 1015. For example, in an embodiment, each entry in the application list may be identified by a dev_number assigned to each application 1015 and corresponding to that application 1015. On each service, an application list character pointer (app_list char pointer) can be added to indicate whether or not a particular application 1015 is present on a service 1010. When the service 1010 is bounded with a monitor 1020 a number of bytes can be allocated to the service 1010 in the application list 1035. In one embodiment, when the service 1010 is bounded with a monitor, 256 bytes are allocated to the service in the application list 1035. Each bit may represent an application 1015. The application character pointer can point to a particular bit in the application list 1035 to indicate whether or not the corresponding application 1015 is present on the service 1010. For example, in one embodiment, when a bit is set to 1 in the application list 1035, this will indicate that the application is present on the corresponding service 1010. In another example, in one embodiment, when a bit is set to zero in the application list 1035, this indicates the corresponding application 1015 is not present on the corresponding service 1010.

In an embodiment, the table 1030 may include a temporary list (temp_list) 1040 to store information during an update of the table 1030. The appliance 200 may copy and/or transfer the information in the application list 1035 to the temporary list 1040 prior to a table update. Once the application list 1035 has been populated with the results of the monitor responses, the appliance 200 may compare the application list 1035 to the temporary list 1040 to identify any changes. The appliance 200 may analyze the comparison to determine if the status of an applications has changed or if a new applications has been detected. In an embodiment, the temporary list 1040 may be the same size as the application list 1035.

Figure 11A:
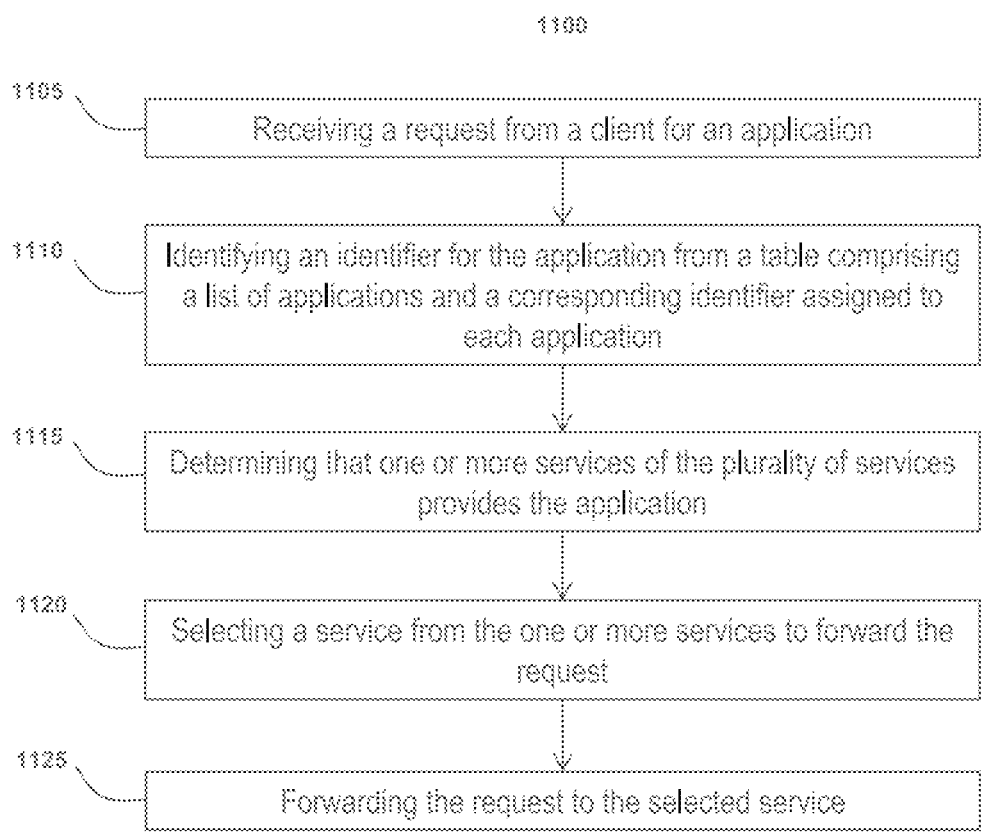
FIG. 11A is a diagram of a method for application specific load balancing for web servers.

Referring now to FIG. 11A, a flow diagram depicting an embodiment of steps of a method 1100 for application specific load balancing for servers is shown and described. In brief overview, the method includes receiving a request from a client for an application (Step 1105) and identifying an identifier for the application from a table comprising a list of applications and a corresponding identifier assigned to each application (Step 1110). The method further includes determining that one or more services of the plurality of services provides the application (Step 1115). The method further includes selecting a service from the one or more services to forward the request (Step 1120) and forwarding the request to the selected service (Step 1125).

In further detail, at step 1105, the device may receive a request from a client for an application. In an embodiment, the device is an appliance. In some embodiments, the device may be an device intermediary to a plurality of clients and a plurality of services executing on a plurality of servers. The request may include the application name or an identifier associated with the application. In some embodiments, when a client sends a request with an application name (e.g., app_name), the appliance may verify one or more conditions to select a service. The conditions may include at least one of: is the service enabled (e.g., active, usable), does the service contain the application, is the monitor for the service is enabled, or is the monitor binded to the service.

The appliance may establish one or more monitors to monitor each service to identify applications available on each service. Monitors can probe and/or query the respective service to identify active applications present on the service. The appliance can receive monitor responses from the probes indicating the number of applications present on each service. The appliance may maintain, responsive to monitoring by the one or more monitors, a list of applications in a table available for each service. The appliance may establish a global has table including the list of applications present on all of the services. For each application identified an application entry is established in the table. The application entry may include a identifier (e.g., dev_number) which can be used to search for the application in the table.

At step 1110, the appliance can identify an identifier for the application from a table comprising a list of applications and a corresponding identifier assigned to each application. The appliance may query, search or look up in the table for the respective identifier based on the application indicated in the client request. The appliance may use the application name, a hash of the application name, or any kind of information associated with the application to search the table for the respective identifier. In some embodiments, the appliance may query, search or look up in a second table for the identifier corresponding to the requested application. In an embodiment, the appliance may query, search or look up in any number of tables to identify the identifier corresponding to the requested application. In an embodiment, to search for a particular application on a service, the appliance can retrieve, obtain or identify the identifier (e.g., dev_number) from the table (e.g., GLOBAL_APP_HASH_TABLE).

In an embodiment, the identifier may be pre-established by a program or administrator. In other embodiments, the identifier may be created by the appliance, for example, during load-balancing functions. In some embodiments, to find an available identifier, a global bitmap is maintained. Each bit in the global bit map may represent an identifier (e.g., dev_number). To find the next available identifier, for example, when adding a node to the table, the device can scan the bitmap for an unused identifier.

At step 1115, the method further includes the appliance determining that one or more services of the plurality of services provides the application. Responsive to retrieving the identifier, the appliance can parse the application entry using the identifier to determine which service or services has the requested application. Responsive to determining which service or services has the requested application, the appliance can check the corresponding bit in the application list for the respective service. For example, the following logic may be used to determine if a particular application is present on a service:

If((app_list[*d*/8]&(1<<(*d*%8)))!=0)

In an embodiment, if this logic is true, the application is present on the service. In some embodiments, the appliance can query a second table comprising a list of identifiers available for each service. The appliance may query the second table to determine which applications are actively present on each of the services based on the identifier. In an embodiment, the appliance can determine that the one or more services are identified in the second table with the identifier corresponding to the application.

At step 1120, the appliance can select a service from the one or more services to forward the request. In an embodiment, the appliance may select the service based on the query of the first table and/or the query of the second table. The appliance may select the service based on multiple conditions, including at least one of: is the service enabled (e.g., active, usable, available), is the application present on the service, is the monitor for the service is enabled, or is the monitor binded to the service. In an embodiment, the appliance may select the service that is determined to be available. In some embodiments, the appliance may determine that a monitor is enabled for the service and the service has the application. The appliance may determine if one or a combination of the conditions are met by analyzing the results of the query of the table. In some embodiments, the appliance may store the results of the queries of the table to compare to a subsequent query of the table. In an embodiment, the appliance may select the service based on a comparison of different queries of the table.

In an embodiment, if a service is disabled, the appliance may not select this service. In some embodiments, the appliance may determine the service is enabled and update the table corresponding to the respective service to indicate the service is enabled. In an embodiment, an extra field can be added to the service to indicate whether the monitor is enabled or disabled. The appliance may query this field to determine if a monitor is enabled for a service. In some embodiments, if a monitor is disabled, the previous entries can be stored and recorded in case the monitor is enabled again. In some embodiments, to bind a monitor to a service, a pointer can be added to a service. For example, in an embodiment, the pointer may point to a bit map rather than using a complete bit map. When a monitor is bound to a service, any number of number of bytes can be allocated. In one embodiment, 256 bytes may be allocated when a monitor is bound to a service. In some embodiments, the bytes may be allocated from memory.

In an embodiment, to unbind a monitor from a service, the appliance can de-allocate the bytes allocated to the service during monitoring. In an embodiment, to select a service, the appliance may check if the pointer for the respective service is NOT NULL. NOT NULL may mean the monitor is bound. If the monitor is bound to the service, the appliance may select the service. If the pointer is not bound to the service, the appliance may not select the service. In some embodiments, when a monitor is unbound from the service, the reference count, referred to sometimes as ref_count may be decreased. In other embodiments, when a monitor is unbound from the service, the application entry may be removed for all applications containing the given service.

In an embodiment, if a service is removed, the ref_count can be decreased. In other embodiments, if a service is removed, the application entry form the global hash table can be removed for all the applications present on that service. In some embodiments, if a service-group is removed, the ref_count can be adjusted for each application on every service for that service-group in the global app hash table.

At step 1125, the appliance may forward the request to the selected service. In an embodiment, the appliance may forward the request to the service that meets all four the conditions. In other embodiments, the appliance may forward the request to the service that meets a combination of the conditions. The appliance may forward the request for the application to the service executing on a server to handle the clients request.

Figure 11B:
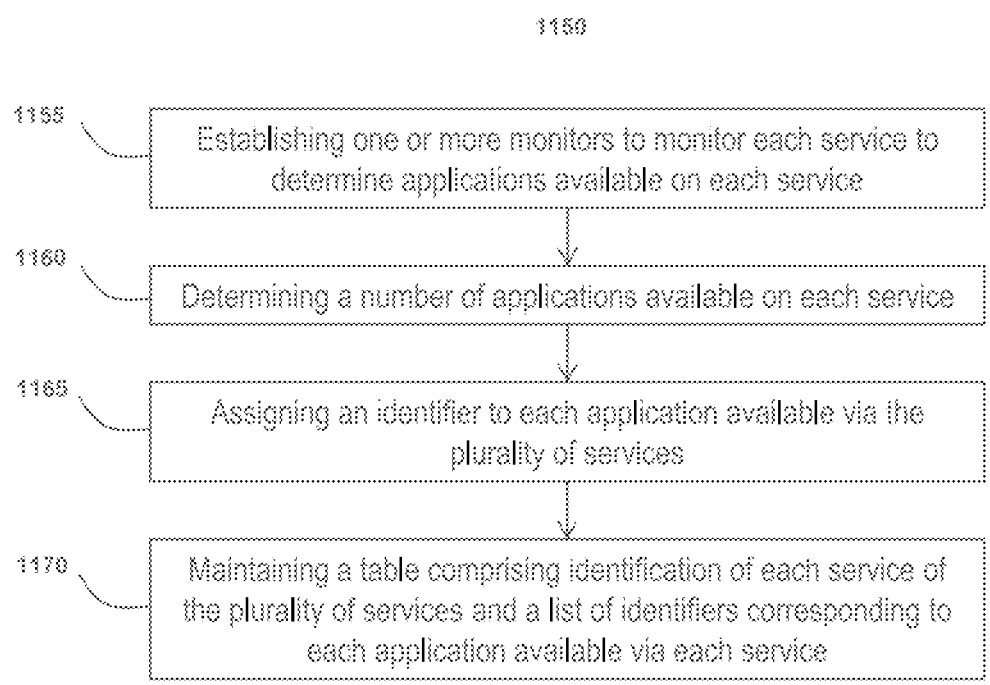
FIG. 11B is a diagram of a method for monitoring servers to load-balance the servers.

Referring now to FIG. 11B, a flow diagram depicting an embodiment of steps of a method 1150 for monitoring servers to load-balance among the servers is shown and described. In brief overview, the method includes establishing one or more monitors to monitor each service to determine applications available on each service (Step 1155) and determining a number of applications available on each service (Step 1160). The method further includes assigning an identifier to each application available via the plurality of services (Step 1165) and maintaining a table comprising identification of each service of the plurality of services and a list of identifiers corresponding to each application available via each service (Step 1170).

At step 1155, an appliance intermediary to a plurality of services executing on a plurality of servers may establish one or more monitors to monitor each service to determine applications available on each service. One or a plurality of monitors can be added to each service to monitor and/or query the respective service. In an embodiment, the appliance may establish one or a plurality of monitors executing on the appliance to probe each of the services. In some embodiments, the monitors may be detected to a single service. In other embodiments, the monitors may probe multiple services. The monitor can determine the number of active applications present on each service.

At step 1160, the appliance may determine, responsive to monitoring, a number of applications available on each service. The appliance may receive the monitor responses from probes by each of the monitors established for each of the services. The monitor responses may indicate the number of applications on the respective service. In some embodiments, the monitor responses may include an application name and the application status (e.g., active, available). The appliance may analyze the monitor responses to determine number of applications actively present on each service. In some embodiments, the appliance may store the monitor responses from each monitor. The appliance may compare subsequent monitor responses from each of the monitors to identify any status changes in the number of applications available on each service.

At step 1165, the appliance may assign an identifier to each application available via the plurality of services. In some embodiments, the appliance may maintain an identifier list (e.g., global bitmap) in which each entry in the identifier list represents an identifier (dev_number). In one embodiment, the appliance may maintain a global bitmap in which each bit represents an identifier. When a node is added to the table, the appliance may scan the identifier list and find the next available identifier. In an embodiment, the size of the identifier list may be up to 256 bytes. The identifier may be a numeral or an alphabetic character, or a combination of them.

At step 1170, the appliance, responsive to monitoring, maintains a table comprising identification of each service of the plurality of services and a list of identifiers corresponding to each application available via each service. In an embodiment, the table may be a global hash table that is maintained for storing a list of application for services. The appliance may establish a table to store information associated with various applications executing on a plurality of services executing on a plurality of servers. The appliance may load balance requests for application based on the different applications available on each of the services. The appliance may create an application entry for each application identified by the monitor responses. The application entries in the table may be organized by a hash of the application name and mapping may be done to each of the entries by the hash value of the application name. In other embodiments, the mapping of the table may be done by a hash value of the identifier assigned to the application. The appliance may create the application entries responsive to receiving the monitor responses as a new application is identified. Each application entry may include an identifier assigned to the respective application, a hash value, a namelength value, a ref_count value, and the application name.

In an embodiment, the appliance may establish or maintain a second table comprising a list of applications and corresponding identifiers assigned to each application. In many embodiments, the second table is a portion of the first table and/or is part of the same table incorporating the first table. In some embodiments, the second table may include a list of identifiers corresponding to each applications. The mapping for the second table may be done by a hash value of the identifier. In other embodiments, the mapping of the second table may be done by a hash value of the application name. In an embodiment, the second table may include similar information as the first table, however the second table may organize the information differently. For example, in one embodiment, the second table may organize the information by the identifier assigned to the various applications.

For each application entry in the table, an identifier (e.g., dev_number) will be assigned to the respective application. The identifier can be used to look whether that application is present on a service. In response to receiving a request for an application, the appliance can search the respective application entry in the table and retrieve the identifier. Using the identifier, the appliance can determine if the particular application is present on a service.

In an embodiment, the appliance may copy the application list in the table to a temporary list to update the table, such as response to o upon the appliance updating the list of applications in the table, Responsive to copying the application list to the temporary list, the appliance may set the corresponding bits in the application list to zero. To update and/or add to the table, the appliance can receive monitor responses from each of the monitors at each probe. In an embodiment, each application identified by the monitors can be added to the first table by using hash value of the respective application name. In some embodiments, each application can be added to the second table by using hash value of the respective identifier assigned to the application. The appliance can add or update the tables responsive to determining if any of the applications identified in the monitor responses are new applications. In an embodiment, to determine if the application is already listed in the list of applications, the appliance can scan the table using the application name.

If one of the applications identified is a new application, the appliance can search, query or look up an identifier list for a new identifier and assign the new identifier to the new application. In an embodiment, the new identifier may be the next available identifier in a list of identifiers. In other embodiments, an order of identifiers may be predetermined by a program or by an administrator. Responsive to assigning the identifier to the new application, the bit in the application entry in the table corresponding to that identifier can be set to the appropriate value. For example, in one embodiment, the bit for an identifier may be set to 1 once the identifier has been assigned to an application.

If the appliance determines the application is already listed in the application list, the appliance can retrieve the respective identifier for the application. In some embodiments, to determine if the application is already listed in the table, the appliance can parse the table using the application name and identify the corresponding identifier. In an embodiment, once the identifier has been retrieved, the appliance can set the appropriate bit value (e.g., 0, 1) for the application entry corresponding to the respective service the application was identified on.

For example, in an embodiment, to set a bit for dev_number d, the following code may be used:

app_list[$d/8$]|($1<<(d\%8)$))

The bits may be set for each application present on that service. Once all of the bits have been set responsive to monitoring, the appliance can compare the temporary list to the application list in the table. For example, in an embodiment, the appliance may XOR the temporary list and the application list. The XOR, also referred to as an exclusive disjunction or exclusive or, is a logical operation that outputs true (e.g., 1) whenever both inputs differ (e.g., one is "1" true and one is "0" false). In some embodiments, if a bit is set to 0 in the application list and set to 1 in the temporary list, the comparison outputs true for that bit because both inputs are different. The output of true may indicate a change in a status of an application or a new application not previously active on the service. As result of the comparison, only those bits that remain at 1 may indicate a change in the application. For example, the bits remaining at 1 as a result of the comparison may indicate at least one of a new application or an application which has been removed. An application which has been removed may include an application that is no longer active on a service.

In an embodiment, the bits which are 1 in XOR list and also in app_list may be the corresponding applications which have been added to the service. To update the table with the applications which have been added, the appliance identifies the bytes that are 1 in both the XOR list and the ap_list. The appliance then determines and/or calculates a corresponding identifier (dev_number) for each of the new applications and assigns the identifier to the respective application. Responsive to assigning the identifier to the application, the appliance can find the appropriate application entry in the table for the new application and increase the ref_count by 1 for that application.

In other embodiments, the bits which are 1 in XOR list and in temp_list may be the corresponding application which have been removed from the service. To update the table with the applications which have been removed or no longer active, the appliance can find the corresponding identifier (dev_number) for that bit. In an embodiment, using the identifier, the appliance can find the application name in the table and decrease a ref_count to 1 for that application. In other embodiments, using the identifier, the appliance can find the application name in the table and remove corresponding entry one or from all tables on the appliance corresponding to that application. These steps can be carried out for each service that the appliance receives monitor responses back from and/or each service identified in any of the tables executing on the appliance.

In some embodiments, every time the appliance starts updating a list, the appliance may copy the app_list to temp_list and set all bits of app_list to zero first for every service in a service-group. For example, the following code may be used:

app_list[i]=01000100 (latest mapped bits)
temp_list[i]=00100100 (previously mapped bits)
(app_list[i])XOR(temp_list[i])=01100000
Added application=01000000 (application corresponding to this bit is added)
Identifier (dev_number) corresponding to this application: devnumber=6+i*8

In an embodiment, the application corresponding to this identifier can be found using the second table (e.g., GLOBAL_DEVNUM_HASH_TABLE). Responsive to identifying the application name, the appliance can add this entry to the first table (e.g., GLOBAL_APP_HASH_TABLE). In some embodiments, if the entry already exists on the table, the appliance can increase the ref_count by 1 for that entry. In an embodiment, the appliance may identify an application to be removed based on the comparison:

Removed application=00100000 (application corresponding to this bit is removed)
Identifier (dev_number) corresponding to this application: devnumber=5+i*8

In an embodiment, the application corresponding to this identifier can be found using the second table (GLOBAL_DEVNUM_HASH_TABLE). Responsive to identifying the application name, the appliance can remove this entry from the table (GLOBAL_APP_HASH_TABLE). In some embodiments, responsive to identifying the application name, the appliance can decrease the ref_count by 1 for that entry. In an embodiment, the appliance can update the table responsive to the comparison.

In the case of n-core architecture, every time a core receives an update of applications, the update can be sent to all other cores to notify them of the changes. In an embodiment, for every new update, the receiving core can broadcast the message, which contains a list of all of the applications, to all of the other cores in the n-core architecture.

The structure of the message broadcast to all of the cores may include a value for an entity_id, view_id, multicast nodes, version, Pkt(i). Where "Entity_id" entry represents a unique id for each service. The unique id will be same across all the nodes and all the cores. In an embodiment, the "Entity_id" entry in the broadcast message may be 8 bytes. The "View_id" entry represents an id used in a cluster to check validity of message. For example, in some embodiments, the "View_id" can be used to determine if the correct monitor owner of the service broadcast the message and not from an old monitor owner of the service. In an embodiment, the "View_id" entry in the broadcast message may be 8 bytes. The "Multicast nodes" entry represents the other nodes in the cluster to whom the broadcast message is sent to and/or multicast. In an embodiment, the "Multicast nodes" entry in the broadcast message may be 4 bytes. The "Version" entry represents the message version. In an embodiment, the value of 1 may be used cur type of messages. In other embodiments, the "Version" entry can be if some changes are made to the message. The "Version" entry in the broadcast message may be 1 bit. The "Pkt(i)" entry in the broadcast message can be 2 bytes. In an embodiment, the "Pkt(i)" entry or packet entry may include len and appname. "len" may refer to the length of the application name. "appname" may refer to the name of the application, for example bytes used equal to len.

In an embodiment, each message may comprise the number of packets equal to number of applications on that service. For example, the message may include Pkt1 to PktN entries for N number of applications on the respective service. When the message is broadcast, each of the cores can receive the message and parse it to identify changes in the list of applications. The receiving core can update a list of applications on a hash table or tables local to the receiving core and update the bitmaps app_list to the corresponding service.

In an embodiment, in the case of n-cluster, every time a core is receiving an update, the core can broadcast the updated list message, the same message format that is used for n-core, to all the nodes in the cluster. Each cluster node can receive the updated list message on a core. Responsive to receiving the message, the core can again broadcast this updated list message to all the cores in that node. In some embodiments, whenever a new node is joins a cluster, for example N-cluster, the complete list of applications can be sent to the newly added node. In an embodiment, to send the list of applications to the node, a multicast API in N2N can be used. In an embodiment, the new node or nodes can be in operational view state (OVS) at the time the message is being unicast or multicast. The message may contain the complete list of applications.

During transmission of a message in an n-core, if the message fails, the message may be re-transmitted to the other cores. In an embodiment, a flag can be added to a service to indicate when a message transmission fails. For example, in one embodiment, a flag "insi_cur_w_flags" is added to a service, corresponding to the bit (NSI_W_APPSLB_C2C_FAIL). In the case of a message failure, the bit can be set to 1 to indicate the message transmission has failed. A timer can called after an interval of time and for each service, the appliance can check whether this flag is 1 (ON) or not. In an embodiment, the interval of time can be predetermined and be set to any period of time. In other embodiments, the interval of time can be dynamically changed during load-balancing operations. If the flag is set to 1, this may indicate a message failure and the message can be re-transmitted to all of the cores. If the re-transmission of the message is successful, the flag can be set to 0 (OFF). If the re-transmission of the message fails, at the next interval of time, the message can be re-transmitted again to all of the cores. This process can continue until all of the cores have received the message.

During transmission of a message in a n-cluster, if the message transmission fails, the message may be re-transmitted to all of the other nodes and to all cores in those nodes. A 4 byte field may be added to each service, "sql_nodemask." In an embodiment, this field may have a nodemask of nodes for which the transmission of the message failed. When the transmission of a message fails to one or more nodes a callback handler may get a call or indication of the message failure. Inside the callback handler, the field sql_nodemask can be set to nodemask of nodes for which the message transmission failed. A timer can get a call after an interval of time to indicate when to check each service for successful transmission of the message or message failure. In an embodiment, for each service, the appliance can check if the field sql_nodemask value is set to 1 (ON) or not zero. If the value is set to 1, the message can be re-transmitted to all of the other nodes and cores in those nodes. If the re-transmission of the message is successful, the field value can be set to 0 (OFF). If the re-transmission of the message fails, at the next interval of time, the message can be re-transmitted again to all of the nodes and cores in those nodes. This process can continue until all of the nodes and cores in those nodes have received the message.

In some embodiments, in both n-core/n-cluster re-transmission, the message being transmitted can be formed at the time of transmission using the bitmap present in the respective service for which the re-transmission is performed for.

In a cluster, the monitoring owner node of any given service can start sending an application (APP) update message immediately after receiving the "bind 1b monitor service command." In an embodiment, this may lead to a race conditions between the APP update message which would be generated by the owner and reception of the "bind 1b monitor service" command on other nodes. For example, in one embodiment, the APP update can reach a node which has not received the "bind 1b monitor service" command at that point of time. In some embodiments, if the bind 1b monitor command has not reached the node, then the receive side will return a message failure indication to the owner node and the owner node can re-transmit and/or unicast the APP message to that node.

In some embodiments, if APP updates are transmitted by two master nodes during a view change, each of the outgoing clustering messages can be tagged with a current view id of the sender node. For example, in one embodiment, the node N0 is the monitoring owner for the service S0 and has just sent a APP update (APP1 APP2) for S0 and then the node N0 goes down. The QSP can detect that the node NO has gone down and updates the view. In this example, node N1 can be selected as the new monitoring owner of S0 and it may start probing the service. The APP on S0 can be updated as follows (APP1 APP2 APP3). N1 may send an APP update (APP1 APP2 APP3) to the rest of the nodes. In some embodiments, the APP update from N1 may reach the node Nn before the APP update from the node N0. To handle this scenario, each of the outgoing clustering messages (e.g., APP updates) with the current view id of the sender node.

In an embodiment, the view id can be part of the NNM header in the NNM message. The server_info can be stamped with the view id of the last message which has updated the service state. In some embodiments, when a new SIP update is received, the view id of the new incoming message can be compared with the stamped view id in the server_info. The APP list may be updated when the view id in the message is greater than or equal to stamped view id of the server_info. When the APP list is updated with the APP list from the received APP update message, the server_info (server_info(si_cl_applist_mon_owner_view_id)) can be updated with view id of the received message.

In some embodiments, during a transmission of message (e.g., APP update) a race condition may exist between an APP update and a view change. For example, a cluster may include three nodes N0, N1 and N2 and, N0 is the current view leader. An administrator may try to "bind 1b monitor service" to the cluster. The nodes N0 and N1 may have received the "bind 1b monitor service." command and may conclude that N0 is the MOS, but N2 has not received the command till now. In this example, the node N0 may start probing immediately and may send the APP update message to all of the nodes. Since the node N2 has not received the "bind 1b monitor service" command till now, the applist will be updated only on N0 and N1 and not on N2. The node NO can keep trying to re-transmit the APP update to N2, as it is waiting for N2 to receive the "bind 1b monitor service" command. If the node N0 goes down before N2 has received the "bind 1b monitor service" command and N1 becomes the MOS, N2 will NOT receive the APP update even after receiving the "bind 1b monitor service S1" command, as N1 will not send the APP update until there is a change in the APP list of S1 again.

To handle this, in the case of a change in the ownership of monitoring for any given service, the new owner can broadcast the latest APP list known to it, so that new owner node can update all the nodes which might have missed or left behind by the last MOS. In an embodiment, the clustering messages (e.g., APP updates) can be sent in the following two cases, first a change in the APP list on a service and second, a change of ownership of the monitoring for any given service.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method comprising:

establishing, by a device intermediary to a plurality of clients and a plurality of services executing on a plurality of servers, one or more monitors assigned to monitor each service to identify applications actively present on each service in accordance with a probe time;

monitoring, by the device via the one or more monitors, the plurality of services by sending probes to each of the plurality of services in accordance to the corresponding probe time to identify which one or more applications are present on each of the plurality of services;

identifying, by the device responsive to receiving responses to the probes from each of the plurality of service, a name and a number of instances of one or more applications present on each of the plurality of services, within the responses comprising the name and the number of instances of the one or more applications;

assigning, by the device, a corresponding identifier to each application identified within responses to the probes as present on one or more of the plurality of services;

maintaining, by the device, one or more tables comprising a list of applications populated in the one or more tables responsive to identification of the one or more applications via monitoring and the corresponding identifier assigned by the device to each application;

receiving, by the device, a request from a client for an application of the one or more applications;

identifying, by the device, an identifier for the application from the one or more tables;

identifying, by the device using the identifier, one or more services of the plurality of services in the one or more tables on which the application is present;

selecting, by the device, a service from the one or more services to forward the request; and forwarding, by the device, the request to the selected service.

2. The method of claim 1, further comprising maintaining, by the device responsive to monitoring by the one or more monitors, the list of applications in the table actively present for each service.

3. The method of claim 1, further comprising querying, by the device using the identifier, a second table comprising a list of identifiers available for each service.

4. The method of claim 3, further comprising determining, by the device, that the one or more services are identified in the second table with the identifier corresponding to the application.

5. The method of claim 4, further comprising selecting, by the device, the service that is determined to be available.

6. The method of claim 5, further comprising selecting, by the device, the service that has a monitor enabled for the service and the application is present on the service.

7. A method comprising:

(a) establishing, by a device intermediary to a plurality of clients and a plurality of services executing on a plurality of servers, one or more monitors assigned to monitor each service to determine availability of each service and applications present on each service in accordance with a probe time;

(b) determining, by the device responsive to receiving responses received to probes sent by the one or more monitors in accordance to the corresponding probe time, identification of a name and a number of instances of applications present on each service, within the responses comprising the name and the number of instances of the one or more applications;

(c) assigning, by the device, an identifier to each application present on one or more of the plurality of services; and (d) maintaining, by the device responsive to monitoring, a table comprising identification of each service of the plurality of services and a list of identifiers corresponding to each application actively present on each service identified via monitoring and maintained in the table responsive to monitoring;

(e) receive a request from a client for an application;

(f) identify an identifier for the application from the table;

(g) determine, using the identifier, one or more services of the plurality of services on which the application is present;

(h) select a service from the one or more services based on a condition that both the service is currently available and the application is actively present on the service; and (i) forward the request to the selected service.

8. The method of claim 7, wherein (b) further comprises receiving, by the device, responses from probes of the one or more responses, the responses indicating new applications present on the respective service.

9. The method of claim 7, wherein (d) further comprises establishing, by the device, a second table comprising a list of applications and corresponding identifiers assigned to each application in the list of applications.

10. The method of claim 9, wherein (d) further comprises:

comparing, by the device responsive to monitoring, the list of identifiers available for each service in the table; and updating, by the device, the table responsive to the comparison.

11. The method of claim 7, further comprising adding to the table an identifier for a new application identified in responses to the probes as present on one or more services of the plurality of services.

12. The method of claim 11, further comprising identifying, by the device, the identifier for the application and determining using the identifier via the table, that the application is present on the one or more services of the plurality of services.

13. The method of claim 12, further comprising selecting, by the device, a service from the one or more services based on the condition that both the service is currently available and the application is actively present on the service and that both the monitor for the service is enabled and the service is bound to the monitor.

14. A system comprising:

a device comprising one or more processors, coupled to memory, and intermediary to a plurality of clients and a plurality of services executing on a plurality of servers, the device configured to:

establish one or more monitors assigned to monitor each service to identify applications actively present on each service in accordance with a probe time;

monitor, via the one or more monitors, the plurality of services by sending probes to each of the plurality of services in accordance to the corresponding probe time to identify which one or more applications are present on each of the plurality of services;

identify, responsive to receiving responses to the probes from each of the plurality of service, a name and a number of instances of one or more applications within responses to the probes received from the plurality of services, within the responses comprising the name and the number of instances of the one or more applications;

assigning a corresponding identifier to each application identified within responses to the probes as present on one or more of the plurality of services maintain a table comprising a list of applications populated in the table responsive to identification of the one or more applications via monitoring and the corresponding identifier as signed to each application;

receive a request from a client for an application of the one or more applications;

identify an identifier for the application from the table comprising a list of applications and the corresponding identifier assigned to each application;

determine, using the identifier, one or more services of the plurality of services on which the application is present;

select a service from the one or more services to forward the request; and forward the request to the selected service.

15. The system of claim 14, wherein the device is further configured to maintain, responsive to monitoring by the one or more monitors, the list of applications in the table actively present for each service.

16. The system of claim 14, wherein the device is further configured to query using the identifier, a second table comprising a list of identifiers available for each service.

17. The system of claim 16, wherein the device is further configured to determine that the one or more services are identified in the second table with the identifier corresponding to the application.

18. The system of claim 14, wherein the device is further configured to select the service that is determined to be available and on which the application is actively present.

* * * * *